(12) United States Patent
Tabata et al.

(10) Patent No.: US 7,044,881 B2
(45) Date of Patent: May 16, 2006

(54) AUTOMATIC TRANSMISSION

(75) Inventors: Atsushi Tabata, Okazaki (JP); Yasuo Hojo, Nagoya (JP); Akira Hoshino, Nishikamo-gun (JP); Terufumi Miyazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 344 days.

(21) Appl. No.: 10/283,262

(22) Filed: Oct. 30, 2002

(65) Prior Publication Data

US 2003/0083174 A1 May 1, 2003

(30) Foreign Application Priority Data

Oct. 30, 2001 (JP) ........................................ 2001-332178
Mar. 12, 2002 (JP) ........................................ 2002-067088

(51) Int. Cl.
*F16H 3/62* (2006.01)

(52) U.S. Cl. ..................... 475/284; 475/275; 475/326
(58) Field of Classification Search ................ 475/275, 475/284, 297, 311, 314, 323, 324, 326
See application file for complete search history.

(56) References Cited

U.S. PATENT DOCUMENTS 6,267,703 B1 * 7/2001 Park .......................... 475/286
6,425,841 B1 * 7/2002 Haka .......................... 475/275
6,634,980 B1   10/2003 Ziemer

FOREIGN PATENT DOCUMENTS

| JP | 403074666 | * | 3/1991 | ................ 475/276 |
| JP | 8-105496 | | 4/1996 | |
| JP | 2956173 | | 7/1999 | |
| JP | 2000-199549 | | 7/2000 | |
| JP | 2000-266138 | | 9/2000 | |
| JP | 2001-82555 | | 3/2001 | |
| JP | 2001-182785 | | 7/2001 | |
| WO | WO 01/04513 A1 | | 1/2001 | |
| WO | WO 01/27496 A1 | | 4/2001 | |
| WO | WO 02/079670 | | 10/2002 | |
| WO | 2079671 | * | 10/2002 | |

* cited by examiner

*Primary Examiner*—Ha Ho
(74) *Attorney, Agent, or Firm*—Oblon, Spivak, McClelland, Maier & Neustadt, P.C.

(57) ABSTRACT

An automatic transmission includes a first rotating element provided by a sun gear of a second planetary gear set, a second rotating element provided by coupling carriers of the second planetary gear set and a third planetary gear set to each other, a third rotating element provided by coupling ring gears of the second and third planetary gear sets to each other, and a fourth rotating element provided by a sun gear of the third planetary gear set. The second and third planetary gear sets are combined with a first planetary gear set so that the automatic transmission can provide seven forward gear stages by changing a combination of two engaging elements, such as clutches and brakes, for coupling or stopping the corresponding rotating elements.

31 Claims, 54 Drawing Sheets

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O | O |  |  |  | 0.624 | TOTAL |
| Rev |  | O |  |  |  | O |  | 3.079 | 6.768 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  | O |  |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O | O |  |  |  | 0.624 | TOTAL 6.768 |
| Rev |  | O |  |  |  | O |  | 3.079 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL |
| Rev |  | O |  |  |  | O |  | 3.079 | 6.768 |

|     | C1 | C2 | C3 | C4 | B1 | B2 | F1 | GEAR RATIO | STEP |
|-----|----|----|----|----|----|----|----|------------|------|
| 1st | O  |    |    |    |    | ◎  | O  | 4.223      | 1.538 |
| 2nd | O  |    |    | O  |    |    |    | 2.745      | 1.480 |
| 3rd | O  | O  |    |    |    |    |    | 1.855      | 1.479 |
| 4th | O  |    | O  |    |    |    |    | 1.254      | 1.254 |
| 5th |    |    | O  | O  |    |    |    | 1.000      | 1.278 |
| 6th |    | O  | O  |    |    |    |    | 0.783      | 1.254 |
| 7th |    |    | O  |    | O  |    |    | 0.624      | TOTAL |
| Rev |    | O  |    |    |    | O  |    | 3.079      | 6.768 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  | O |  |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 | |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 |  |

|  | C1 | C2 | C3 | C4 | B1 | B2 | F1 | GEAR RATIO | STEP |
|---|---|---|---|---|---|---|---|---|---|
| 1st | ○ |  |  |  |  | ◎ | ○ | 4.223 | 1.538 |
| 2nd | ○ |  |  |  | ○ |  |  | 2.745 | 1.480 |
| 3rd | ○ | ○ |  |  |  |  |  | 1.855 | 1.479 |
| 4th | ○ |  | ○ |  |  |  |  | 1.254 | 1.254 |
| 5th |  |  | ○ | ○ |  |  |  | 1.000 | 1.278 |
| 6th |  | ○ | ○ |  |  |  |  | 0.783 | 1.254 |
| 7th |  |  | ○ |  | ○ |  |  | 0.624 | TOTAL 6.768 |
| Rev |  | ○ |  |  |  | ○ |  | 3.079 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  |  | O |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.495 | 1.713 |
| 2nd | O |  |  | O |  |  |  | 3.208 | 1.645 |
| 3rd | O | O |  |  |  |  |  | 1.950 | 1.577 |
| 4th |  | O |  | O |  |  |  | 1.236 | 1.236 |
| 5th |  |  | O | O |  |  |  | 1.000 | 1.268 |
| 6th |  | O | O |  |  |  |  | 0.789 | 1.222 |
| 7th |  |  | O |  | O |  |  | 0.645 | TOTAL 8.518 |
| Rev |  | O |  |  |  | O |  | 3.545 | |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.495 | 1.713 |
| 2nd | O |  |  | O |  |  |  | 3.208 | 1.645 |
| 3rd | O | O |  |  |  |  |  | 1.950 | 1.577 |
| 4th |  | O |  | O |  |  |  | 1.236 | 1.236 |
| 5th |  |  | O | O |  |  |  | 1.000 | 1.268 |
| 6th |  | O | O |  |  |  |  | 0.789 | 1.222 |
| 7th |  |  | O |  | O |  |  | 0.645 | TOTAL 8.518 |
| Rev |  | O |  |  |  | O |  | 3.545 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.495 | 1.713 |
| 2nd | O |  |  | O |  |  |  | 3.208 | 1.645 |
| 3rd | O | O |  |  |  |  |  | 1.950 | 1.577 |
| 4th |  | O |  | O |  |  |  | 1.236 | 1.236 |
| 5th |  |  | O | O |  |  |  | 1.000 | 1.268 |
| 6th |  | O | O |  |  |  |  | 0.789 | 1.222 |
| 7th |  |  | O |  | O |  |  | 0.645 | TOTAL 8.518 |
| Rev |  | O |  |  |  | O |  | 3.545 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.495 | 1.713 |
| 2nd | O |  |  |  | O |  |  | 3.208 | 1.645 |
| 3rd | O | O |  |  |  |  |  | 1.950 | 1.577 |
| 4th | O |  |  | O |  |  |  | 1.236 | 1.236 |
| 5th |  |  | O | O |  |  |  | 1.000 | 1.268 |
| 6th |  | O | O |  |  |  |  | 0.789 | 1.222 |
| 7th |  |  | O | O |  |  |  | 0.645 | TOTAL |
| Rev |  | O |  |  |  | O |  | 3.545 | 8.518 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 4.223 | 1.538 |
| 2nd | O |  |  | O |  |  |  | 2.745 | 1.480 |
| 3rd | O | O |  |  |  |  |  | 1.855 | 1.479 |
| 4th | O |  | O |  |  |  |  | 1.254 | 1.254 |
| 5th |  |  | O | O |  |  |  | 1.000 | 1.278 |
| 6th |  | O | O |  |  |  |  | 0.783 | 1.254 |
| 7th |  |  | O |  | O |  |  | 0.624 | TOTAL 6.768 |
| Rev |  | O |  |  |  | O |  | 3.079 | |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.495 | 1.713 |
| 2nd | O |  |  | O |  |  |  | 3.208 | 1.645 |
| 3rd | O | O |  |  |  |  |  | 1.950 | 1.577 |
| 4th |  | O |  | O |  |  |  | 1.236 | 1.236 |
| 5th |  |  | O | O |  |  |  | 1.000 | 1.268 |
| 6th |  | O | O |  |  |  |  | 0.789 | 1.222 |
| 7th |  |  | O |  | O |  |  | 0.645 | TOTAL |
| Rev |  | O |  |  |  | O |  | 3.545 | 8.518 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.270 | 1.826 |
| 2nd | O |  |  | O |  |  |  | 2.886 | 1.780 |
| 3rd |  |  |  | O | O |  |  | 1.621 | 1.349 |
| 4th |  | O |  | O |  |  |  | 1.202 | 1.202 |
| 5th |  |  | O | O |  |  |  | 1.000 | 1.203 |
| 6th |  | O | O |  |  |  |  | 0.831 | 1.216 |
| 7th |  |  | O |  | O |  |  | 0.683 | TOTAL |
| Rev |  | O |  |  |  | O |  | 3.839 | 7.714 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.270 | 1.826 |
| 2nd | O |  |  | O |  |  |  | 2.886 | 1.780 |
| 3rd |  |  | O | O |  |  |  | 1.621 | 1.349 |
| 4th |  | O |  | O |  |  |  | 1.202 | 1.202 |
| 5th |  |  | O | O |  |  |  | 1.000 | 1.203 |
| 6th |  | O | O |  |  |  |  | 0.831 | 1.216 |
| 7th |  |  | O |  | O |  |  | 0.683 | TOTAL 7.714 |
| Rev |  | O |  |  | O |  |  | 3.839 |  |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.270 | 1.826 |
| 2nd | O |  |  | O |  |  |  | 2.886 | 1.780 |
| 3rd |  |  |  | O | O |  |  | 1.621 | 1.349 |
| 4th |  | O |  | O |  |  |  | 1.202 | 1.202 |
| 5th |  | O | O |  |  |  |  | 1.000 | 1.203 |
| 6th |  | O | O |  |  |  |  | 0.831 | 1.216 |
| 7th |  |  | O |  | O |  |  | 0.683 | TOTAL 7.714 |
| Rev |  | O |  |  |  | O |  | 3.839 | |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.270 | 1.826 |
| 2nd | O |  |  | O |  |  |  | 2.886 | 1.780 |
| 3rd |  |  |  | O | O |  |  | 1.621 | 1.349 |
| 4th |  | O |  | O |  |  |  | 1.202 | 1.202 |
| 5th |  |  | O | O |  |  |  | 1.000 | 1.203 |
| 6th |  | O | O |  |  |  |  | 0.831 | 1.216 |
| 7th |  |  | O |  | O |  |  | 0.683 | TOTAL |
| Rev |  | O |  |  |  | O |  | 3.839 | 7.714 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.453 | 1.935 |
| 2nd |  |  |  | O |  | ◎ | O | 2.818 | 1.734 |
| 3rd |  |  |  | O | O |  |  | 1.625 | 1.323 |
| 4th |  | O |  | O |  |  |  | 1.228 | 1.228 |
| 5th |  |  | O | O |  |  |  | 1.000 | 1.253 |
| 6th |  | O | O |  |  |  |  | 0.798 | 1.216 |
| 7th |  |  | O |  | O |  |  | 0.656 | TOTAL |
| Rev |  | O |  |  |  | O |  | 3.694 | 8.310 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.453 | 1.935 |
| 2nd |  |  |  | O |  | ◎ | O | 2.818 | 1.734 |
| 3rd |  |  |  | O | O |  |  | 1.625 | 1.323 |
| 4th |  | O |  | O |  |  |  | 1.228 | 1.228 |
| 5th |  |  | O | O |  |  |  | 1.000 | 1.253 |
| 6th |  | O | O |  |  |  |  | 0.798 | 1.216 |
| 7th |  |  | O |  | O |  |  | 0.656 | TOTAL |
| Rev |  | O |  |  |  | O |  | 3.694 | 8.310 |

|     | C1 | C2 | C3 | C4 | B1 | B2 | F1 | GEAR RATIO | STEP |
|-----|----|----|----|----|----|----|----|------------|------|
| 1st | O  |    |    |    |    | ◎  | O  | 5.453      | 1.935 |
| 2nd |    |    |    | O  |    | ◎  | O  | 2.818      | 1.734 |
| 3rd |    |    |    | O  | O  |    |    | 1.625      | 1.323 |
| 4th |    | O  |    | O  |    |    |    | 1.228      | 1.228 |
| 5th |    |    | O  | O  |    |    |    | 1.000      | 1.253 |
| 6th |    | O  | O  |    |    |    |    | 0.798      | 1.216 |
| 7th |    |    | O  |    | O  |    |    | 0.656      | TOTAL |
| Rev |    | O  |    |    |    | O  |    | 3.694      | 8.310 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.453 | 1.935 |
| 2nd |  |  |  | O |  | ◎ | O | 2.818 | 1.734 |
| 3rd |  |  |  | O | O |  |  | 1.625 | 1.323 |
| 4th |  | O |  | O |  |  |  | 1.228 | 1.228 |
| 5th |  |  | O | O |  |  |  | 1.000 | 1.253 |
| 6th |  | O | O |  |  |  |  | 0.798 | 1.216 |
| 7th |  |  | O |  | O |  |  | 0.656 | TOTAL 8.310 |
| Rev |  | O |  |  |  | O |  | 3.694 | |

|     | C1 | C2 | C3 | C4 | B1 | B2 | F1 | GEAR RATIO | STEP |
|-----|----|----|----|----|----|----|----|-----------|------|
| 1st | O  |    |    |    |    | ◎  | O  | 5.088 | 1.756 |
| 2nd | O  |    |    |    | O  |    |    | 2.898 | 1.449 |
| 3rd | O  | O  |    |    |    |    |    | 2.000 | 1.310 |
| 4th | O  |    |    | O  |    |    |    | 1.527 | 1.227 |
| 5th | O  |    | O  |    |    |    |    | 1.245 | 1.245 |
| 6th |    |    | O  | O  |    |    |    | 1.000 | 1.205 |
| 7th |    | O  | O  |    |    |    |    | 0.830 | TOTAL |
| Rev |    | O  |    |    |    | O  |    | 4.878 | 6.131 |

|  | C1 | C2 | C3 | C4 | B1 | B2 | F1 | GEAR RATIO | STEP |
|---|---|---|---|---|---|---|---|---|---|
| 1st | O |  |  |  |  | ◎ | O | 5.270 | 1.826 |
| 2nd | O |  |  | O |  |  |  | 2.886 | 1.780 |
| 3rd |  |  | O | O |  |  |  | 1.621 | 1.349 |
| 4th |  | O |  | O |  |  |  | 1.202 | 1.202 |
| 5th |  |  | O | O |  |  |  | 1.000 | 1.203 |
| 6th |  | O | O |  |  |  |  | 0.831 | 1.216 |
| 7th |  |  | O |  | O |  |  | 0.683 | TOTAL 7.714 |
| Rev |  | O |  |  |  | O |  | 3.839 |  |

|     | C1 | C2 | C3 | C4 | B1 | B2 | F1 | GEAR RATIO | STEP |
|-----|----|----|----|----|----|----|----|------------|------|
| 1st | O  |    |    |    |    | ◎  | O  | 5.453      | 1.935 |
| 2nd |    |    |    | O  |    | ◎  | O  | 2.818      | 1.734 |
| 3rd |    |    |    | O  | O  |    |    | 1.625      | 1.323 |
| 4th |    | O  |    | O  |    |    |    | 1.228      | 1.228 |
| 5th |    |    | O  | O  |    |    |    | 1.000      | 1.253 |
| 6th |    | O  | O  |    |    |    |    | 0.798      | 1.216 |
| 7th |    |    | O  |    | O  |    |    | 0.656      | TOTAL 8.310 |
| Rev |    | O  |    |    |    | O  |    | 3.694      |      |

AUTOMATIC TRANSMISSION

INCORPORATION BY REFERENCE

The disclosure of Japanese Patent Applications No. 2001-332178 filed on Oct. 30, 2001 and No. 2002-067088 filed on Mar. 12, 2002, including the specification, drawings and abstract, is incorporated herein by reference in its entirety.

BACKGROUND OF THE INVENTION

1. Field of the Invention

The invention relates to an automatic transmission, and more particularly to an automatic transmission capable of providing seven forward gear stages or speeds by using three planetary gear sets and also capable of shifting from one gear stage to another gear stage by changing a combination of two different engaging elements, such as clutches and brakes, to be engaged.

2. Description of Related Art

Automatic transmissions of motor vehicles, each including a plurality of planetary gear sets, clutches and brakes, have been widely used. Japanese Laid-Open Patent Publication No. 2000-266138 (JP-A-2000-266138) discloses an example of such an automatic transmission which is able to provide seven forward gear stages by using four planetary gear sets. Also, Japanese Laid-Open Patent Publication No. 2001-82555 (JP-A-2001-82555) discloses another example of the automatic transmission which is able to provide ten forward gear stages by using three planetary gear sets.

The automatic transmission as disclosed in JP-A-2000-266138, which uses four planetary gear sets, has a relatively large axial length, and may suffer from a difficulty in installing the transmission on the vehicle, an increased weight, and an increased manufacturing cost. On the other hand, the automatic transmission as disclosed in JP-A-2001-82555 can be comparatively easily installed on the vehicle. However, there is a need to change a combination of the maximum of four engaging elements (clutches and/or brakes) to be engaged so as to shift the transmission from one speed to another speed. Thus, the automatic transmission requires complicated, high-accuracy shift control, and may suffer from shift shocks.

SUMMARY OF THE INVENTION

It is therefore an object of the invention to provide an automatic transmission capable of providing seven forward gear stages by using three planetary gear sets and shifting from one speed to another speed by changing a combination of two engaging elements to be engaged.

While the invention provides a plurality of arrangements of automatic transmissions which accomplish the above object, only one of the arrangements will be briefly described in the following, and brief description of the rest of the arrangements will not be provided herein.

An automatic transmission according to one aspect of the invention includes (a) an input member, (b) an output member, (c) a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power, and (d) a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, which are arranged in the order of description from one end to the other end in a nomogram in which speeds of rotation of the first, second, third and fourth rotating elements are represented by straight lines, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples two of the first, second, third and fourth rotating elements to each other, the third rotating element being coupled to the output member to output rotary power. In the automatic transmission, a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch or the first clutch and the fourth clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear-stage is established when the third clutch and the first brake are engaged.

The gear ratio as mentioned above means the ratio of the speed of rotation of the input member to the speed of rotation of the output member (=rotation speed of input member/rotation speed of output member).

In one embodiment of the above aspect of the invention, the second planetary gear set is of a single pinion type, and the third planetary gear set is of a double pinion type, and the first rotating element includes the sun gear of the second planetary gear set, the second rotating element includes the carrier of the second planetary gear set and the carrier of the third planetary gear set that are coupled to each other, the third rotating element includes the ring gear of the second planetary gear set and the ring gear of the third planetary gear set that are coupled to each other, and the fourth rotating element includes the sun gear of the third planetary gear set.

In each of the automatic transmissions according to the above aspects of the invention, it is preferable that the first planetary gear set is of a double pinion type, and includes a sun gear, a carrier and a ring gear as the three rotating elements, and that one of the sun gear and the carrier is coupled to the input member, and the other is fixed and inhibited from rotating, while the ring gear serving as the intermediate output member is rotated at a reduced speed as compared with that of the input member to output power to the second transmitting portion.

As described above, the automatic transmission according to each aspect of the invention is able to provide seven forward gear stages by using three planetary gear sets, four clutches and two brakes. Thus, the weight and size of the automatic transmission are reduced as compared with the case where four planetary gear sets are used. In addition, since the automatic transmission is shifted from one speed to another speed by changing a combination of two engaging elements (clutch(es) and/or brake(s)), shift control can be more easily performed, and shift shocks are advantageously reduced.

If the gear ratios ρ of the three planetary gear sets are appropriately determined to be, for example, in a range of about 0.3 to 0.6 in the automatic transmission according to each of the above aspects of the invention, the transmission gear ratios corresponding to the first through seventh gear stages can be set to appropriate values while using relatively small planetary gear sets (each having a small radius), and the total width of the gear ratios, i.e., the ratio of the largest gear ratio to the smallest gear ratio, can be made as large as about 6 or greater.

In one embodiment of the automatic transmission according to each aspect of the invention, the automatic transmission includes a single-pinion type second planetary gear set and a double-pinion type third planetary gear set, and the carriers and ring gears of the second and third planetary gear sets are respectively coupled to each other. The automatic transmission of this type may be constructed as a Ravigneaux type planetary gear train in which a single carrier and a single ring gear are used for both the second and third planetary gear sets. In this case, the number of components of the automatic transmission and its axial length can be further reduced.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

Figures 1A, 1B:
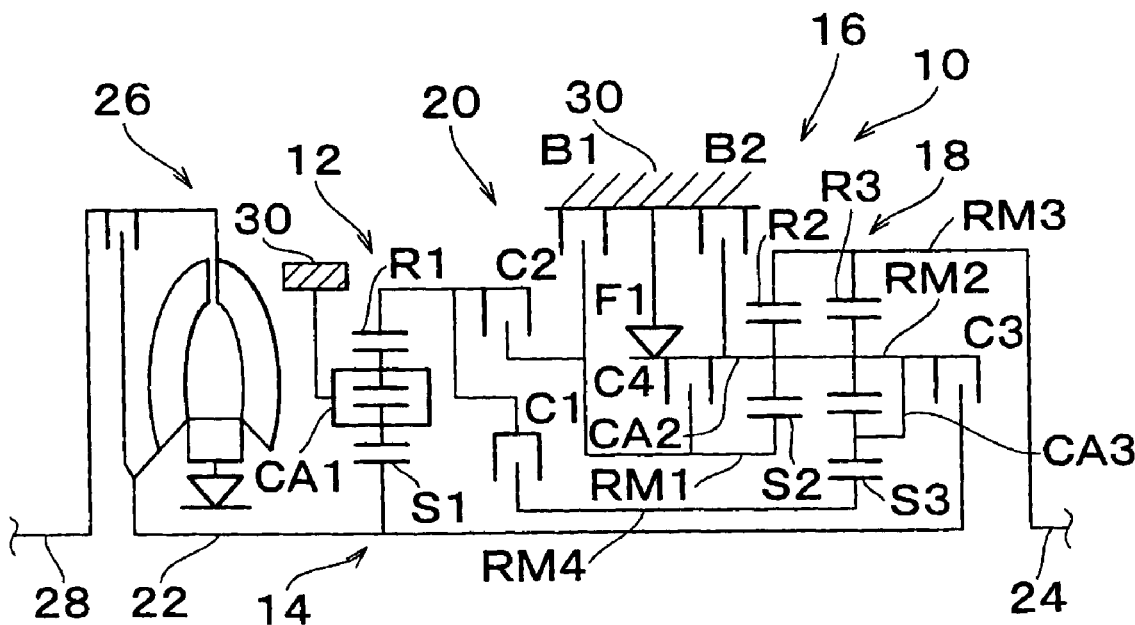
FIG. 1a is a schematic view showing an automatic transmission of a motor vehicle according to a first embodiment of the invention.
FIG. 1b is an operation table according to which each gear stage of the automatic transmission of the first embodiment as shown in FIG. 1a is established.

In the following description, some exemplary embodiments of the invention will be described in detail with reference to the accompanying drawings.

The invention is preferably applied to an automatic transmission of a motor vehicle, which receives rotary power from a driving power source, such as an internal combustion engine, via a fluid coupling such as a torque converter, changes the speed of rotation at a given gear ratio, and transmits the power from an output member, such as an output gear or an output shaft, to right and left driving wheels, via a differential gear unit. An input member of the transmission may be a turbine shaft of the torque converter. It is to be understood that the invention may also be applied to automatic transmissions for use in systems other than motor vehicles.

The automatic transmission may be transversely or laterally installed on, for example, a front engine front drive (FF) vehicle, such that the axis of the transmission extends in the width direction of the vehicle, or may be longitudinally installed on, for example, a front engine rear drive (FR) vehicle, such that the axis of the transmission extends in the longitudinal or running direction of the vehicle.

The automatic transmission may automatically change its gear ratio depending upon vehicle operating conditions, such as an accelerator pedal position and a vehicle speed, or may change its gear ratio in accordance with manual shifting operations (e.g., upshifting and downshifting operations) by the vehicle operator. The automatic transmission according to exemplary embodiments of the invention is able to establish seven forward gear stages, and also establish a reverse gear stage by engaging a second clutch and a second brake (which will be described later) provided in the automatic transmission. In the ninth, tenth and twenty-fifth embodiments (which will be described later) in which a fourth clutch (which will be described) selectively couples a first rotating member (which will be described) to the input member of the transmission, the automatic transmission is also able to establish another reverse gear stage having a smaller gear ratio by engaging the fourth clutch and the second brake.

The first through fourth clutches and the first and second brakes as described later may be preferably in the form of hydraulically operated friction devices of, for example, multiple-disc type, single-disc type or belt type, which are frictionally engaged by means of hydraulic cylinders. Other coupling devices, such as those of electromagnetic type, may also be used as the clutches and brakes. A one-way clutch or clutches may also be provided in parallel with the above-indicated clutches and brakes so as to make shift control easy. If a one-way clutch is provided in parallel with the second clutch, for example, the transmission establishes the $1^{st}$-speed gear stage only by engaging the first clutch. Furthermore, automatic transmissions other than those of the twenty-first through twenty-fourth and twenty-seventh embodiments as described later can shift from the $1^{st}$-speed gear stage to the $2^{nd}$-speed gear stage only by engaging the first brake, and the automatic transmissions of the twenty-first through twenty-fourth and twenty-seventh embodiments can shift from the $2^{nd}$-speed gear stage in which the fourth clutch is engaged, to the $3^{rd}$-speed gear stage, only by engaging the first brake, while keeping the fourth clutch engaged. When an engine brake is not needed, only a one-way clutch may be provided in place of the second brake. Here, one-way clutches function, like brakes, to stop rotation of corresponding rotating members. Other than the above-described arrangements, the automatic transmission of the invention may be constructed in various ways. For example, a brake and a one-way clutch, which are connected in series, may be provided in parallel with the first brake.

The positional relationship between first and second transmitting portions (which will be described later) and the positional relationship between second and third planetary gear sets (which will be described later) of the second transmitting portion are not particularly limited to those of the following embodiments, but may be changed as needed. For example, the third planetary gear set may be disposed between a first planetary gear set (which will be described later) and the second planetary gear set. The clutches and brakes may also be arranged in various fashions. For example, the clutches and brakes may be arranged to be concentrated in one end portion of the automatic transmission.

In each of the following embodiments, the automatic transmission employs a double-pinion type planetary gear set as the first planetary gear set of the first transmitting portion. More specifically, one of a sun gear, a carrier and a ring gear, as three rotating elements, is coupled to and rotated or driven by the input member of the transmission, and another rotating element is fixed and inhibited from rotating, while the remaining rotating element, serving as an intermediate output member, is rotated at a reduced speed as compared with that of the input member, so as to output power to the second transmitting portion. It is, however, to be understood that the first planetary gear set of the first transmitting portion is not limited to the double-pinion type planetary gear set, but may be a single-pinion type planetary gear set. In this case, one of the sun gear and the ring gear is coupled to the input member, and the other is fixed and inhibited from rotating, while the carrier, serving as an intermediate output member, is rotated at a reduced speed as compared with that of the input member, so as to output power to the second transmitting portion.

When the single-pinion type planetary gear set is used, a pinion gear provided on the carrier may be a stepped gear having a large-diameter portion and a small-diameter portion. In this case, the three rotating elements may be provided by the sun gear and the ring gear that respectively mesh with one and the other of the large-diameter portion and the small-diameter portion of the pinion gear, and the carrier. Alternatively, the three rotating members may be provided by a pair of a small-diameter sun gear and a large-diameter sun gear that respectively mesh with the large-diameter portion and small-diameter portion of the pinion gear, and the carrier, or may be provided by a pair of a large-diameter ring gear and a small-diameter ring gear that respectively mesh with the large-diameter portion and small-diameter portion of the pinion gear, and the carrier. When the planetary gear set includes the small-diameter sun gear, large-diameter sun gear and the carrier, one of the small-diamneter sun gear and the carrier is coupled to the input member, and the other is fixed and inhibited from rotating, while the large-diameter sun gear, serving as an intermediate output member, is rotated at a reduced speed as compared with that of the input member, to output power to the second transmitting portion. When the planetary gear set includes the large-diameter ring gear, the small-diameter ring gear and the carrier, one of the large-diameter ring gear and the carrier is coupled to the input member, and the other is fixed and inhibited from rotating, while the small-diameter ring gear is rotated at a reduced speed as compared with that of the input member, to output power to the second transmitting portion.

Each of the exemplary embodiments will be now described in detail with reference to a schematic view, an operation table, and a nomogram associated with the automatic transmission of each embodiment.

First Embodiment

Figure 2:
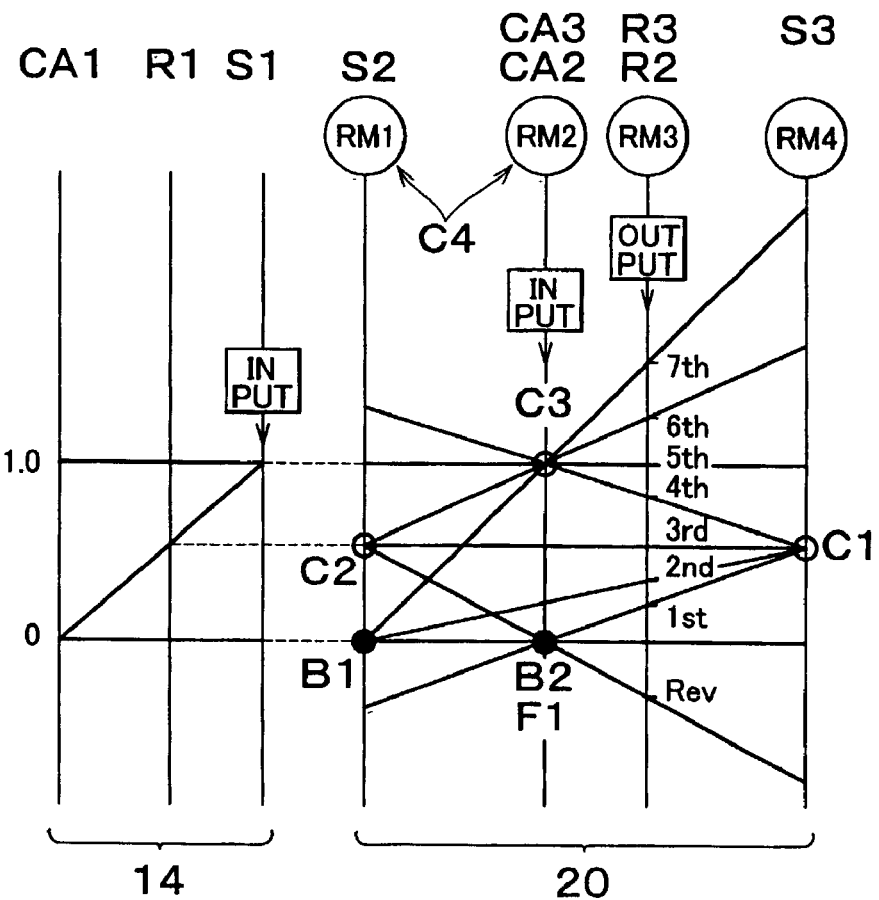
FIG. 2 is a nomogram plotted with respect to the automatic transmission of the first embodiment.

Referring to FIG. 1a, FIG. 1b and FIG. 2, the first embodiment of the invention will be described in detail.

FIG. 1a schematically shows an automatic transmission 10 of a motor vehicle according to the first embodiment of the invention, and FIG. 1b is an operation table useful for explaining the relationship between engaging elements and gear ratios when a plurality of gear stages are established. The automatic transmission 10 is mounted in the longitudinal direction in a vehicle, such as a FR vehicle, and includes a first transmitting portion 14 and a second transmitting portion 20. The first transmitting portion 14 mainly includes a double-pinion type first planetary gear set 12, and the second transmitting portion 20 mainly includes a single-pinion type second planetary gear set 16 and a double-pinion type third planetary gear set 18. The automatic transmission 10 thus constructed transmits rotary power from an input shaft 22 to an output shaft 24 while changing the speed of rotation. The input shaft 22, which corresponds to the above-indicated input member, is a turbine shaft of a torque converter 26, and the transmission 10 receives rotary power from a crankshaft 28 of an internal combustion engine as a driving source for running the vehicle, via the torque converter 26. The output shaft 24, which corresponds to the above-indicated output member, drives or rotates right and left drive wheels via a propeller shaft and a differential gear unit. It is to be noted that the automatic transmission 10 is constructed substantially symmetrically with respect to the center line, and only the upper half of the transmission 10 is illustrated in FIG. 1a.

The first planetary gear set 12 that constitutes the first transmitting portion 14 has a sun gear S1, a carrier CA1 and a ring gear R1. The sun gear S1 is coupled to and driven (i.e., rotated) by the input shaft 22, and the carrier CA1 is fixed integrally to a transmission case 30 and is thus inhibited from rotating, while the ring gear R1, as an intermediate output member, is rotated at a reduced speed as compared with that of the input shaft 22, to output power to the second transmitting portion 20. Each of the second and third planetary gear sets 16, 18 that constitute the second transmitting portion 20 has a sun gear S2, S3, a carrier CA2, CA3 and a ring gear R2, R3. The second and third planetary gear sets 16, 18 provide four rotating elements RM1–RM4 by connecting parts of the gear sets 16, 18 with each other. More specifically, the sun gear S2 of the second planetary gear set 16 provides a first rotating element RM1, and the carrier CA2 of the second planetary gear unit 16 and the carrier CA3 of the third planetary gear set 18 are coupled to each other to provide a second rotating element RM2. The ring gear R2 of the second planetary gear set 16 and the ring gear R3 of the third planetary gear set 18 are coupled to each other to provide a third rotating element RM3, and the sun gear S3 of the third planetary gear set 18 provides a fourth rotating element RM4. The first rotating element RM1 (i.e., sun gear S2) is selectively coupled to the case 30 by a first brake B1 so that its rotation is stopped, and the second rotating element RM2 (i.e., carriers CA2, CA3) is selectively coupled to the case 30 by a second brake B2 so that its rotation is stopped. The fourth rotating element RM4 (i.e., sun gear S3) is selectively coupled via a first clutch C1 to the ring gear R1 of the first planetary gear set 12 as the intermediate output member, and the first rotating element RM1 (i.e., sun gear S2) is selectively coupled via a second clutch C2 to the ring gear R1, while the second rotating element RM2 (i.e., carriers CA2, CA3) is selectively coupled to the input shaft 22 via a third clutch C3. The first rotating element RM1 (i.e., sun gear S2) and the second rotating element RM2 (i.e., carriers CA2, CA3) are selectively coupled to each other via a fourth clutch C4, and the third rotating element RM3 (i.e., ring gears R2, R3) is coupled integrally to the output shaft 24 so as to output rotary power. Each of the first brake B1, second brake B2 and the first through fourth clutches C1–C4 is a hydraulically operated friction device of a multiple-disc type, which is frictionally engaged by means of a hydraulic cylinder. In addition, a one-way clutch F1 is disposed in parallel with the second brake B2, between the second rotating element RM2 (i.e., carriers CA2, CA3) and the case 30. The one-way clutch F1 is adapted to allow the second rotating element RM2 to rotate in the same direction as the input shaft 22, but inhibit the same element RM2 from rotating in the reverse direction.

FIG. 2 is a nomogram in which straight lines represent the speeds of rotation of the respective rotating elements of the first transmitting portion 14 and the second transmitting portion 20. In the nomogram of FIG. 2, the lower horizontal line indicates rotation speed "0", and the upper horizontal line indicates rotation speed "1.0" which is equal to the rotation speed of the input shaft 22. Three vertical lines in the section of the first transmitting portion 14 respectively represent the carrier CA1, the ring gear R1 and the sun gear S1 as viewed from the left to the right in FIG. 2. The intervals of these vertical lines are determined in accordance with the gear ratio ρ1 (=the number of teeth of the sun gear/the number of teeth of the ring gear) of the first planetary gear set 12. Four vertical lines in the section of the second transmitting portion 20 respectively represent the first rotating element RM1 (sun gear S2), the second rotating element RM2 (carriers CA2, CA3), the third rotating element RM3 (ring gears R2, R3) and the fourth rotating element RM3 (sun gear S3) as viewed from the left to the right in FIG. 2. The intervals of these vertical lines are determined in accordance with the gear ratio ρ2 of the second planetary gear set 16 and the gear ratio ρ3 of the third planetary gear set 18.

As is apparent from the nomogram of FIG. 2, when the first clutch C1 and the second brake B2 are engaged, and the fourth rotating element RM4 is rotated at a reduced speed via the first transmitting portion 14 while rotation of the second rotating element RM2 is stopped, the third rotating element RM3 coupled to the output shaft 24 is rotated at a speed denoted by "$1^{st}$" in FIG. 2, so that the 1st-speed gear stage having the largest gear ratio is established.

When the first clutch C1 and the first brake B1 are engaged, and the fourth rotating element RM4 is rotated at a reduced speed via the first transmitting portion 14 while rotation of the first rotating element RM1 is stopped, the third rotating element RM3 is rotated at a speed denoted by "$2^{nd}$" in FIG. 2, so that the $2^{nd}$-speed gear stage having a smaller gear ratio than that of the $1^{st}$-speed gear stage is established.

When the first clutch C1 and the second clutch C2 are engaged, and the second transmitting portion 20 is rotated as a unit at a reduced speed via the first transmitting portion 14, the third rotating element RM3 is rotated at a speed denoted by "$3^{rd}$" in FIG. 2, which is equal to the rotation speed of the ring gear R1 of the first transmitting portion 14, so that the $3^{rd}$-speed gear stage having a smaller gear ratio than that of the $2^{nd}$-speed gear stage is established.

When the first clutch C1 and the third clutch C3 are engaged, and the fourth rotating element RM4 is rotated at a reduced speed via the first transmitting portion 14 while the second rotating element RM2 is rotated as a unit with the input shaft 22, the third rotating element RM3 is rotated at a speed denoted by "$4^{th}$" in FIG. 2, so that the $4^{th}$-speed gear stage having a smaller gear ratio than that of the $3^{rd}$-speed gear stage is established.

When the third clutch C3 and the fourth clutch C4 are engaged, and the second transmitting portion 20 is rotated as a unit with the input shaft 22, the third rotating element RM3 is rotated at a speed denoted by "$5^{th}$" in FIG. 2, which is equal to the rotation speed of the input shaft 22, so that the $5^{th}$-speed gear stage having a smaller gear ratio than that of the $4^{th}$-speed gear stage is established.

When the second clutch C2 and the third clutch C3 are engaged, and the first rotating element RM1 is reduced at a reduced speed via the first transmitting portion 14 while the second rotating element RM2 is rotated as a unit with the input shaft 22, the third rotating element RM3 is rotated at a speed denoted by "$6^{th}$" in FIG. 2, so that the $6^{th}$-speed gear stage having a smaller gear ratio than that of the $5^{th}$-speed gear stage is established.

When the third clutch C3 and the first brake B1 are engaged, and the second rotating element RM2 is rotated as a unit with the input shaft 22 while rotation of the first rotating element RM1 is stopped, the third rotating element RM3 is rotated at a speed denoted by "$7^{th}$" FIG. 2, so that the $7^{th}$-speed gear stage having a smaller gear ratio than that of the $6^{th}$-speed gear stage is established.

The $3^{rd}$-speed gear stage may also be established by engaging the first clutch C1 and the fourth clutch C4, instead of engaging the first clutch C1 and the second clutch C2.

When the second clutch C2 and the second brake B2 are engaged, the first rotating element RM1 is rotated at a reduced speed via the first transmitting portion 14, and rotation of the second rotating element RM2 is stopped. As a result, the third rotating element RM3 is rotated in the reverse direction at a speed denoted by "Rev" in FIG. 2, so that a reverse gear stage "Rev" is established.

The operation table of FIG. 1b indicates the relationship between the respective gear stages and the operating states of the clutches C1–C4 and the brakes B1, B2. In FIG. 1b, "O" indicates engagement, and "Ⓞ" indicates engagement only at the time of application of an engine brake. Since the one-way clutch F1 is provided in parallel with the second brake B2 for establishing the $1^{st}$-speed gear stage, the second brake B2 is not necessarily engaged when the vehicle is started (or accelerated), and the $1^{st}$-speed gear stage can be established only by engaging the first clutch C1. If the first brake B1 is engaged in this condition, the transmission 10 can be shifted from the $1^{st}$-speed gear stage to the $2^{nd}$-speed gear stage. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.540, ρ2 is equal to 0.603, and ρ3 is equal to 0.439, the gear ratios as indicated in FIG. 1b are provided. As is understood from FIG. 1b, the step value of the gear ratios, namely, the ratio of the gear ratios of the adjacent gear stages is generally appropriate, and the total width of the gear ratios, namely, the ratio of the largest gear ratio to the smallest gear ratio (=4.223/0.624), is a sufficiently large value (which is about 6.768). In addition, the reverse gear stage "Rev" has an appropriate gear ratio. Thus, the automatic transmission 10 provides appropriate speed-change characteristics over the entire range of operation.

With the automatic transmission 10 of the embodiment, the seven forward speeds (or forward-drive gear stages) are provided by three planetary gear sets 12, 16, 18, four clutches C1–C4 and two brakes B1, B2. Thus, the automatic transmission 10 is made light-weight and compact, and can be more easily installed on the vehicle, as compared with the case where four planetary gear sets are used. Furthermore, since shifting from one speed to another speed is effected only by changing the combination of two of the clutches C1–C4 and the brakes B1, B2, shift control can be easily performed, and shift shocks are advantageously reduced.

By setting the gear ratios ρ1, ρ2 and ρ3 of the three planetary gear units 12, 16 and 18 to be within a range of about 0.3 to 0.6, the automatic transmission 10 is able to provide appropriate speed-change characteristics over the entire range of operation as shown in FIG. 1b while keeping the size (or diameter) of the planetary gear sets 12, 16, 18 relatively small.

Next, a modified example of the first embodiment will be explained. In the following description of the modified example, the same reference numerals will be used to identify substantially the same elements or portions as those of the first embodiment.

Figure 3:
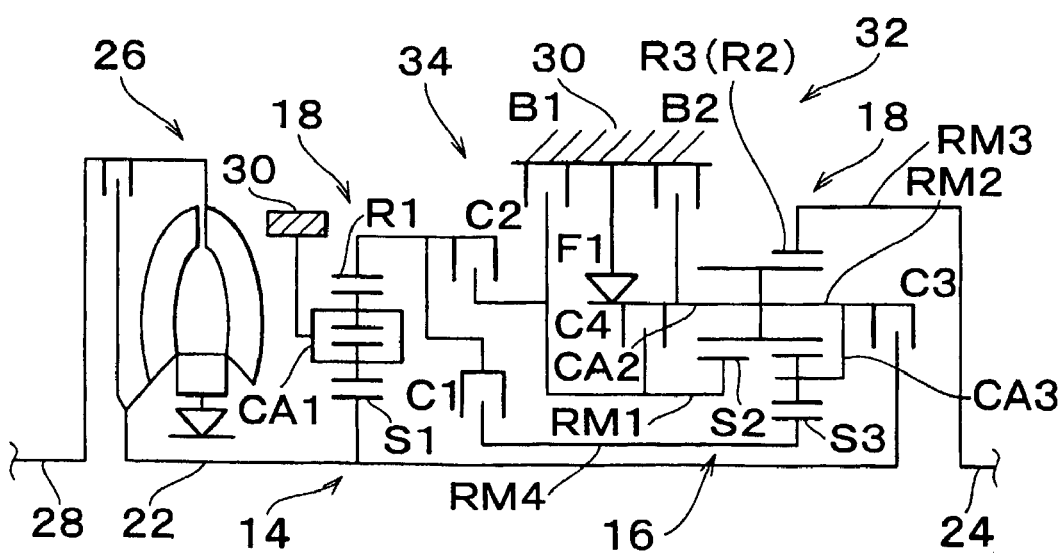
FIG. 3 is a schematic view showing a modified example of the automatic transmission of the first embodiment, in which the second transmitting portion has a Ravigneaux type planetary gear train.

FIG. 3 shows an automatic transmission 32 of a motor vehicle as the modified example of the first embodiment. The automatic transmission 32 is different from that of the first embodiment in that the second transmitting portion 34 takes the form of a Ravigneaux type planetary gear train. Namely, the carriers C2 and C3 of the second planetary gear set 16 and the third planetary gear set 18 are provided by a common member, and the ring gears R2 and R3 are provided by a common member. In addition, the pinion gear of the second planetary gear unit 16 serves as a second pinion gear of the third planetary gear unit 18. In this case, the number of components and the axial length of the automatic transmission 32 are further reduced.

Second Embodiment

Figures 4A, 4B:
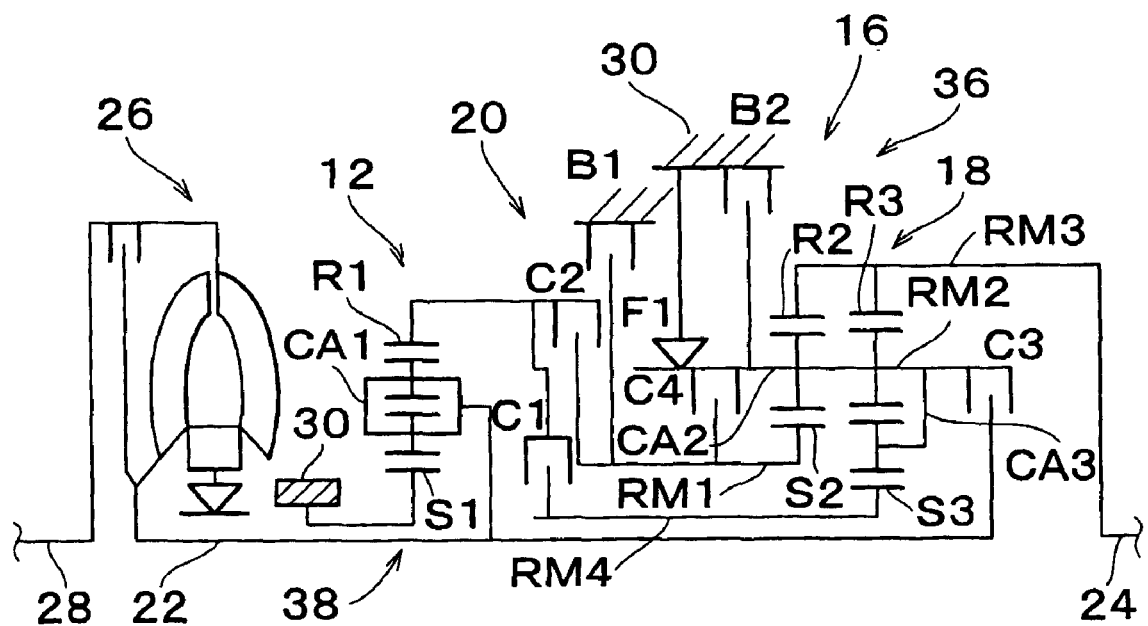
FIG. 4a is a schematic view showing an automatic transmission of a motor vehicle according to a second embodiment of the invention.
FIG. 4b is an operation table according to which each gear stage of the automatic transmission of the second embodiment as shown in FIG. 4a is established.
Figure 5:
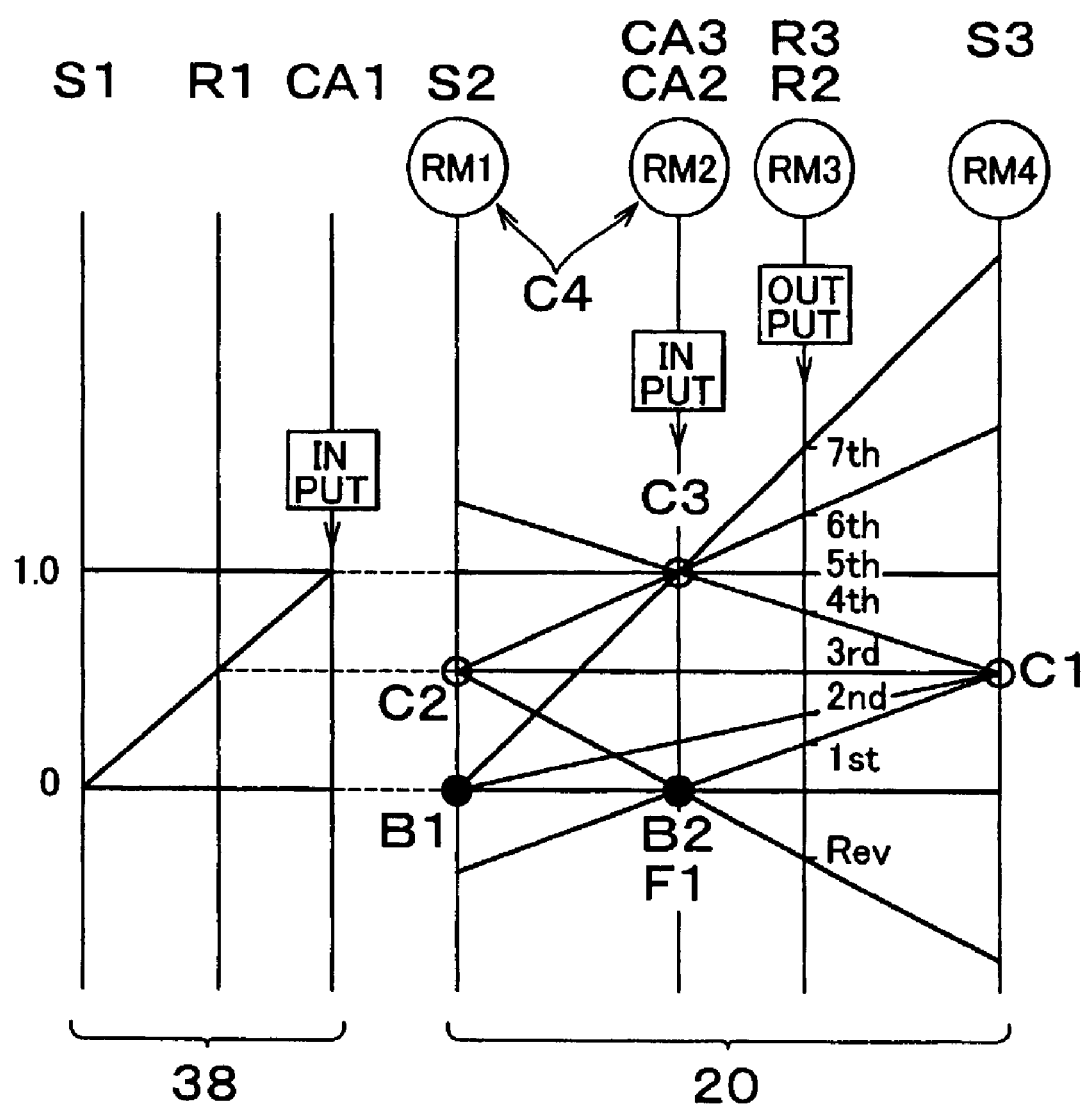
FIG. 5 is a nomogram plotted with respect to the automatic transmission of the second embodiment.

Referring next to FIGS. 4a, 4b and FIG. 5, the second embodiment of the invention will be described. FIGS. 4a and 4b correspond to FIGS. 1a and 1b, and FIG. 5 corresponds to FIG. 2. An automatic transmission 36 of a motor vehicle according to the second embodiment is different from the automatic transmission 10 of the first embodiment as shown in FIGS. 1a, 1b and FIG. 2 in respect of the construction of the first transmitting portion 38. More specifically, the carrier CA1 of the first planetary gear set 12 is coupled to and rotated by the input shaft 22, and the sun gear S1 is fixed to the case 30 and is thus inhibited from rotating, while the ring gear R1, serving as an intermediate output member, is rotated at a reduced speed as compared with that of the input shaft 22, to output power to the second transmitting portion 20 via a selected one of the clutches C1 and C2.

In this case, too, seven forward gear stages, i.e., the 1st-speed gear stage through the $7^{th}$-speed gear stage, and one reverse gear stage are established according to the operation table of FIG. 4b that is identical with that of FIG. 1b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.460, ρ2 is equal to 0.603, and ρ3 is equal to 0.439, the same gear ratios as indicated in FIG. 1b are obtained as shown in FIG. 4B. Thus, the automatic transmission 36 of the second embodiment operates in substantially the same manner and yields substantially the same effects as that of the first embodiment.

The automatic transmission 36 may be modified as in the modified example of the first embodiment shown in FIG. 3 by using a Ravigneaux type planetary gear train as the second transmitting portion 20.

Third Embodiment

Figures 6A, 6B:
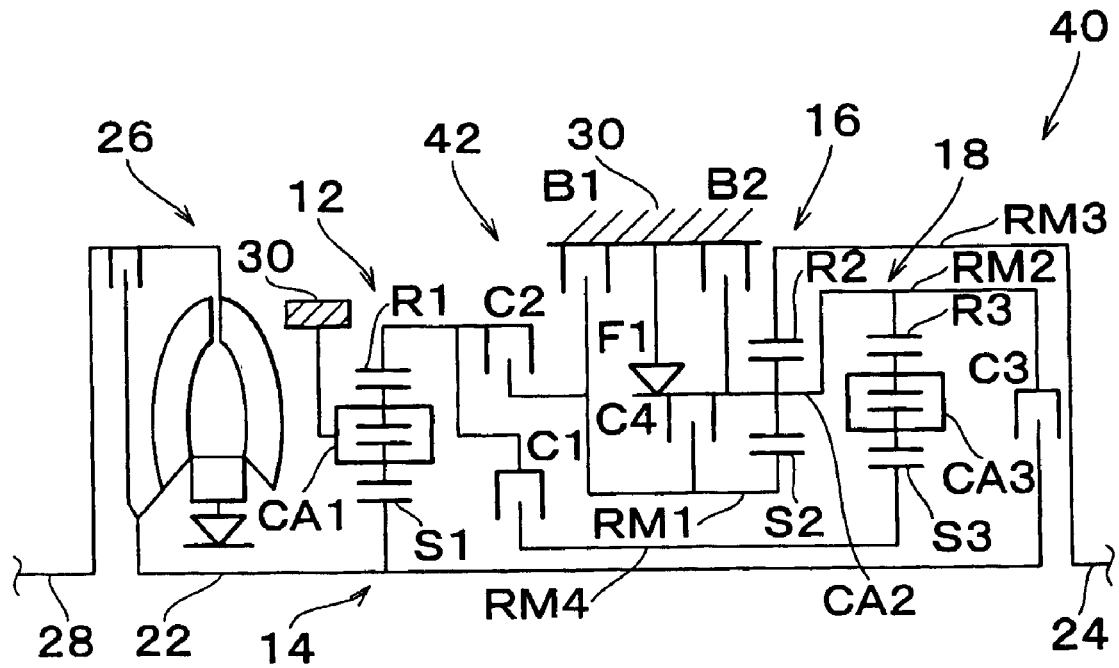
FIG. 6a is a schematic view showing an automatic transmission of a motor vehicle according to a third embodiment of the invention.
FIG. 6b is an operation table according to which each gear stage of the automatic transmission of the third embodiment as shown in FIG. 6a is established.
Figure 7:
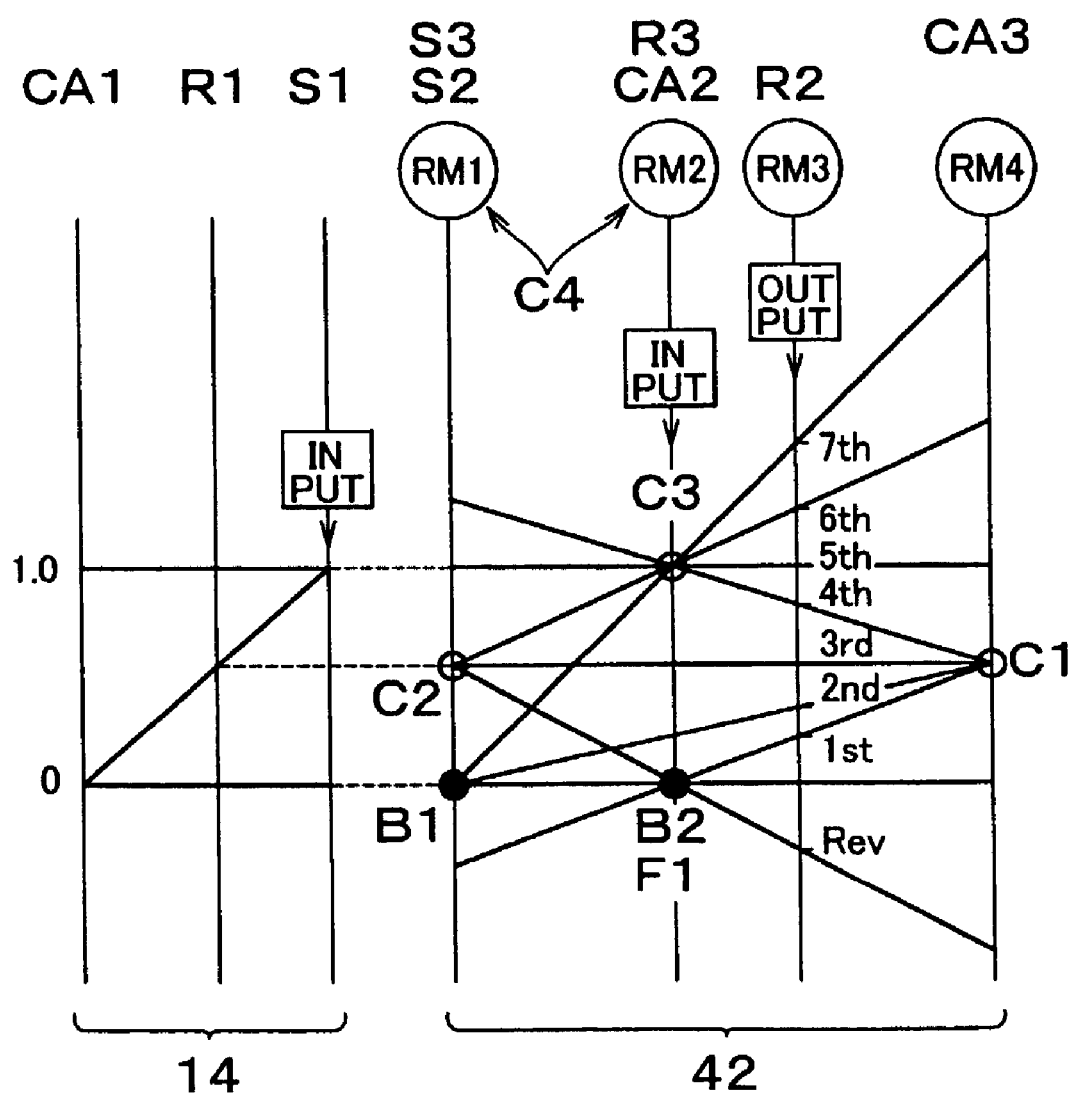
FIG. 7 is a nomogram plotted with respect to the automatic transmission of the third embodiment.

Referring next to FIGS. 6a, 6b and FIG. 7, the third embodiment of the invention will be described. FIGS. 6a and 6b correspond to FIGS. 1a and 1b, and FIG. 7 corresponds to FIG. 2. An automatic transmission 40 of a motor vehicle according to the third embodiment is different from the automatic transmission 10 of the first embodiment as shown in FIGS. 1A, 1B and FIG. 2 in respect of the construction of the second transmitting portion 42. More specifically, the sun gear S2 of the second planetary gear unit 16 and the sun gear S3 of the third planetary gear unit 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the carrier CA3 of the third planetary gear set 18 provides the fourth rotating element RM4. It is to be noted that the rotating elements RM1 to RM4 are coupled to each other through the clutches C1 to C4, brakes B1 and B2 and the one-way clutch F1 in the same manners as in the first embodiment as shown in FIGS. 1a, 1b and FIG. 2. Also, the rotating elements RM1 to RM4 and the case 30, the ring gear R1 of the first planetary gear set 12 as the intermediate output member, the input shaft 22 and the output shaft 24 are coupled to each other in the same manners as in the first embodiment as shown in FIGS. 1a, 1b and FIG. 2.

In this case, too, seven forward gear stages, i.e., the $1^{st}$-speed gear stage through the $7^{th}$-speed gear stage, and one reverse gear stage are established according to the operation table of FIG. 6B that is identical with that of FIG. 1b. The transmission gear ratios of the respective gear stages are suitably determined depending upon the respective gear ratios ρ1, ρ2 and ρ3 of the first, second and third planetary gear sets 12, 13 and 18. For example, if ρ1 is equal to 0.540, ρ2 is equal to 0.603, and ρ3 is equal to 0.578, the same gear ratios as indicated in FIG. 1b are obtained as shown in FIG. 6b. Thus, the automatic transmission 40 of the third embodiment operates in substantially the same manner and yields substantially the same effects as that of the first embodiment.

Fourth Embodiment

Figures 8A, 8B:
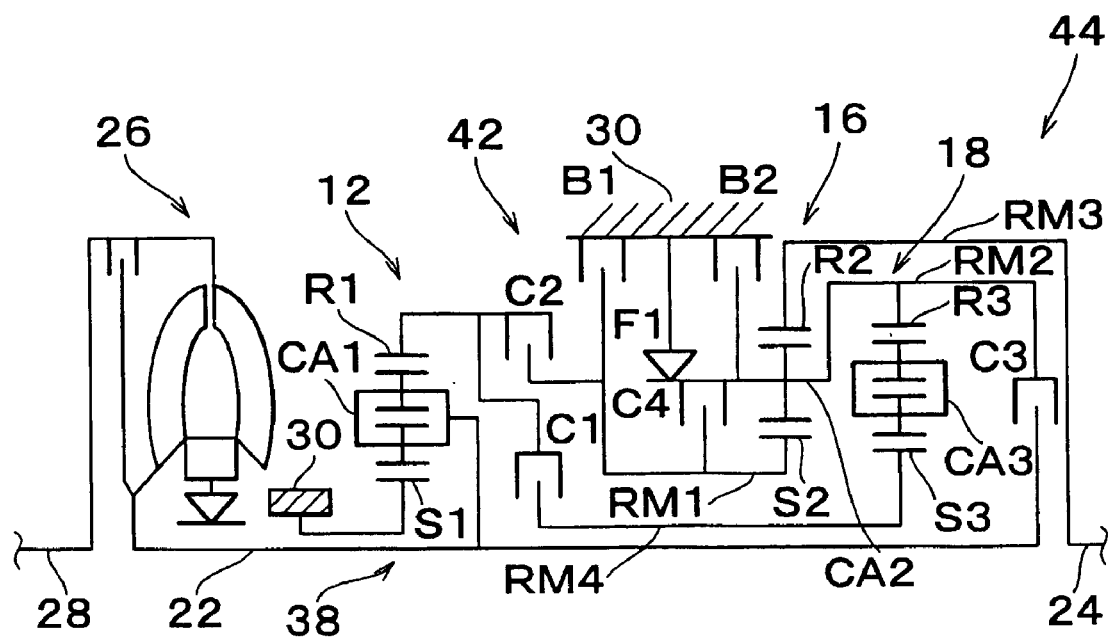
FIG. 8a is a schematic view showing an automatic transmission of a motor vehicle according to a fourth embodiment of the invention.
FIG. 8b is an operation table according to which each gear stage of the automatic transmission of the fourth embodiment as shown in FIG. 8a is established.
Figure 9:
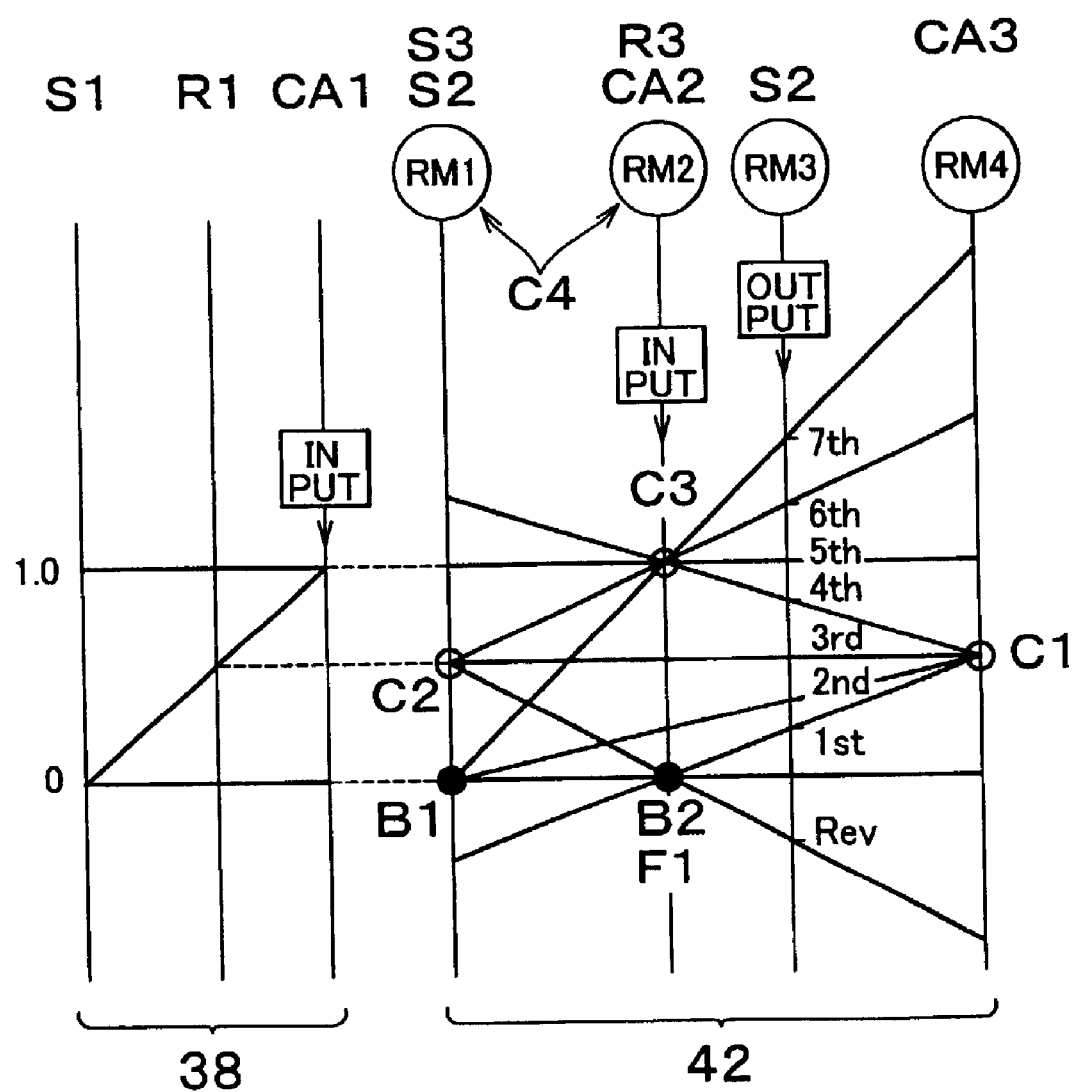
FIG. 9 is a nomogram plotted with respect to the automatic transmission of the fourth embodiment.

Referring next to FIGS. 8a, 8b and FIG. 9, the third embodiment of the invention will be described. FIGS. 8a and 8b correspond to FIGS. 1a and 1b, and FIG. 9 corresponds to FIG. 2. An automatic transmission 44 of a motor vehicle according to the fourth embodiment is different from the automatic transmission 40 of the third embodiment as shown in FIGS. 6a, 6b and FIG. 7 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 8b that is identical with that of FIG. 6b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.460, ρ2 is equal to 0.603, and ρ3 is equal to 0.578, the same gear ratios as indicated in FIG. 6b are provided as shown in FIG. 8b. Thus, the automatic transmission 44 of the fourth embodiment operates in substantially the same manner and yields substantially the same effects as that of the third embodiment.

Fifth Embodiment

Figures 10A, 10B:
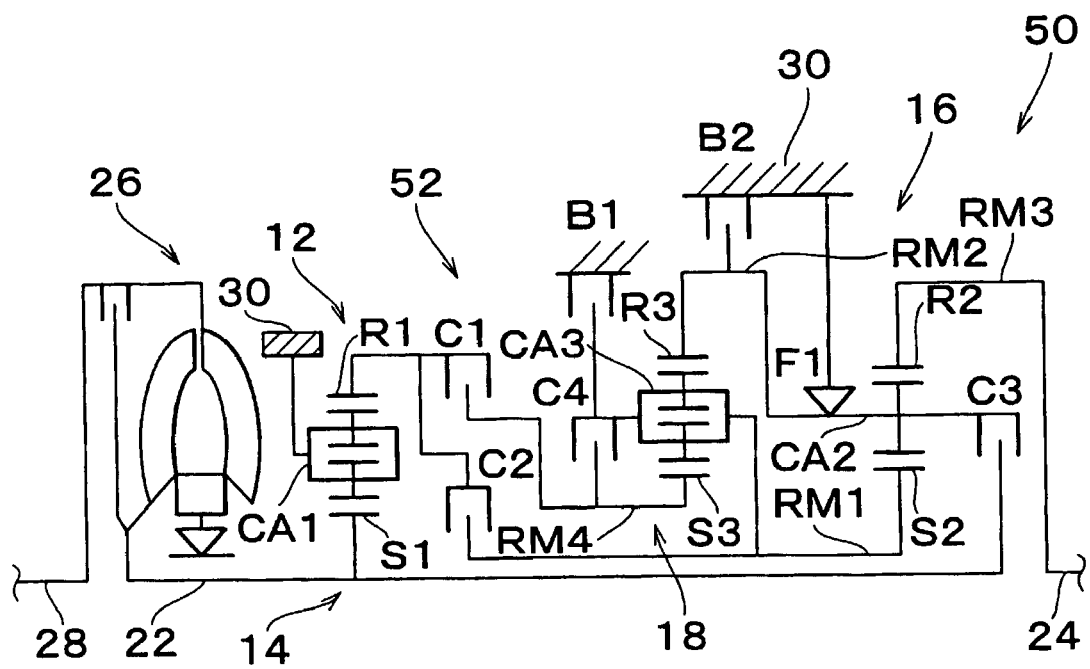
FIG. 10a is a schematic view showing an automatic transmission of a motor vehicle according to a fifth embodiment of the invention.
FIG. 10b is an operation table according to which each gear stage of the automatic transmission of the fifth embodiment as shown in FIG. 10a is established.
Figure 11:
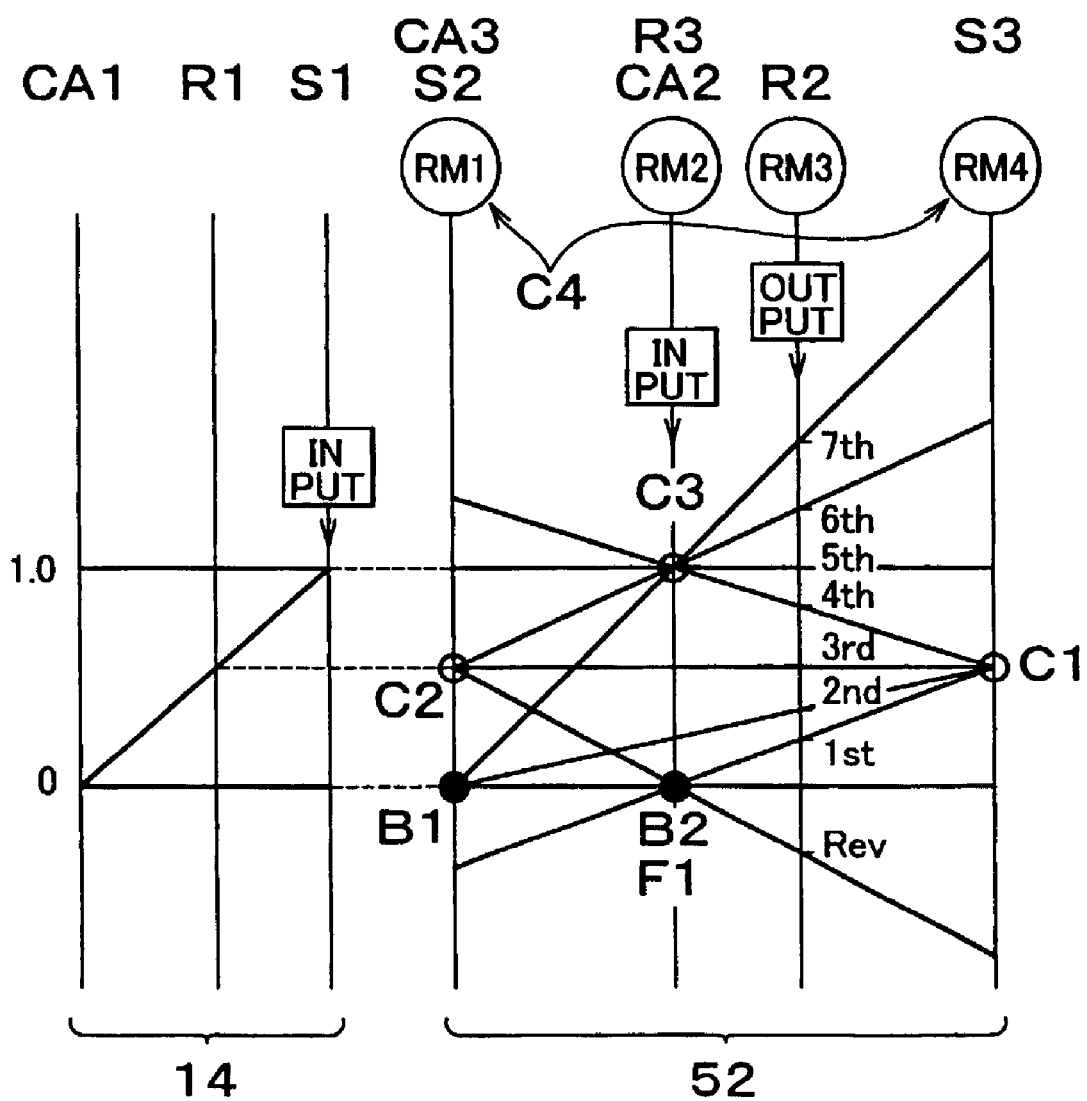
FIG. 11 is a nomogram plotted with respect to the automatic transmission of the fifth embodiment.

Referring next to FIGS. 10a, 10b and FIG. 11, the fourth embodiment of the invention will be described. FIGS. 10a and 10b correspond to FIGS. 1a and 1b, and FIG. 11 corresponds to FIG. 2. An automatic transmission 50 of a motor vehicle according to the fifth embodiment is different from the automatic transmission 10 of the first embodiment as shown in FIGS. 1a, 1b and FIG. 2 in respect of the construction of the second transmitting portion 52. More specifically, the sun gear S2 of the second planetary gear set 16 and the carrier CA3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the sun gear S3 of the third planetary gear set RM3 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other via the clutches C1 to C3, brakes B1 and B2 and the one-way clutch F1 in the same manners as in the first embodiment as shown in FIGS. 1a, 1b and FIG. 2. However, the fourth clutch C4 is provided for selectively coupling the first rotating element RM1 (i.e., sun gear S2 and carrier CA3) to the fourth rotating element RM4 (i.e., sun gear S3) so that these rotating elements RM1, RM4 rotate as a unit.

In this case, too, seven forward gear stages, i.e., the $1^{st}$-speed gear stage through the $7^{th}$-speed gear stage, and one reverse gear stage are established according to the operation table of FIG. 10b that is identical with that of FIG. 1b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.540, ρ2 is equal to 0.603, and ρ3 is equal to 0.422, the same gear ratios as indicated in FIG. 1b are obtained as shown in FIG. 10b. Thus, the automatic transmission 50 of the fifth embodiment operates in substantially the same manner and yields substantially the same effects as that of the first embodiment.

Sixth Embodiment

Figures 12A, 12B:
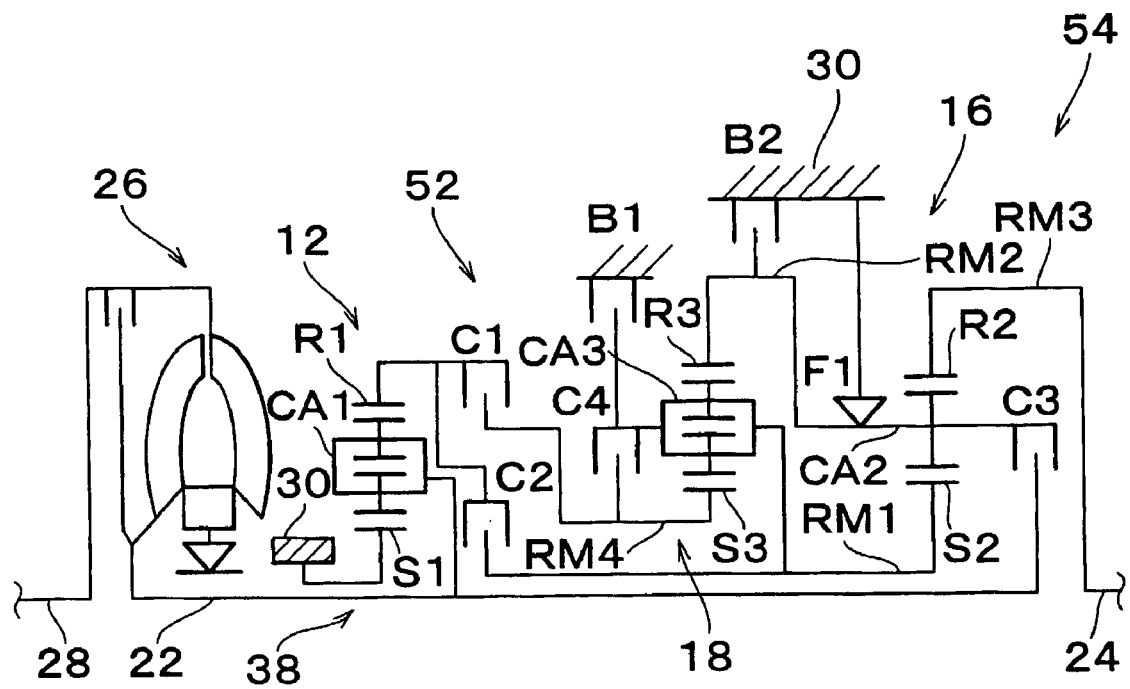
FIG. 12a is a schematic view showing an automatic transmission of a motor vehicle according to a sixth embodiment of the invention.
FIG. 12b is an operation table according to which each gear stage of the automatic transmission of the sixth embodiment as shown in FIG. 12a is established.
Figure 13:
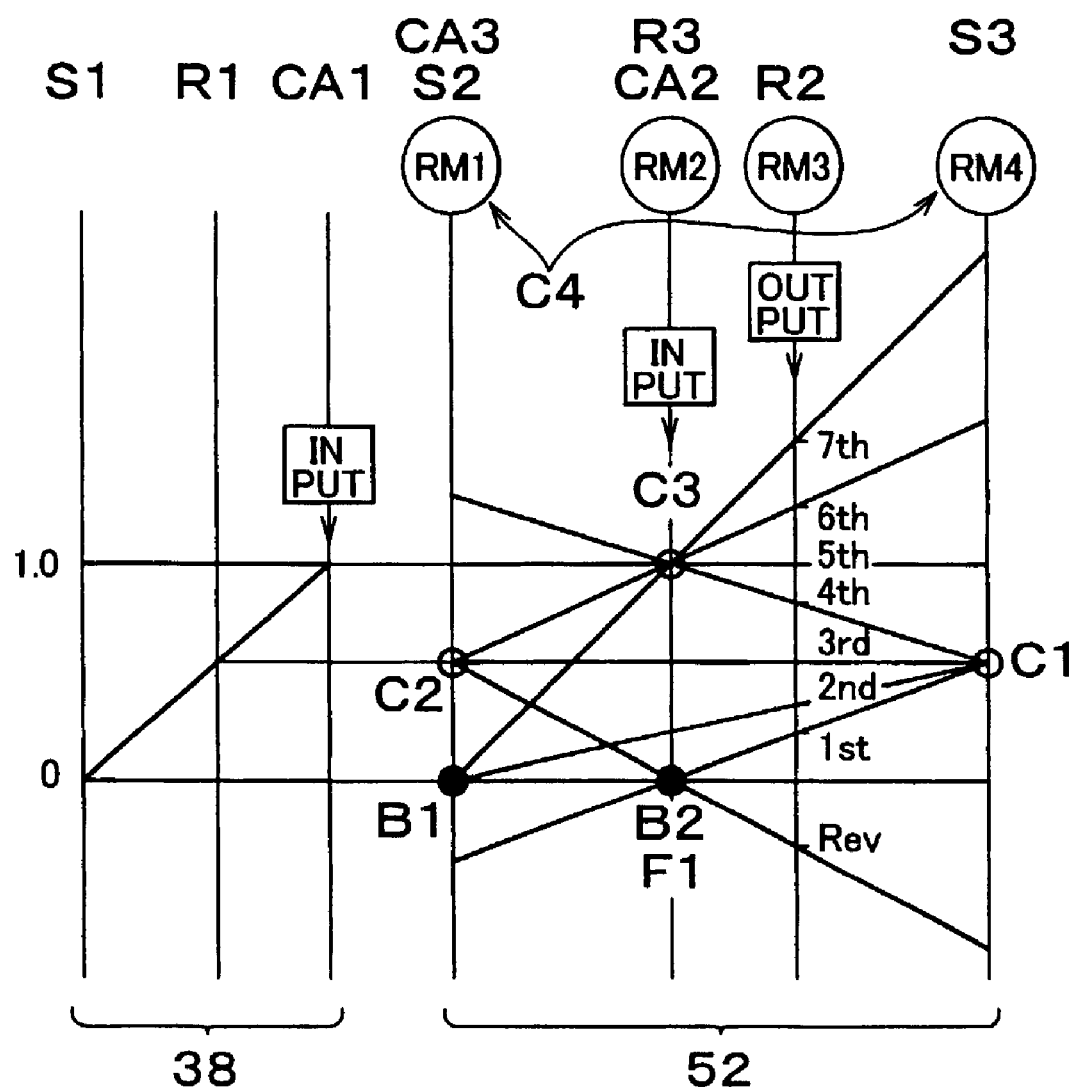
FIG. 13 is a nomogram plotted with respect to the automatic transmission of the sixth embodiment.

Referring next to FIGS. 12a, 12b and FIG. 13, the sixth embodiment of the invention will be described. FIGS. 12a and 12b correspond to FIGS. 1a and 1b, and FIG. 13 corresponds to FIG. 2. An automatic transmission 54 of a motor vehicle according to the sixth embodiment is different from the automatic transmission 50 of the fifth embodiment as shown in FIGS. 10a, 10b and FIG. 11 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 12b that is identical with that of FIG. 10b. The transmission gear ratios of the respective gear stages are suitably determined depending upon the respective gear ratios ρ1, ρ2 and ρ3 of the first, second and third planetary gear sets 12, 13 and 18. For example, if ρ1 is equal to 0.460, ρ2 is equal to 0.603, and ρ3 is equal to 0.422, the same gear ratios as indicated in FIG. 10b are obtained as shown in FIG. 12b. Thus, the automatic transmission 54 of the sixth embodiment operates in substantially the same manner and yields substantially the same effects as that of the fifth embodiment.

The second transmitting portion according to the invention is not limited to those of the first through sixth embodiments, but may employ other coupling arrangements.

In the automatic transmissions of the first through sixth embodiments, the fourth clutch selectively couples two of the first, second, third and fourth rotating elements so that the second transmitting portion rotates as a unit. More specifically, there are six combinations of the selected rotating elements coupled by the fourth clutch, which combinations include: the first rotating element and the second rotating element, the first rotating element and the third rotating element, the first rotating element and the fourth rotating element, the second rotating element and the third rotating element, the second rotating element and the fourth rotating element, and the third rotating element and the fourth rotating element.

Seventh Embodiment

Figures 14A, 14B:
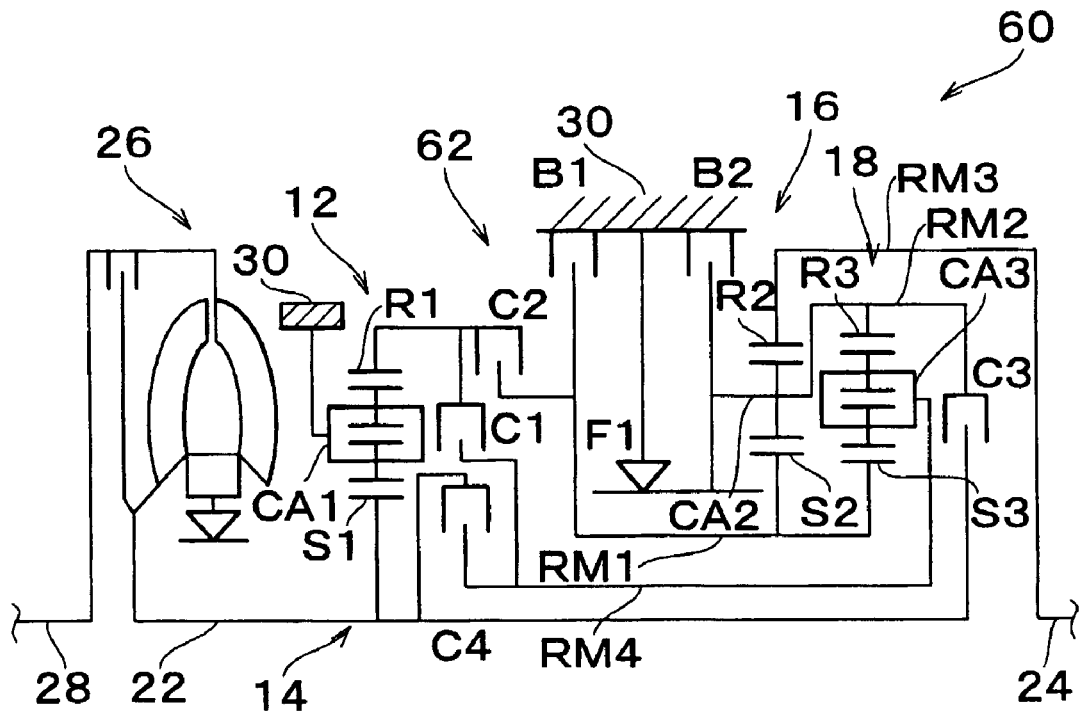
FIG. 14a is a schematic view showing an automatic transmission of a motor vehicle according to a seventh embodiment of the invention.
FIG. 14b is an operation table according to which each gear stage of the automatic transmission of the seventh embodiment as shown in FIG. 14a is established.
Figure 15:
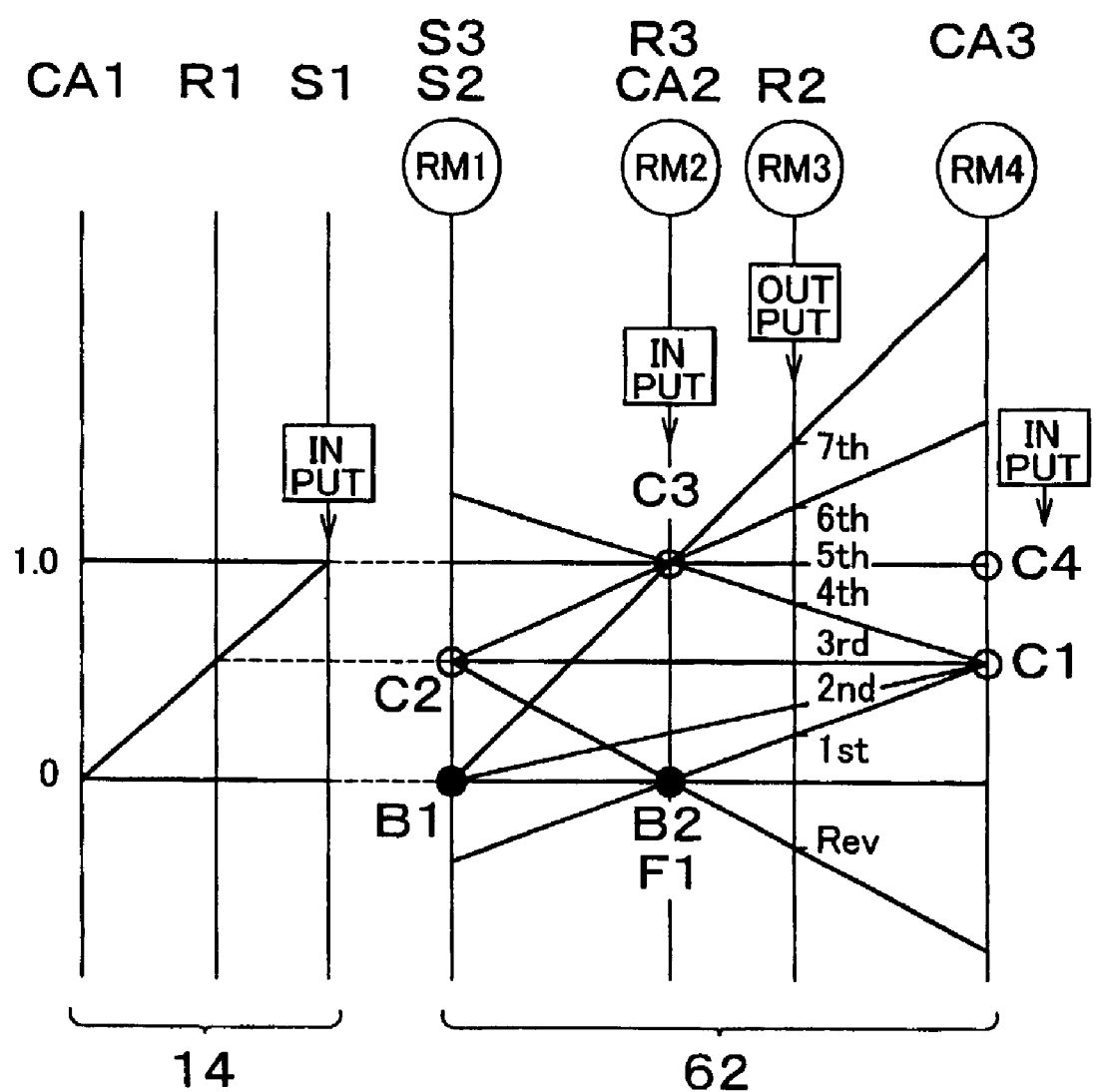
FIG. 15 is a nomogram plotted with respect to the automatic transmission of the seventh embodiment.

Referring next to FIGS. 14a, 14b and FIG. 15, the seventh embodiment of the invention will be described. FIGS. 14a and 14b correspond to FIGS. 1a and 1b, and FIG. 15 corresponds to FIG. 2. An automatic transmission 60 of a motor vehicle according to the seventh embodiment is different from the automatic transmission 10 of the first embodiment as shown in FIGS. 1a, 1b and FIG. 2 in respect of the construction of a second transmitting portion 62. More specifically, the sun gear S2 of the second planetary gear set 16 and the sun gear S3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the carrier CA3 of the third planetary gear set 18 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other via the clutches C1 to C3, brakes B1 and B2 and the one-way clutch F1 in the same manners as in the first embodiment as shown in FIGS. 1a, 1b and FIG. 2. However, the fourth clutch C4 is provided for selectively coupling the fourth rotating element RM4 (i.e., carrier CA3) to the input shaft 22. The fourth clutch C4 cooperates with the third clutch C3 for coupling the second rotating element RM2 (i.e., carrier CA2 and ring gear R3) to the input shaft 22 to cause the second transmitting portion 62 to rotate as a unit with the input shaft 22 so as to establish the $5^{th}$-speed gear stage.

In this case, too, seven forward gear stages, i.e., the $1^{st}$-speed gear stage through the $7^{th}$-speed gear stage, and one reverse gear stage are established according to the operation table of FIG. 14b that is identical with that of FIG. 1b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.540, ρ2 is equal to 0.603, and ρ3 is equal to 0.578, the same gear ratios as indicated in FIG. 1b are obtained as shown in FIG. 14b. Thus, the automatic transmission 60 of the seventh embodiment operates in substantially the, same manner and yields substantially the same effects as that of the first embodiment.

Eighth Embodiment

Figures 16A, 16B:
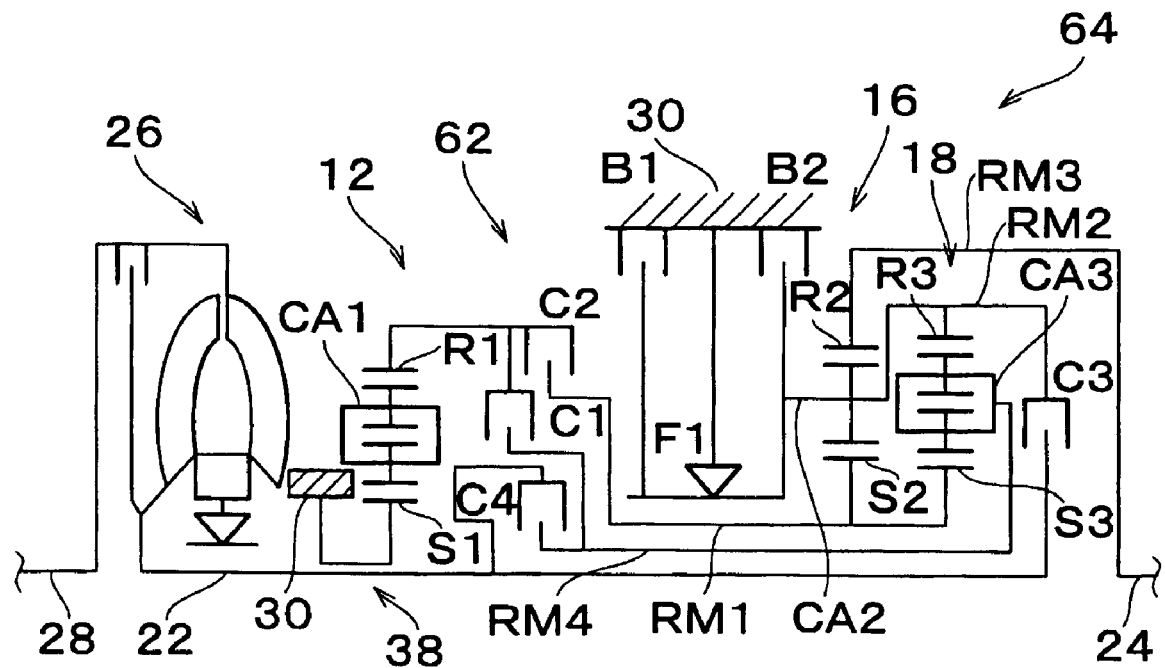
FIG. 16a is a schematic view showing an automatic transmission of a motor vehicle according to an eighth embodiment of the invention.
FIG. 16b is an operation table according to which each gear stage of the automatic transmission of the eighth embodiment as shown in FIG. 16a is established.
Figure 17:
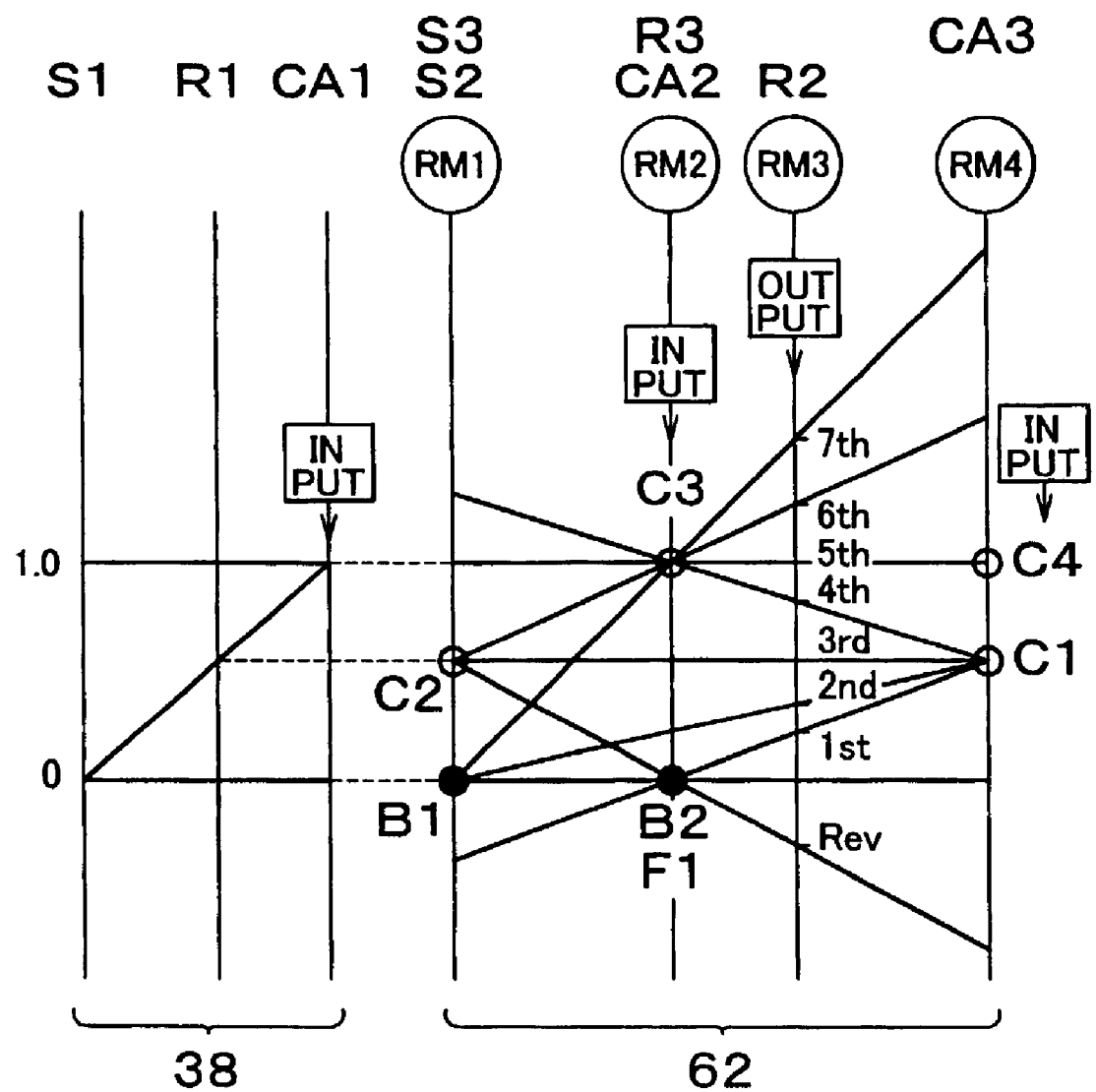
FIG. 17 is a nomogram plotted with respect to the automatic transmission of the eighth embodiment.

Referring next to FIGS. 16a, 16b and FIG. 17, the eighth embodiment of the invention will be described. FIGS. 16a and 16b correspond to FIGS. 1a and 1b, and FIG. 17 corresponds to FIG. 2. An automatic transmission 64 of a motor vehicle according to the eighth embodiment is different from the automatic transmission 60 of the seventh embodiment as shown in FIGS. 14a, 14b and FIG. 15 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 16b that is identical with that of FIG. 14b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.460, ρ2 is equal to 0.603, and ρ3 is equal to 0.578, the same gear ratios as indicated in FIG. 14b are provided as shown in FIG. 16b. Thus, the automatic transmission 64 of the eighth embodiment operates in substantially the same manner and yields substantially the same effects as that of the seventh embodiment.

In the automatic transmissions of the seventh and eighth embodiments, the fourth clutch selectively couples one of the first rotating element, third rotating element and the fourth rotating element to the input member, and cooperates with the third clutch that selectively couples the second rotating member to the input member to cause the second transmitting portion to rotate as a unit with the input member. While the fourth clutch is arranged to selectively couple the fourth rotating element to the input member in, for example, the seventh and eighth embodiments, the fourth clutch may be arranged to selectively couple the first rotating member or the third rotating member to the input member.

Ninth Embodiment

Figures 18A, 18B:
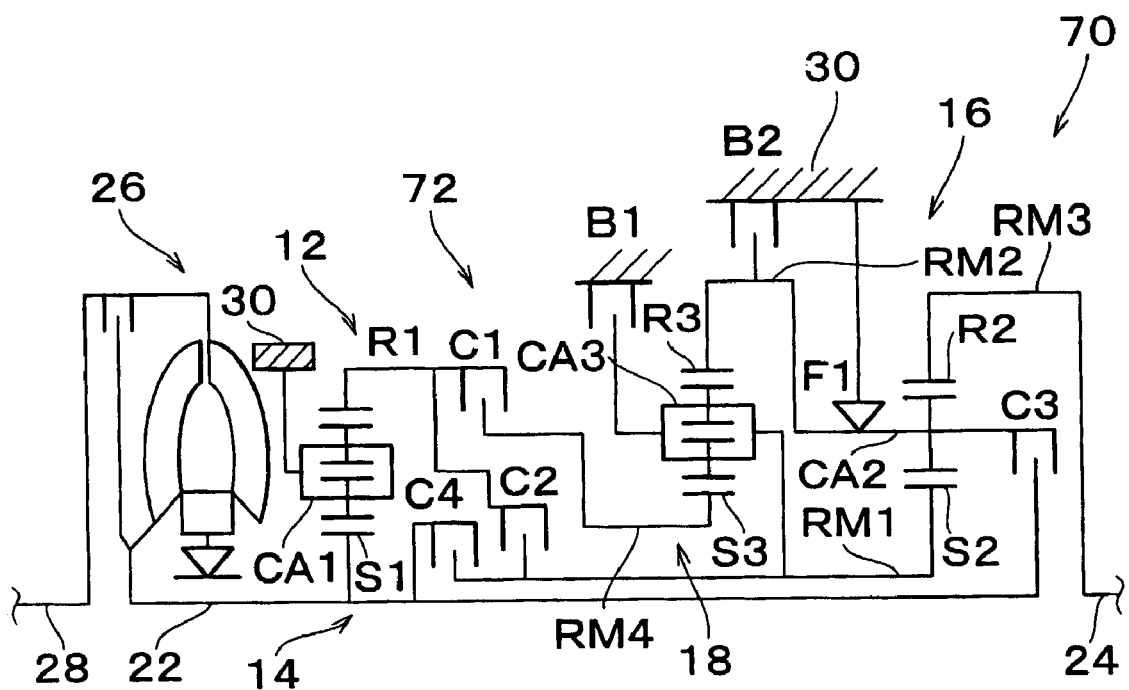
FIG. 18a is a schematic view showing an automatic transmission of a motor vehicle according to a ninth embodiment of the invention.
FIG. 18b is an operation table according to which each gear stage of the automatic transmission of the ninth embodiment as shown in FIG. 18a is established.
Figure 19:
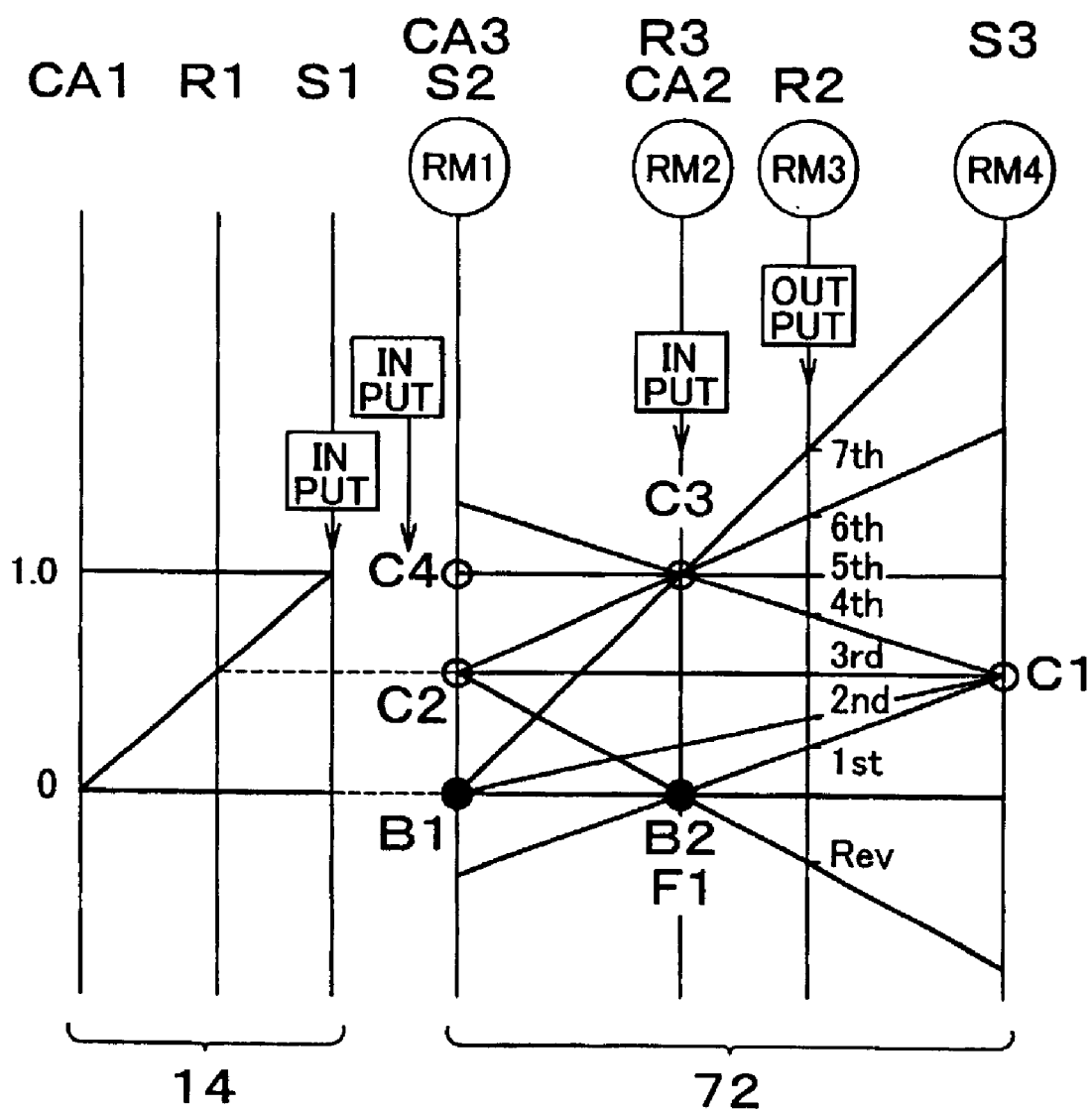
FIG. 19 is a nomogram plotted with respect to the automatic transmission of the ninth embodiment.

Referring next to FIGS. 18a, 18b and FIG. 19, the ninth embodiment of the invention will be described. FIGS. 18a and 18b correspond to FIGS. 1a and 1b, and FIG. 19 corresponds to FIG. 2. An automatic transmission 70 of a motor vehicle according to the ninth embodiment is different from the automatic transmission 10 of the first embodiment as shown in FIGS. 1a, 1b and FIG. 2 in respect of the construction of a second transmitting portion 72. More specifically, the sun gear S2 of the second planetary gear set 16 and the carrier CA3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the sun gear S3 of the third planetary gear set 18 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other via the clutches C1 to C3, brakes B1 and B2 and the one-way clutch F1 in the same manners as in the first embodiment as shown in FIGS. 1a, 1b and FIG. 2. However, the fourth clutch C4 is provided for selectively coupling the first rotating element RM1 (i.e., sun gear S2 and carrier CA3) to the input shaft 22. The fourth clutch C4 cooperates with the third clutch C3 for coupling the second rotating element RM2 (i.e., carrier CA2 and ring gear R3) to the input shaft 22 to cause the second transmitting portion 62 to rotate as a unit with the input shaft 22 so as to establish the 5$^{th}$-speed gear stage.

In this case, too, seven forward gear stages, i.e., the 1$^{st}$-speed gear stage through the 7$^{th}$-speed gear stage, and one reverse gear stage are established according to the operation table of FIG. 18b that is identical with that of FIG. 1b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.540, ρ2 is equal to 0.603, and ρ3 is equal to 0.422, the same gear ratios as indicated in FIG. 1b are provided as shown in FIG. 18b. Thus, the automatic transmission 70 of the ninth embodiment operates in substantially the same manner and yields substantially the same effects as that of the first embodiment.

In this embodiment, another reverse gear stage for high speed, having a smaller gear ratio, can be established by engaging the fourth clutch C4 and the second brake B2.

Tenth Embodiment

Figures 20A, 20B:
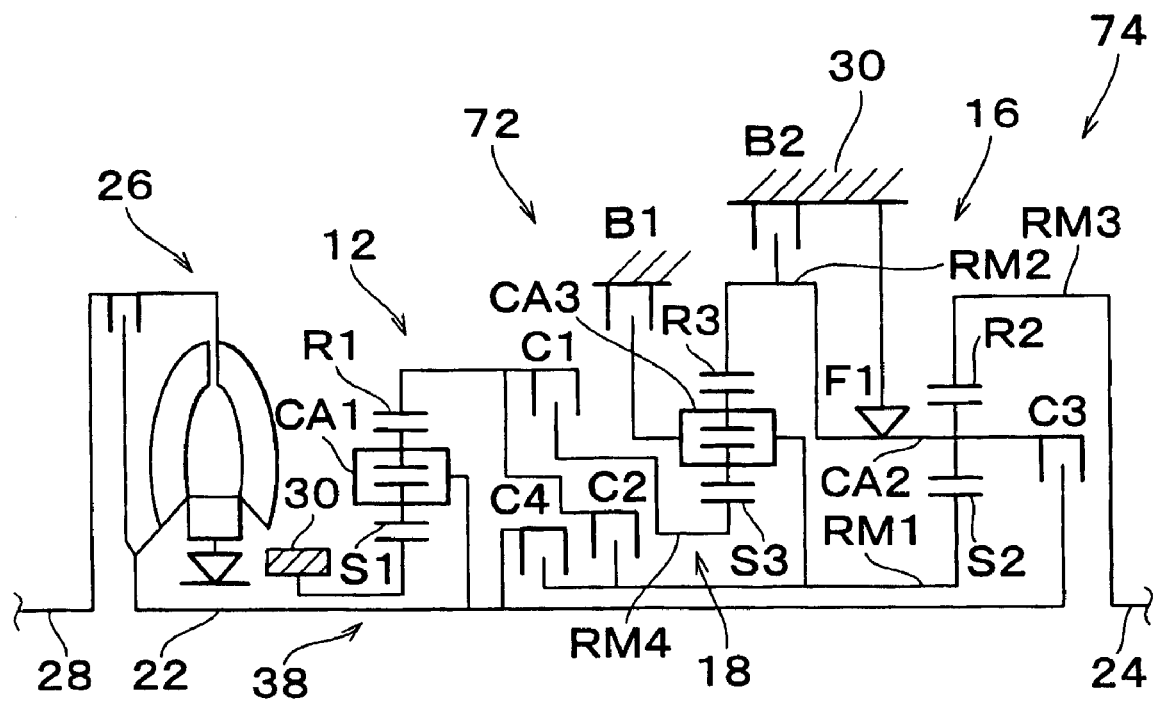
FIG. 20a is a schematic view showing an automatic transmission of a motor vehicle according to a tenth embodiment of the invention.
FIG. 20b is an operation table according to which each gear stage of the automatic transmission of the tenth embodiment as shown in FIG. 20a is established.
Figure 21:
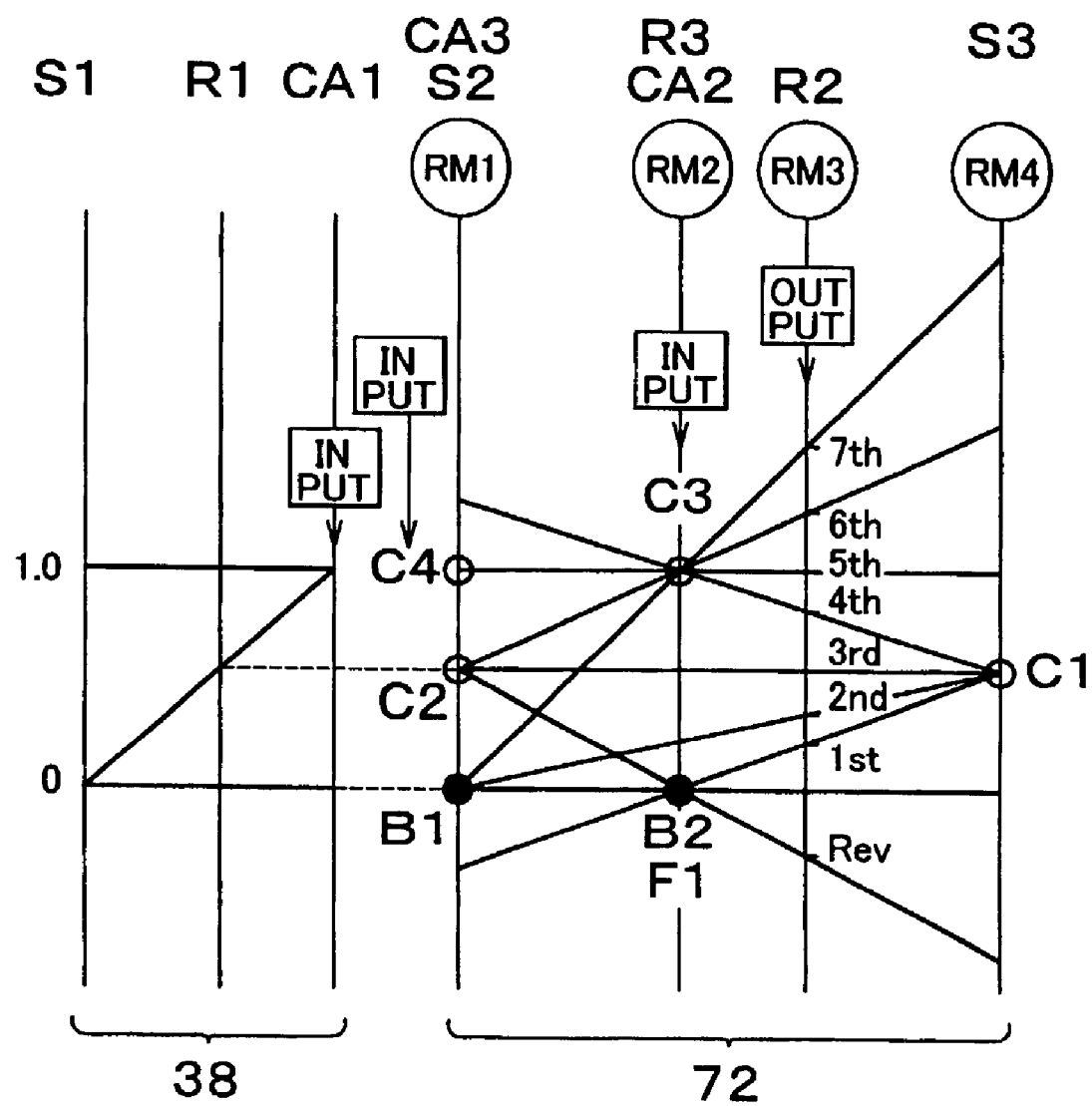
FIG. 21 is a nomogram plotted with respect to the automatic transmission of the tenth embodiment.

Referring next to FIGS. 20a, 20b and FIG. 21, the tenth embodiment of the invention will be described. FIGS. 20a and 20b correspond to FIGS. 1a and 1b, and FIG. 21 corresponds to FIG. 2. An automatic transmission 74 of a motor vehicle according to the tenth embodiment is different from the automatic transmission 70 of the ninth embodiment as shown in FIGS. 18a, 18b and FIG. 19 in that the first transmitting portion 38 as described above with respect to the second embodiment is used in place of the first transmitting portion 14.

In this case, too, seven forward gear stages, i.e., the 1$^{st}$-speed gear stage through the 7$^{th}$-speed gear stage, and one reverse gear stage are established according to the operation table of FIG. 20b that is identical with that of FIG. 18b. The gear ratios of the respective gear stages are suitably determined depending upon the respective gear ratios ρ1, ρ2 and ρ3 of the first, second and third planetary gear sets 12, 16 and 18. For example, if ρ1 is equal to 0.460, ρ2 is equal to 0.603, and ρ3 is equal to 0.422, the same gear ratios as indicated in FIG. 18b are provided as shown in FIG. 20b. Thus, the automatic transmission 74 of the tenth embodiment operates in substantially the same manner and yields substantially the same effects as that of the ninth embodiment.

In this embodiment, too, another reverse gear stage for high speed, having a smaller gear ratio, may be established by engaging the fourth clutch C4 and the second brake B2.

While the fourth clutch is arranged to selectively couple the first rotating element to the input member in, for example, the ninth and tenth embodiments, the fourth clutch may be arranged to selectively couple the third rotating member or the fourth rotating element to the input member.

In the automatic transmissions of the ninth and tenth embodiments, the fourth clutch is arranged to selectively couple the first rotating element to the input member. However, the invention is not limited to this arrangement, but may be modified provided that the fourth clutch selectively couples the first or third rotating element to the input member, and cooperates with the third clutch that couples the second rotating element to the input member to cause the second transmitting portion to rotate as a unit with the input member. Thus, the fourth clutch may be arranged to selectively couple the third rotating element to the input member.

Eleventh Embodiment

Figures 22A, 22B:
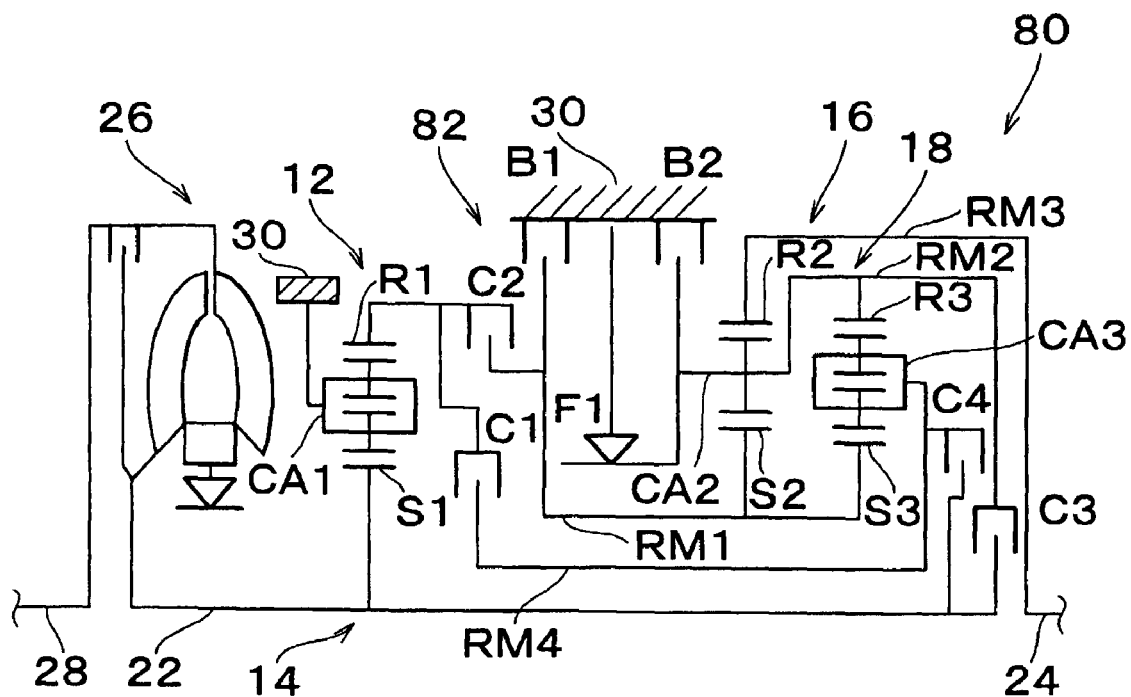
FIG. 22a is a schematic view showing an automatic transmission of a motor vehicle according to an eleventh embodiment of the invention.
FIG. 22b is an operation table according to which each gear stage of the automatic transmission of the eleventh embodiment as shown in FIG. 22a is established.
Figure 23:
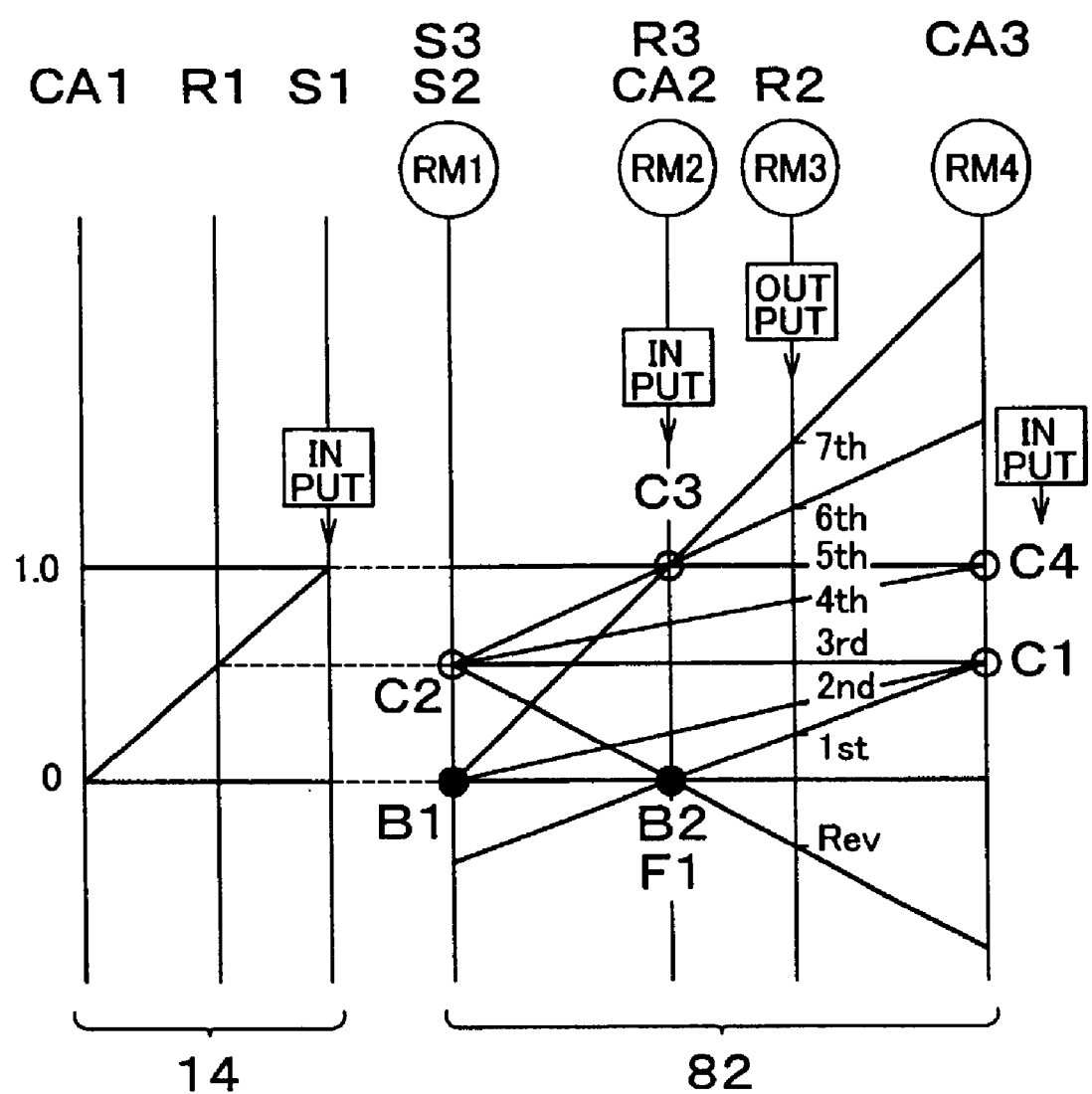
FIG. 23 is a nomogram plotted with respect to the automatic transmission of the eleventh embodiment.

Referring next to FIGS. 22a, 22b and FIG. 23, the eleventh embodiment of the invention will be described. FIGS. 22a and 22b correspond to FIGS. 1a and 1b, and FIG. 23 corresponds to FIG. 2. An automatic transmission 80 of a motor vehicle according to the eleventh embodiment is different from the automatic transmission 10 of the first embodiment as shown in FIGS. 1a, 1b and FIG. 2 in respect of the construction of a second transmitting portion 82. More specifically, the sun gear S2 of the second planetary gear set 16 and the sun gear S3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the carrier CA3 of the third planetary gear set 18 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other through the clutches C1 to C3, brakes B1 and B2 and the one-way clutch F1 in the same manners as in the first embodiment as shown in FIGS. 1a, 1b and FIG. 2. However, the fourth clutch C4 is provided for selectively coupling the fourth rotating element RM4 (i.e., carrier CA3) to the input shaft 22. The fourth clutch C4 cooperates with the third clutch C3 for coupling the second rotating element RM2 (i.e., carrier CA2 and ring gear R3) to the input shaft 22 to cause the second transmitting portion 82 to rotate as a unit with the input shaft 22 so as to establish the 5$^{th}$-speed gear stage.

In this case, too, seven forward gear stages, i.e., the 1$^{st}$-speed gear stage through the 7$^{th}$-speed gear stage, and one reverse gear stage are established according to the operation table of FIG. 22b. In this embodiment, the 4th-speed gear stage is established when the second clutch C2 and the fourth clutch C4 are engaged, and the first rotating element RM1 is rotated at a reduced speed via the first transmitting portion 14, while the fourth rotating element RM4 rotates as a unit with the input shaft 22. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.510, ρ2 is equal to 0.550, and ρ3 is equal to 0.608, the gear ratios as indicated in FIG. 22b are provided. As is understood from FIG. 22b, the step value of the gear ratios, namely, the ratio of the gear ratios of the adjacent gear stages is generally appropriate, and the total width of the gear ratios, namely, the ratio of the largest gear ratio to the smallest gear ratio (=5.495/0.645), is a sufficiently large value (which is about 8.518). In addition, the reverse gear stage has an appropriate gear ratio. Thus, the automatic transmission 80 provides appropriate speed-change characteristics over the entire range of operation.

With the automatic transmission 80 of the eleventh embodiment, the seven forward gear stages are provided by three planetary gear sets 12, 16, 18, four clutches C1–C4 and two brakes B1, B2. Thus, the automatic transmission 80 is made light-weight and compact, and can be more easily installed on the vehicle, as compared with the case where four planetary gear sets are used. Furthermore, since shifting from one speed to another speed is accomplished by only changing the combination of two of the clutches C1–C4 and the brakes B1, B2 to be engaged, as is understood from FIG. 22b, shift control can be easily performed, and shift shocks are advantageously reduced.

By setting the gear ratios $\rho 1$, $\rho 2$ and $\rho 3$ of the three planetary gear units 12, 16 and 18 to be within a range of about 0.3 to 0.6, the automatic transmission 80 is able to provide appropriate speed-change characteristics over the entire range of operation as shown in FIG. 22b while keeping the size (or diameter) of the planetary gear sets 12, 16, 18 relatively small.

Twelfth Embodiment

Figures 24A, 24B:
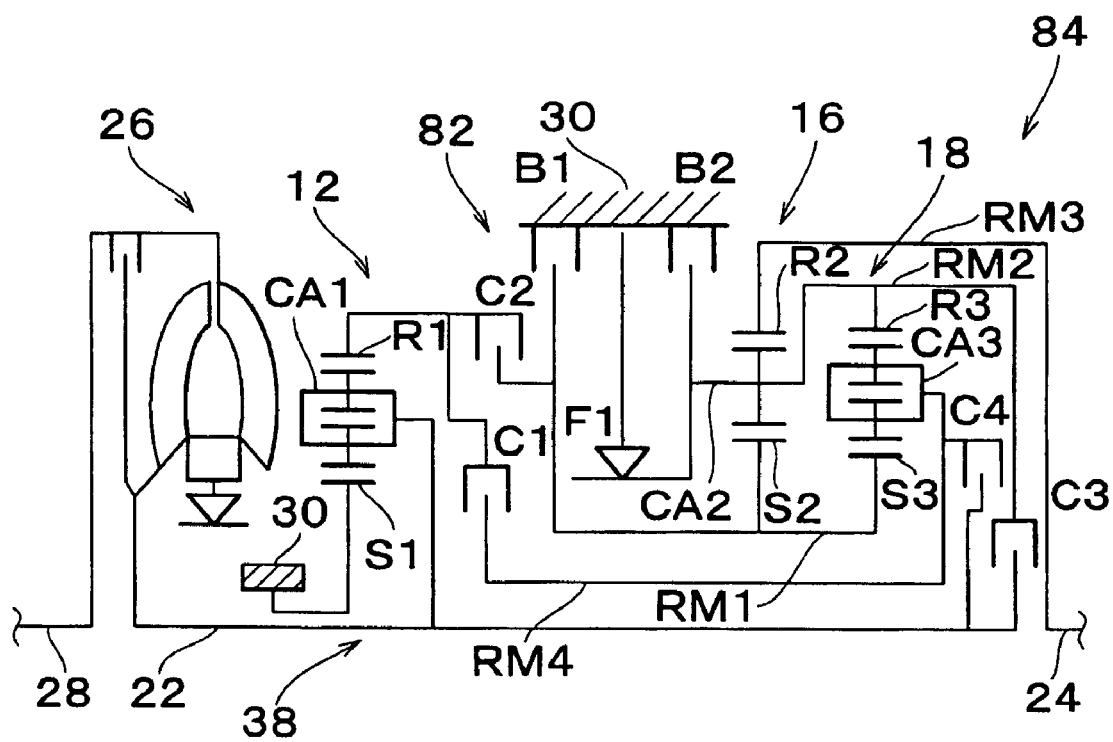
FIG. 24a is a schematic view showing an automatic transmission of a motor vehicle according to a twelfth embodiment of the invention.
FIG. 24b is an operation table according to which each gear stage of the automatic transmission of the twelfth embodiment as shown in FIG. 24a is established.
Figure 25:
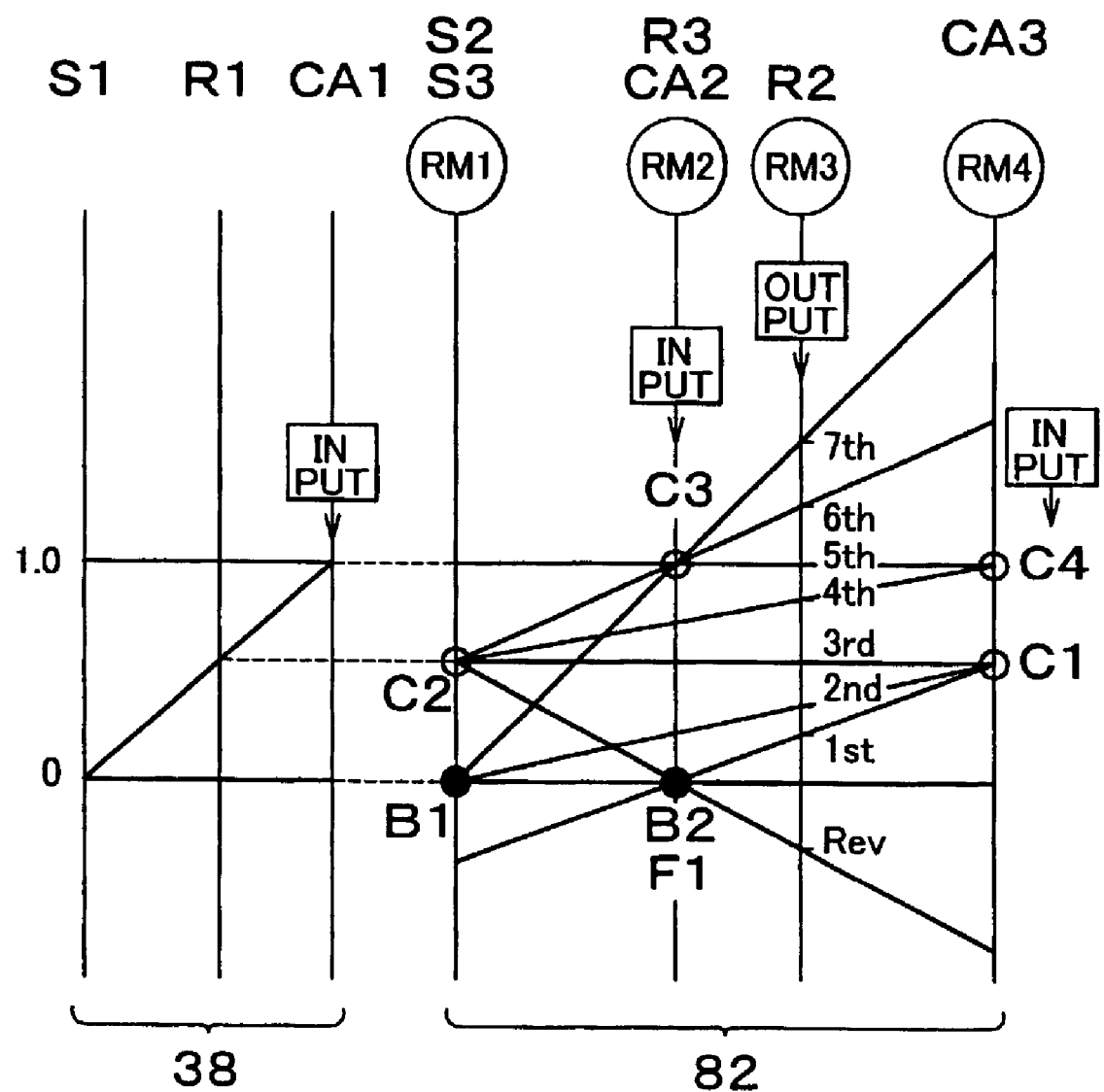
FIG. 25 is a nomogram plotted with respect to the automatic transmission of the twelfth embodiment.

Referring next to FIGS. 24a, 24b and FIG. 25, the twelfth embodiment of the invention will be described. FIGS. 24a and 24b correspond to FIGS. 1a and 1b, and FIG. 25 corresponds to FIG. 2. An automatic transmission 84 of a motor vehicle according to the twelfth embodiment is different from the automatic transmission 80 of the eleventh embodiment as shown in FIGS. 22a, 22b and FIG. 23 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 24b that is identical with that of FIG. 22b. The transmission gear ratios of the respective gear stages are suitably determined depending upon the respective gear ratios $\rho 1$, $\rho 2$ and $\rho 3$ of the first, second and third planetary gear sets 12, 16 and 18. For example, if $\rho 1$ is equal to 0.490, $\rho 2$ is equal to 0.550, and $\rho 3$ is equal to 0.355, the same gear ratios as indicated in FIG. 22b are obtained as shown in FIG. 24b. Thus, the automatic transmission 84 of the twelfth embodiment operates in substantially the same manner and yields substantially the same effects as that of the eleventh embodiment.

Thirteenth Embodiment

Figures 26A, 26B:
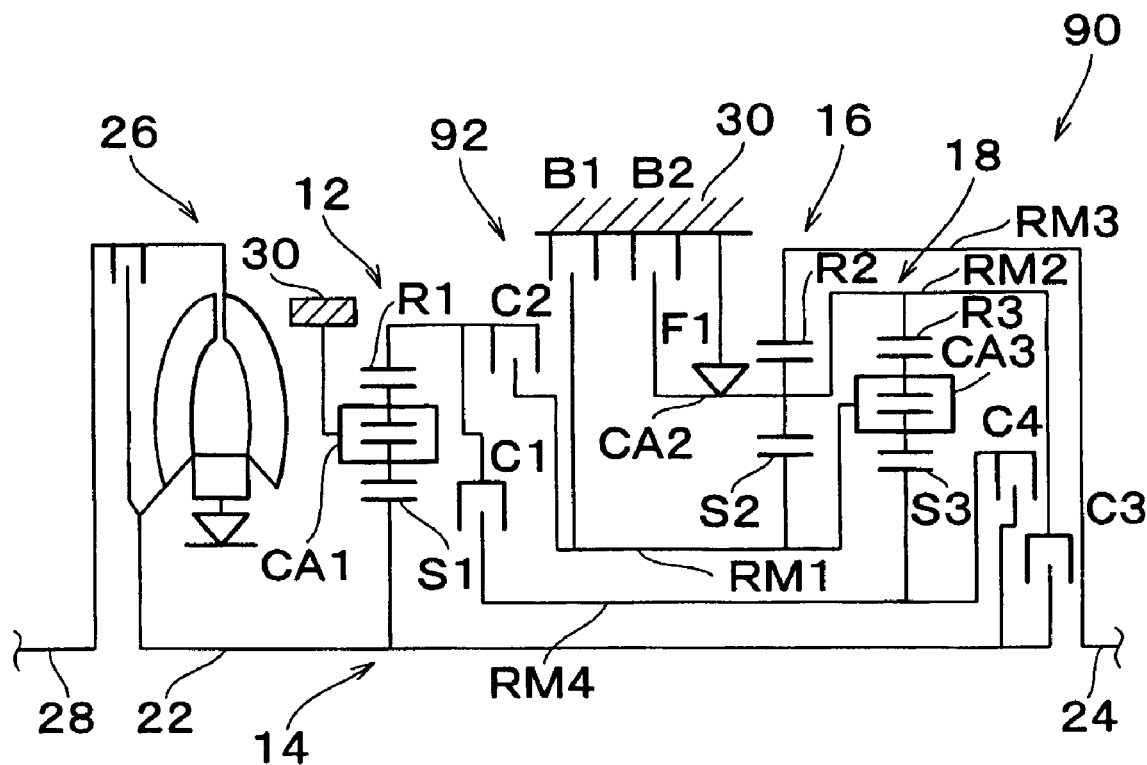
FIG. 26a is a schematic view showing an automatic transmission of a motor vehicle according to a thirteenth embodiment of the invention.
FIG. 26b is an operation table according to which each gear stage of the automatic transmission of the twelfth embodiment as shown in FIG. 26a is established.
Figure 27:
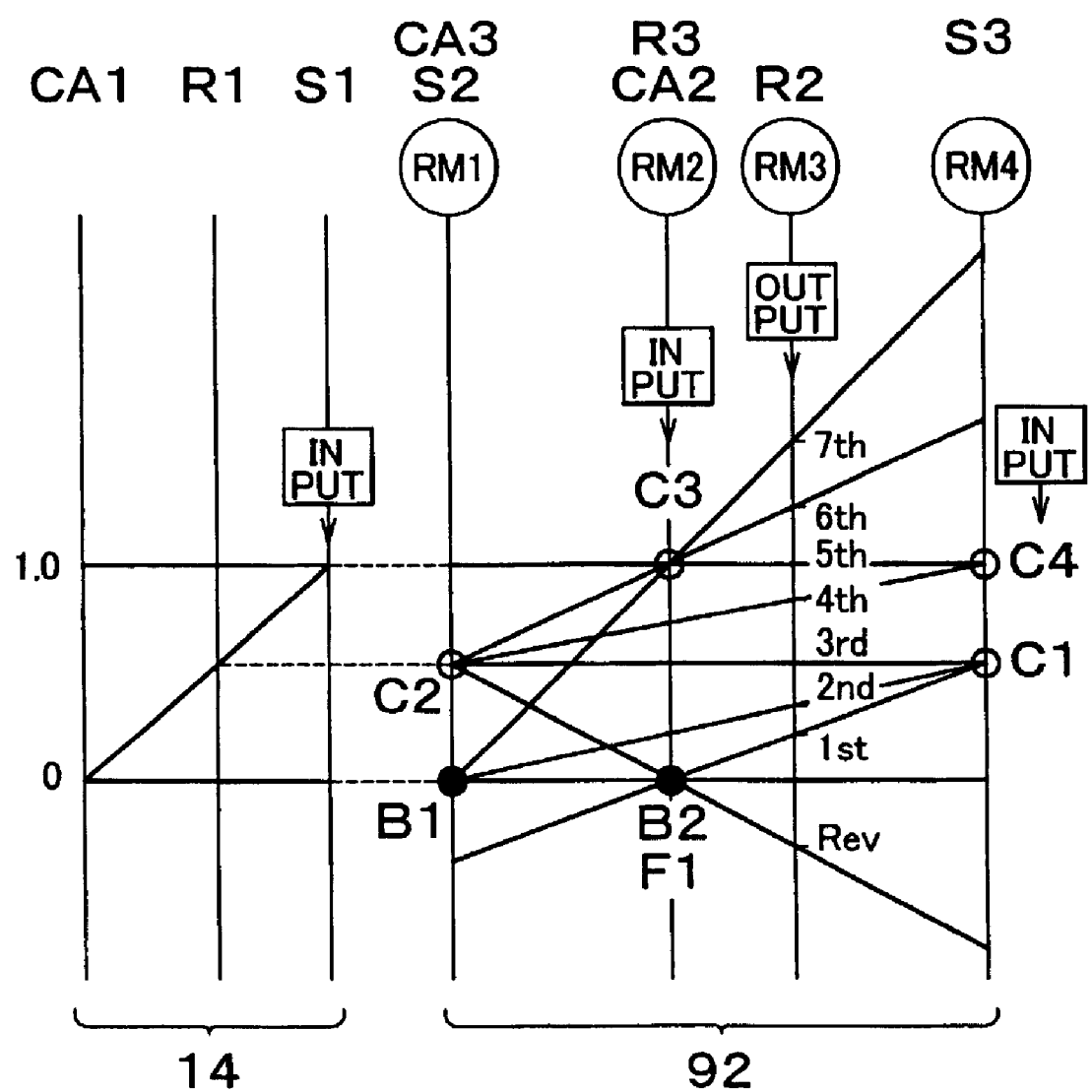
FIG. 27 is a nomogram plotted with respect to the automatic transmission of the thirteenth embodiment.

Referring next to FIGS. 26a, 26b and FIG. 27, the thirteenth embodiment of the invention will be described. FIGS. 26a and 26b correspond to FIGS. 1a and 1b, and FIG. 27 corresponds to FIG. 2. An automatic transmission 90 of a motor vehicle according to the thirteenth embodiment is different from the automatic transmission 80 of the eleventh embodiment as shown in FIGS. 22a, 22b and FIG. 23 in respect of the construction of a second transmitting portion 92. More specifically, the sun gear S2 of the second planetary gear set 16 and the carrier CA3 of the third planetary gear set 18 are coupled to each other to provide the first rotating element RM1, and the carrier CA2 of the second planetary gear set 16 and the ring gear R3 of the third planetary gear set 18 are coupled to each other to provide the second rotating element RM2. The ring gear R2 of the second planetary gear set 16 provides the third rotating element RM3, and the sun gear S3 of the third planetary gear set 18 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other through the clutches C1 to C4, brakes B1 and B2 and the one-way clutch F1 in the same manners as in the eleventh embodiment as shown in FIGS. 22a, 22b and FIG. 23.

In this case, too, seven forward gear stages, i.e., the $1^{st}$-speed gear stage through the $7^{th}$-speed gear stage, and one reverse gear stage are established according to the operation table of FIG. 26b that is identical with that of FIG. 22b. The transmission gear ratios of the respective gear stages are suitably determined depending upon the respective gear ratios $\rho 1$, $\rho 2$ and $\rho 3$ of the first, second and third planetary gear sets 12, 16 and 18. For example, if $\rho 1$ is equal to 0.510, $\rho 2$ is equal to 0.550, and $\rho 3$ is equal to 0.392, the same gear ratios as indicated in FIG. 22b are provided as shown in FIG. 26b. Thus, the automatic transmission 90 of the thirteenth embodiment operates in substantially the same manner and yields substantially the same effects as that of the eleventh embodiment.

Fourteenth Embodiment

Figures 28A, 28B:
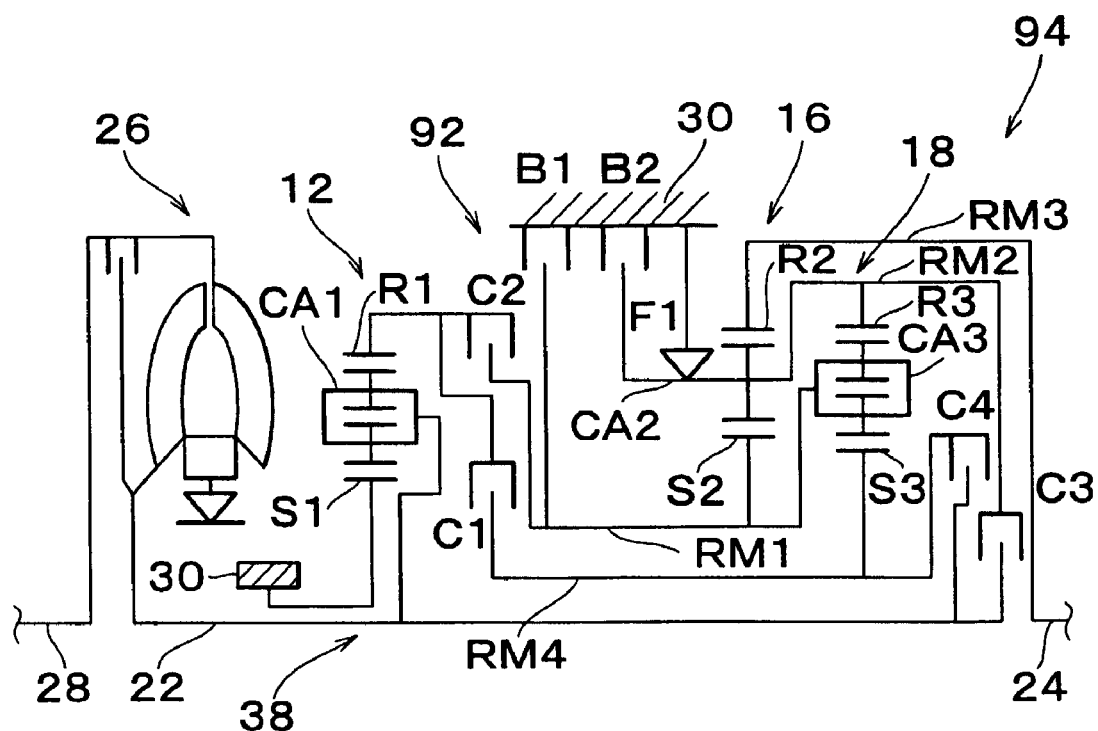
FIG. 28a is a schematic view showing an automatic transmission of a motor vehicle according to a fourteenth embodiment of the invention.
FIG. 28b is an operation table according to which each gear stage of the automatic transmission of the fourteenth embodiment as shown in FIG. 28a is established.
Figure 29:
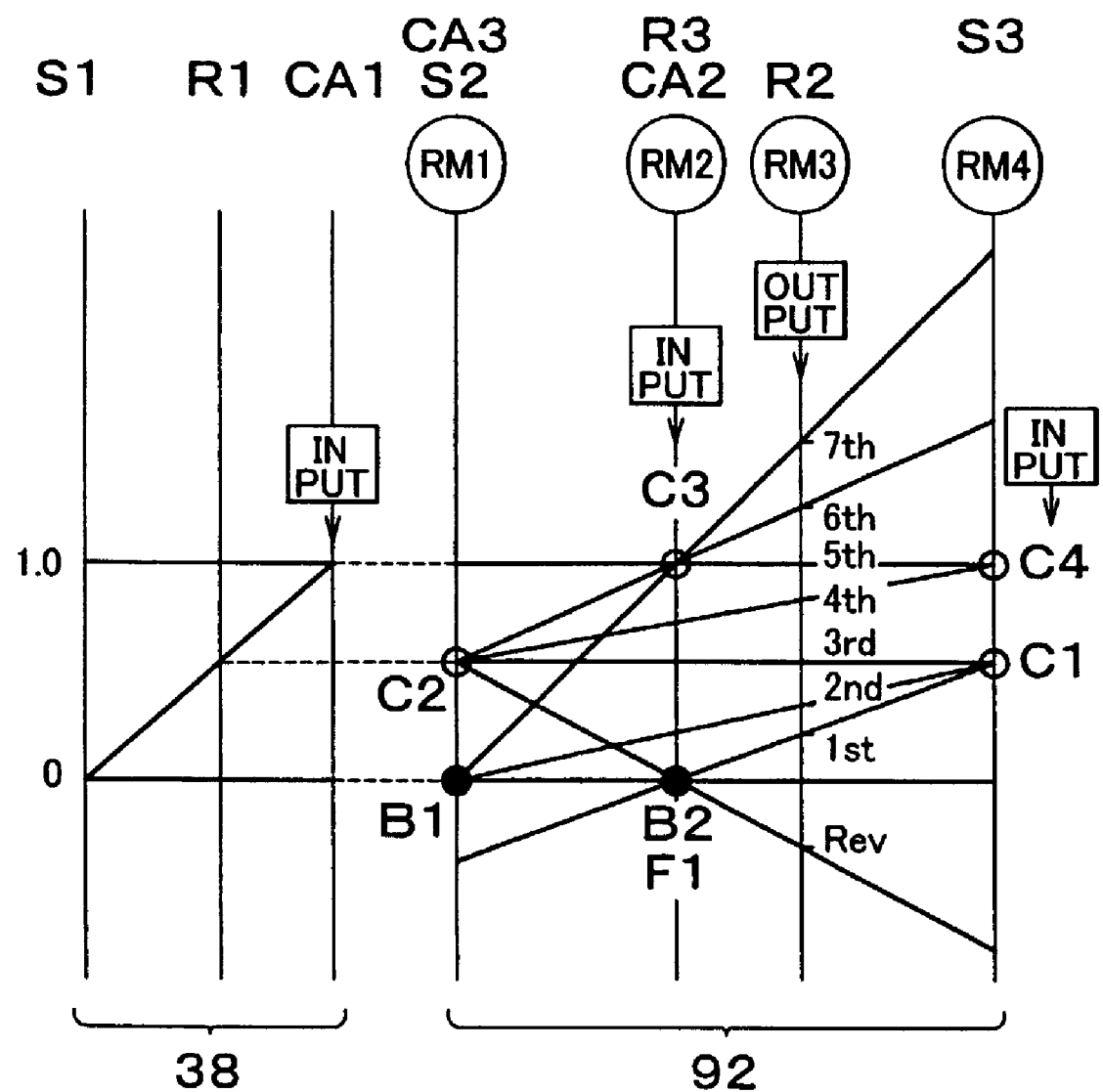
FIG. 29 is a nomogram plotted with respect to the automatic transmission of the fourteenth embodiment.

Referring next to FIGS. 28a, 28b and FIG. 29, the fourteenth embodiment of the invention will be described. FIGS. 28a and 28b correspond to FIGS. 1a and 1b, and FIG. 29 corresponds to FIG. 2. An automatic transmission 94 of a motor vehicle according to the fourteenth embodiment is different from the automatic transmission 90 of the thirteenth embodiment as shown in FIGS. 26a, 26b and FIG. 27 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 28b that is identical with that of FIG. 26b. The transmission gear ratios of the respective gear stages are suitably determined depending upon the respective gear ratios $\rho 1$, $\rho 2$ and $\rho 3$ of the first, second and third planetary gear sets 12, 16 and 18. For example, if $\rho 1$ is equal to 0.490, $\rho 2$ is equal to 0.550, and $\rho 3$ is equal to 0.392, the same gear ratios as indicated in FIG. 26b are obtained as shown in FIG. 28b. Thus, the automatic transmission 94 of the fourteenth embodiment operates in substantially the same manner and yields substantially the same effects as that of the thirteenth embodiment.

Fifteenth Embodiment

Figures 30A, 30B:
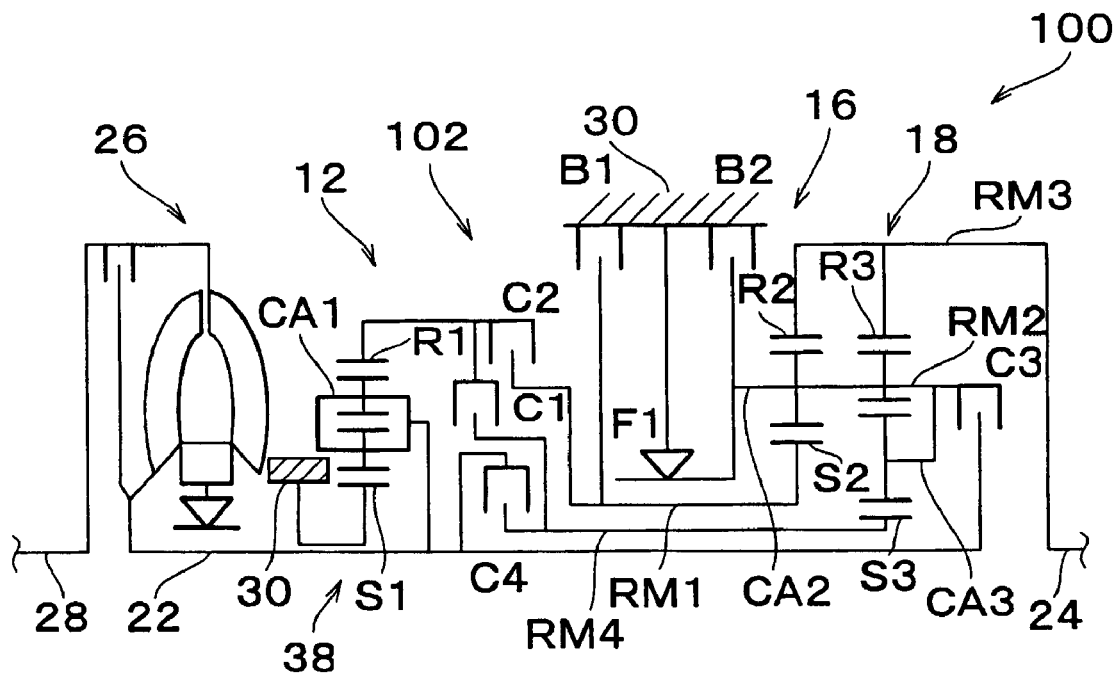
FIG. 30a is a schematic view showing an automatic transmission of a motor vehicle according to the fifteenth embodiment of the invention.
FIG. 30b is an operation table according to which each gear stage of the automatic transmission of a fifteenth embodiment as shown in FIG. 30a is established.
Figure 31:
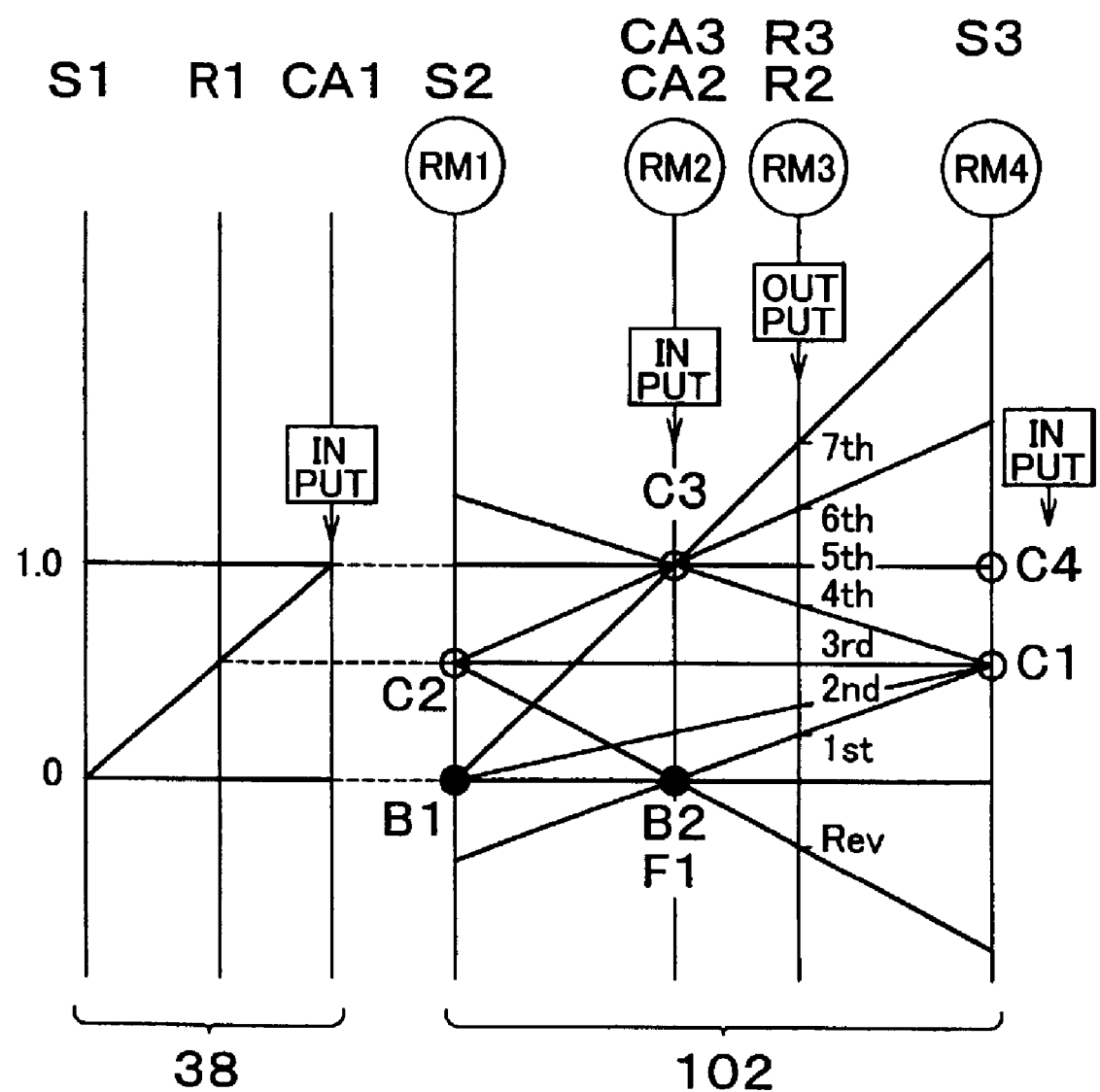
FIG. 31 is a nomogram plotted with respect to the automatic transmission of the fifteenth embodiment.

Referring next to FIGS. 30a, 30b and FIG. 31, the fifteenth embodiment of the invention will be described. FIGS. 30a and 30b correspond to FIGS. 1a and 1b, and FIG. 31 corresponds to FIG. 2. An automatic transmission 100 of a motor vehicle according to the fifteenth embodiment is different from the automatic transmission 36 of the second embodiment as shown in FIGS. 4a, 4b and FIG. 5 in respect of the construction of a second transmitting portion 102. More specifically, the fourth clutch C4 is provided for selectively coupling the fourth rotating element RM4 (i.e., sun gear S3) to the input shaft 22. The fourth clutch C4 cooperates with the third clutch C3 that couples the second rotating element RM2 (i.e., carriers CA2, CA3) to the input shaft 22 to cause the second transmitting portion 102 to rotate as a unit with the input shaft 22, so that the $5^{th}$-speed gear stage is established.

In this case, too, seven forward gear stages, i.e., the $1^{st}$-speed gear stage through the $7^{th}$-speed gear stage, and one reverse gear stage are established according to the operation table of FIG. 30b that is identical with that of FIG. 4b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.460, ρ2 is equal to 0.603, and ρ3 is equal to 0.439, the same gear ratios as indicated in FIG. 4b are provided as shown in FIG. 30b. Thus, the automatic transmission 100 of the fifteenth embodiment operates in substantially the same manner and yields substantially the same effects as that of the second embodiment.

The automatic transmission 100 may be modified as in the modified example of the first embodiment as shown in FIG. 3 such that the second transmitting portion 102 takes the form of a Ravigneaux type planetary gear train.

While the fourth clutch is arranged to selectively couple the fourth rotating element to the input member in the fifteenth embodiment, the fourth clutch may be arranged to selectively couple the first or third rotating element to the input member.

Sixteenth Embodiment

Figures 32A, 32B:
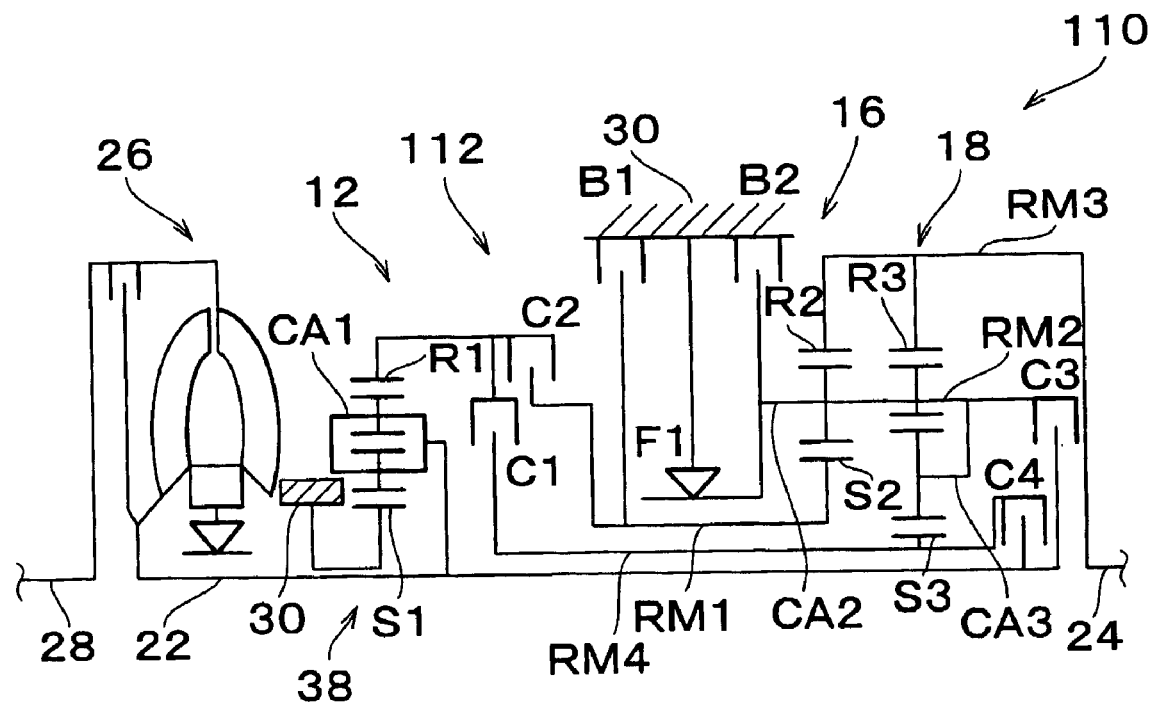
FIG. 32a is a schematic view showing an automatic transmission of a motor vehicle according to a sixteenth embodiment of the invention.
FIG. 32b is an operation table according to which each gear stage of the automatic transmission of the sixteenth embodiment as shown in FIG. 32a is established.
Figure 33:
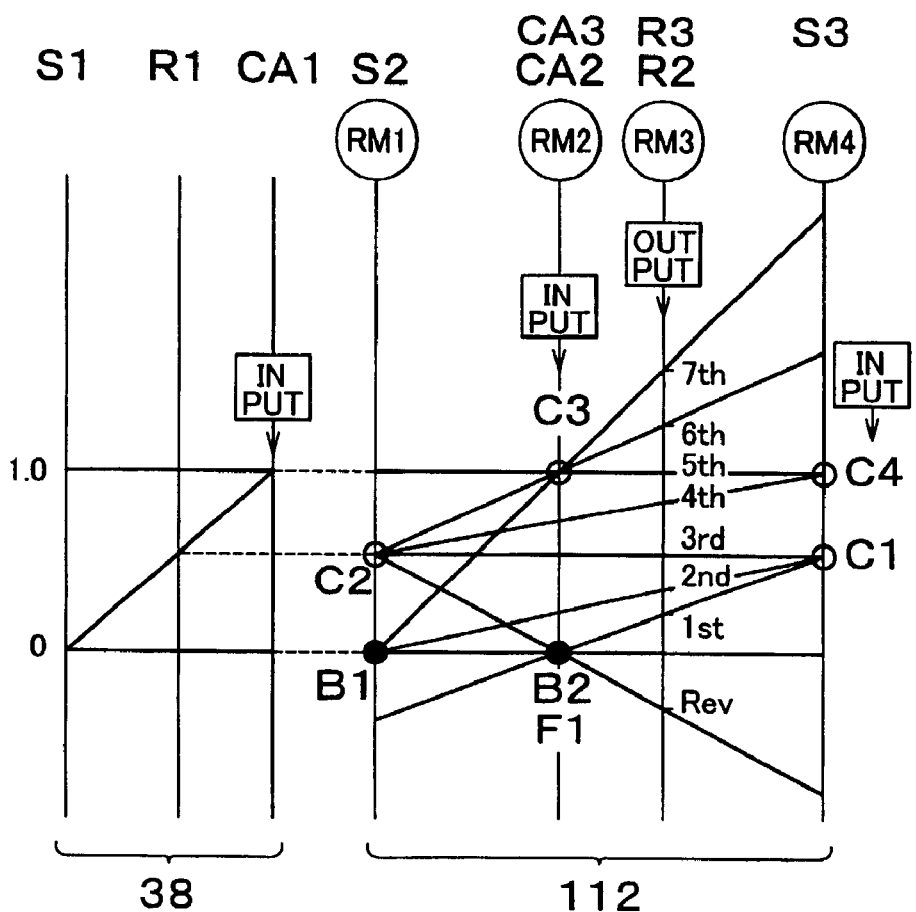
FIG. 33 is a nomogram plotted with respect to the automatic transmission of the sixteenth embodiment.

Referring next to FIGS. 32a, 32b and FIG. 33, the thirteenth embodiment of the invention will be described. FIGS. 32a and 32b correspond to FIGS. 1a and 1b, and FIG. 33 corresponds to FIG. 2. An automatic transmission 110 of a motor vehicle according to the sixteenth embodiment is different from the automatic transmission 84 of the twelfth embodiment as shown in FIGS. 24a, 24b and FIG. 25 in respect of the construction of a second transmitting portion 112. More specifically, the sun gear S2 of the second planetary gear set 16 provides the first rotating element RM1, and the carrier CA2 of the second planetary gear set 16 and the carrier CA3 of the third planetary gear set 18 are coupled to each other to provide the second rotating element RM2. The ring gear R2 of the second planetary gear set 16 and the ring gear R3 of the third planetary gear set 18 are coupled to each other to provide the third rotating element RM3, and the sun gear S3 of the third planetary gear set 18 provides the fourth rotating element RM4. It is to be noted that the rotating elements RM1 to RM4, the case 30, the ring gear R1 of the first planetary gear set 12 as the intermediate output member, the input shaft 22 and the output shaft 24 are coupled to each other through the clutches C1 to C4, brakes B1 and B2 and the one-way clutch F1 in the same manners as in the twelfth embodiment as shown in FIGS. 24a, 24b and FIG. 25.

In this case, too, seven forward gear stages, i.e., the 1$^{st}$-speed gear stage through the 7$^{th}$-speed gear stage, and one reverse gear stage are established according to the operation table of FIG. 32b that is identical with that of FIG. 24b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.490, ρ2 is equal to 0.550, and ρ3 is equal to 0.355, the same gear ratios as indicated in FIG. 24b are provided as shown in FIG. 32b. Thus, the automatic transmission 110 of the sixteenth embodiment operates in substantially the same manner and yields substantially the same effects as that of the twelfth embodiment.

Figure 34:
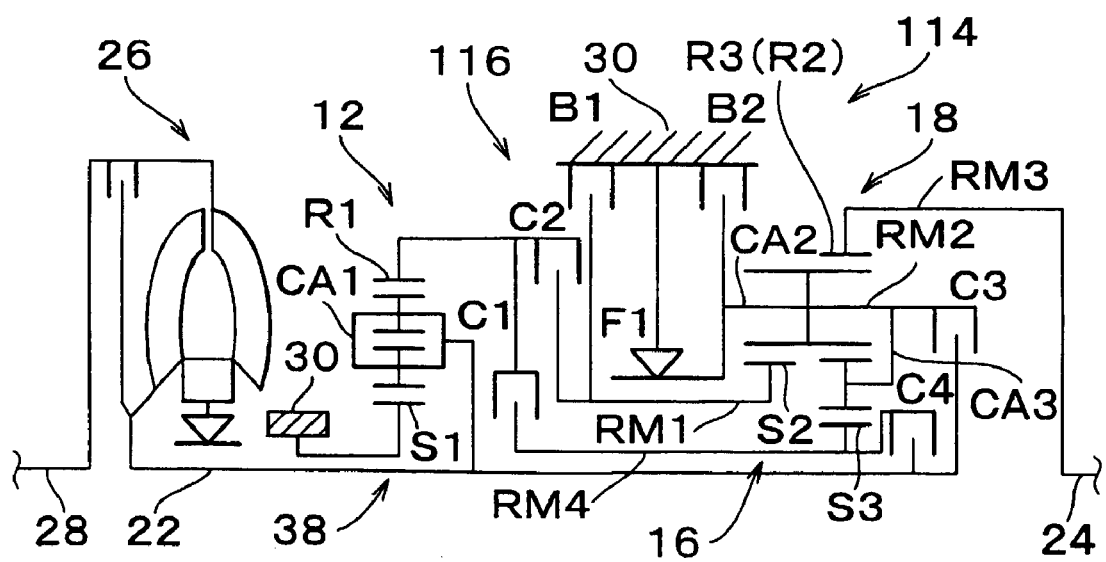
FIG. 34 is a schematic view showing a modified example of the automatic transmission of the sixteenth embodiment, in which the second transmitting portion has a Ravigneaux type planetary gear train.

An automatic transmission 114 as shown in FIG. 34 is a modified example of the automatic transmission 110 of the sixteenth embodiment. The automatic transmission 114 is different from the automatic transmission 110 in that a second transmitting portion 116 takes the form of a Ravigneaux type planetary gear train, as in the modified example of the first embodiment as shown in FIG. 3.

Seventeenth Embodiment

Figures 35A, 35B:
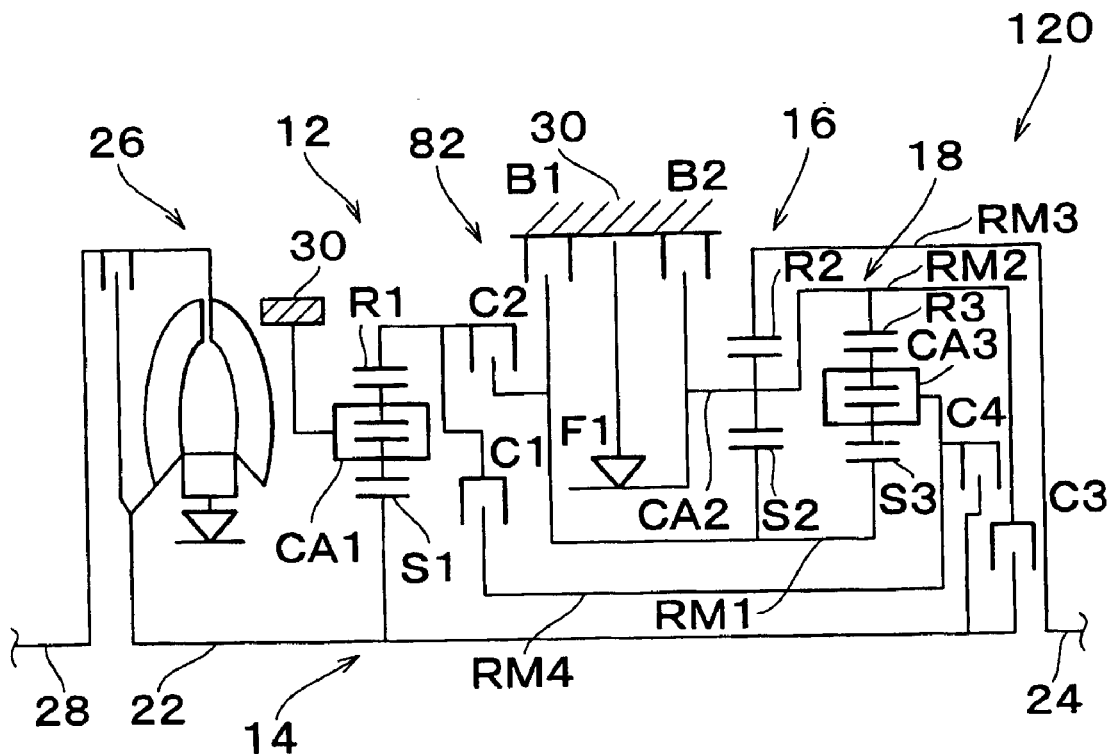
FIG. 35a is a schematic view showing an automatic transmission of a motor vehicle according to a seventeenth embodiment of the invention.
FIG. 35b is an operation table according to which each gear stage of the automatic transmission of the seventeenth embodiment as shown in FIG. 35a is established.
Figure 36:
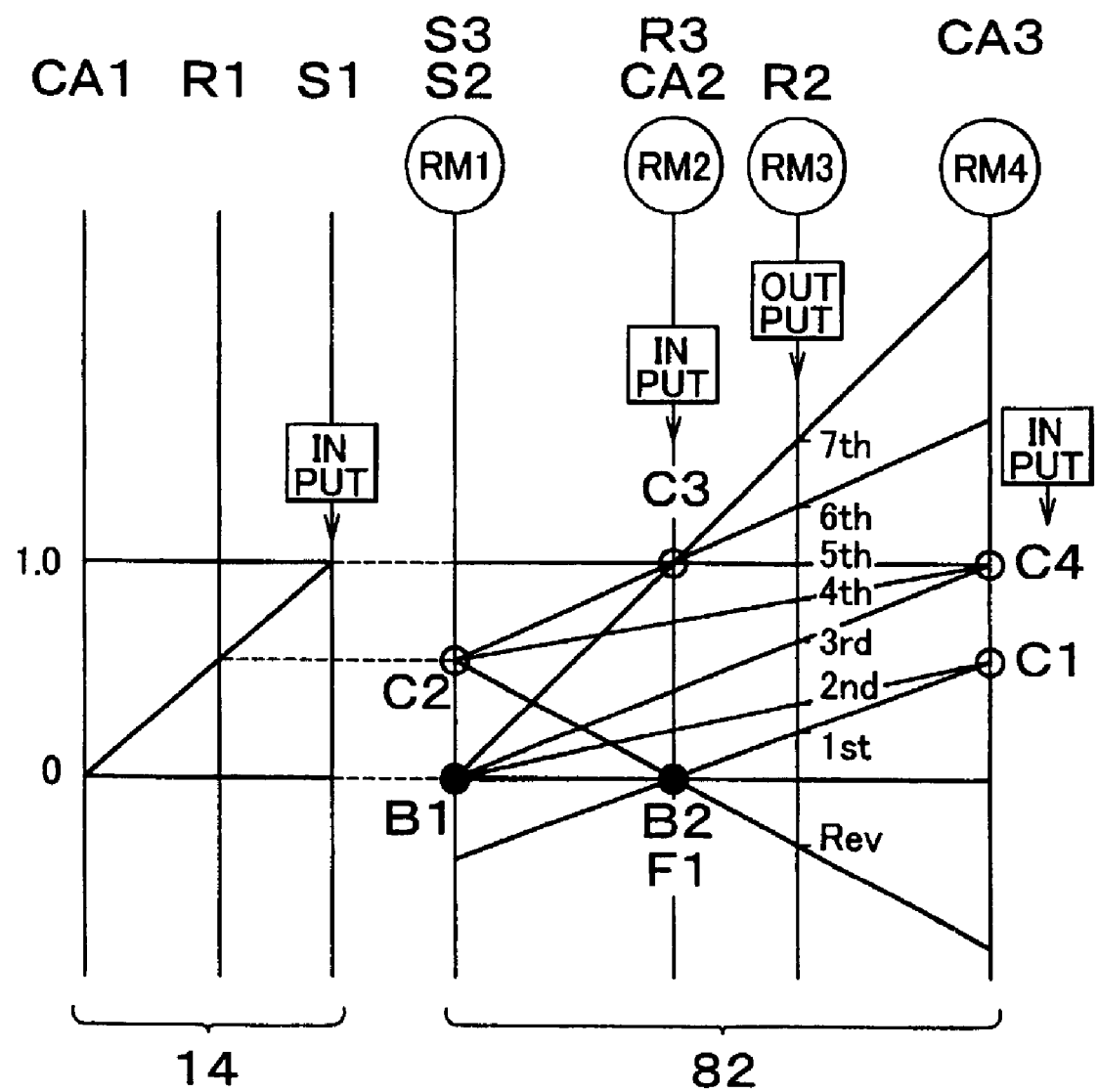
FIG. 36 is a nomogram plotted with respect to the automatic transmission of the seventeenth embodiment.

Referring next to FIGS. 35a, 35b and FIG. 36, the seventeenth embodiment of the invention will be described. FIGS. 35a and 35b correspond to FIGS. 1a and 1b, and FIG. 36 corresponds to FIG. 2. An automatic transmission 120 of a motor vehicle according to the seventeenth embodiment has the same mechanical arrangement as the automatic transmission 80 of the eleventh embodiment as shown in FIGS. 22a, 22b and FIG. 23, but uses different engaging elements for establishing the 3$^{rd}$-speed gear stage. More specifically, in the present embodiment, the fourth clutch C4 and the first brake B1 are engaged, and the fourth rotating element RM4 (i.e., carrier CA3) is rotated as a unit with the input shaft 22 while rotation of the first rotating element RM1 (i.e., sun gears S2, S3) is stopped, so that the 3$^{rd}$-speed gear stage is established. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.560, ρ2 is equal to 0.464, and ρ3 is equal to 0.579, the gear ratios as indicated in FIG. 35b are provided. As is understood from FIG. 35b, the step value of the gear ratios, namely, the ratio of the gear ratios of the adjacent gear stages, is generally appropriate, and the total width of the gear ratios, namely, the ratio of the largest gear ratio to the smallest gear ratio (=5.270/0.683), is a sufficiently large value (which is about 7.714). In addition, the reverse gear stage has an appropriate gear ratio. Thus, the automatic transmission 120 provides appropriate speed-change characteristics over the entire range of operation.

With the automatic transmission 120 of the embodiment, the seven forward gear stages are provided by three planetary gear sets 12, 16, 18, four clutches C1–C4 and two brakes B1, B2. Thus, the automatic transmission 120 is made light-weight and compact, and can be more easily installed on the vehicle, as compared with the case where four planetary gear sets are used. Furthermore, since shifting from one speed to another speed is accomplished only by changing the combination of two of the clutches C1–C4 and the brakes B1, B2, shift control can be easily performed, and shift shocks are advantageously reduced.

By setting the gear ratios ρ1, ρ2 and ρ3 of the three planetary gear units 12, 16 and 18 to be within a range of about 0.3 to 0.6, the automatic transmission 10 is able to provide appropriate speed-change characteristics over the entire range of operation as shown in FIG. 35b while keeping the size (or diameter) of the planetary gear sets 12, 16, 18 relatively small.

Eighteenth Embodiment

Figures 37A, 37B:
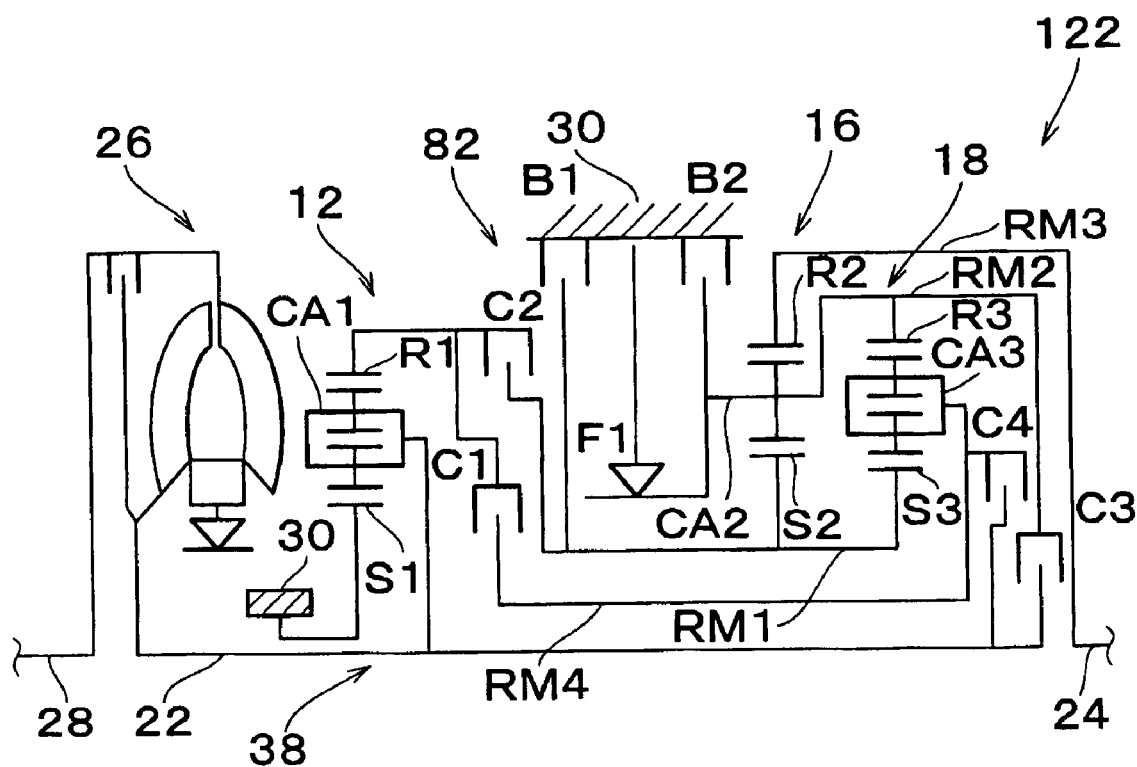
FIG. 37a is a schematic view showing an automatic transmission of a motor vehicle according to an eighteenth embodiment of the invention.
FIG. 37b is an operation table according to which each gear stage of the automatic transmission of the eighteenth embodiment as shown in FIG. 37a is established.
Figure 38:
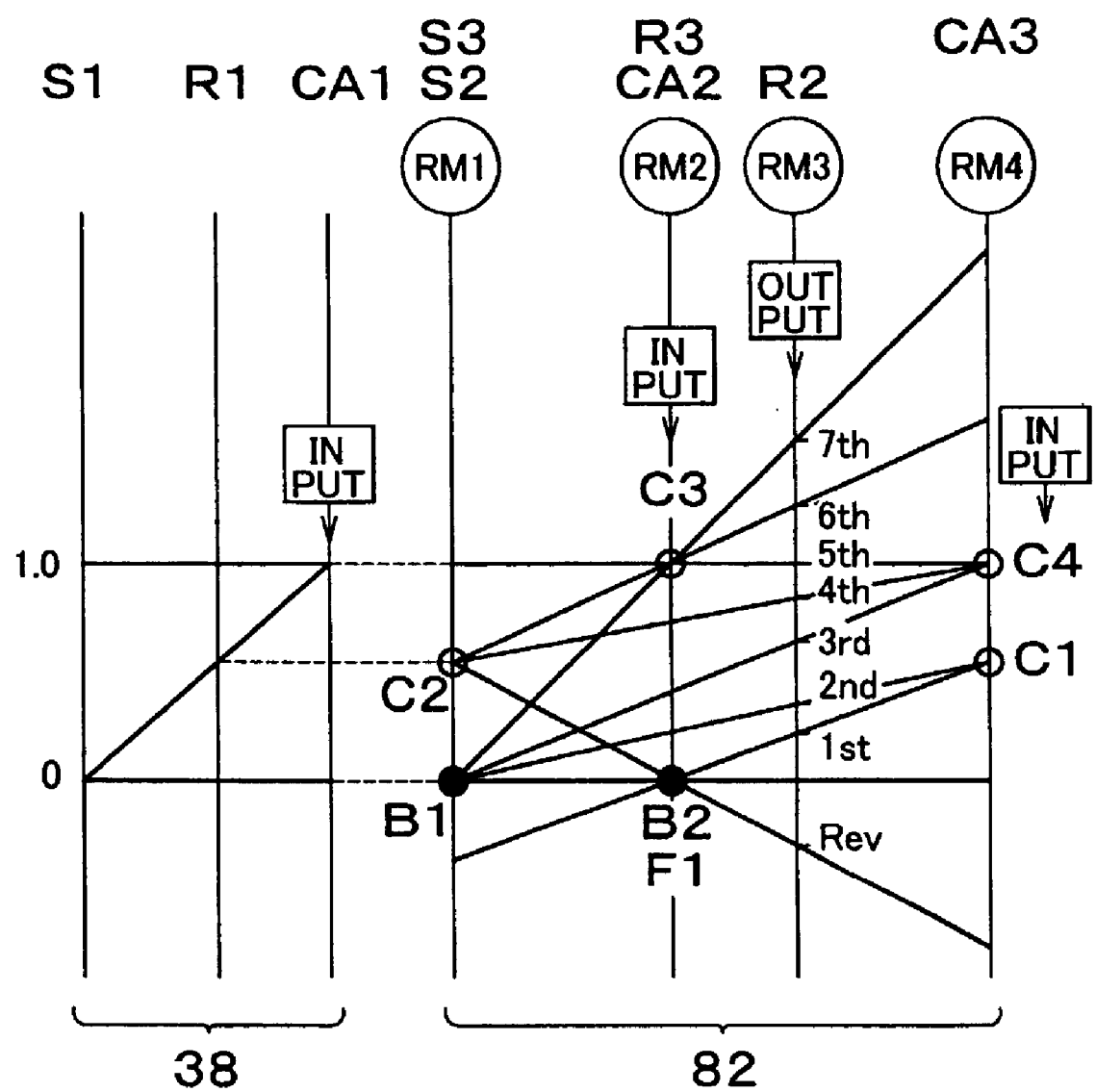
FIG. 38 is a nomogram plotted with respect to the automatic transmission of the eighteenth embodiment.

Referring next to FIGS. 37a, 37b and FIG. 38, the eighteenth embodiment of the invention will be described. FIGS. 37a and 37b correspond to FIGS. 1a and 1b, and FIG. 38 corresponds to FIG. 2. An automatic transmission 122 of a motor vehicle according to the eighteenth embodiment is different from the automatic transmission 120 of the seventeenth embodiment as shown in FIGS. 35a, 35b and FIG. 36 in that the first transmitting portion 38 as described above with respect to the second embodiment is used in place of the first transmitting portion 14.

In this case, too, seven forward gear stages, i.e., the 1$^{st}$-speed gear stage through the 7$^{th}$-speed gear stage, and one reverse gear stage are established according to the operation table of FIG. 37b that is identical with that of FIG. 35b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.440, ρ2 is equal to 0.464, and ρ3 is equal to 0.579, the same gear ratios as indicated in FIG. 35b are provided as shown in FIG. 37b. Thus, the automatic transmission 122 of the eighteenth embodiment operates in substantially the same manner and yields substantially the same effects as that of the seventeenth embodiment.

Nineteenth Embodiment

Figures 39A, 39B:
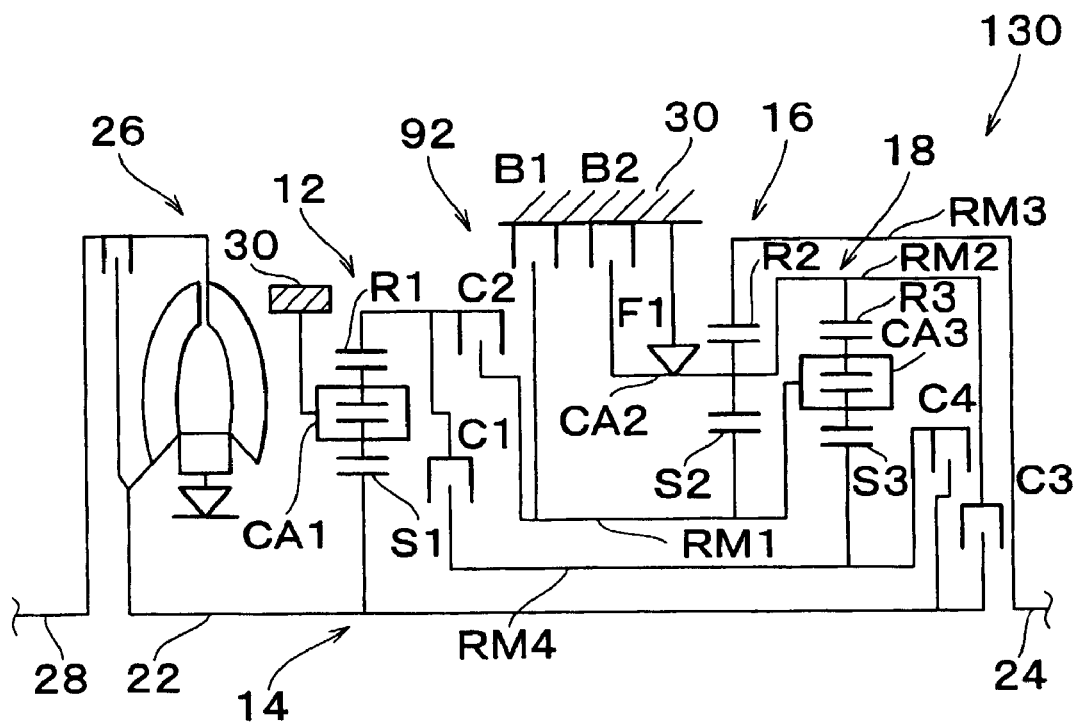
FIG. 39a is a schematic view showing an automatic transmission of a motor vehicle according to a nineteenth embodiment of the invention.
FIG. 39b is an operation table according to which each gear stage of the automatic transmission of the nineteenth embodiment as shown in FIG. 39a is established.
Figure 40:
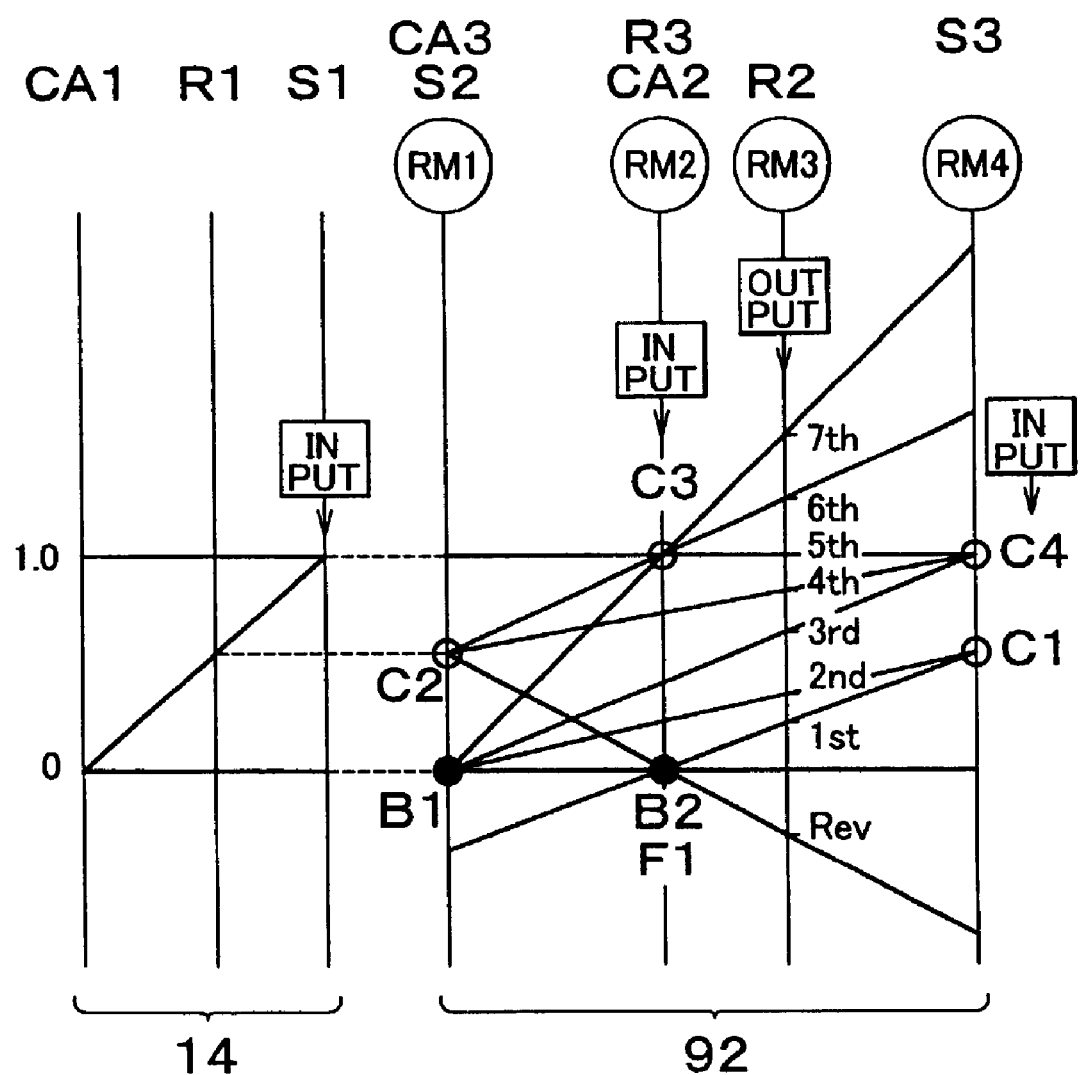
FIG. 40 is a nomogram plotted with respect to the automatic transmission of the nineteenth embodiment.

Referring next to FIGS. 39a, 39b and FIG. 40, the nineteenth embodiment of the invention will be described. FIGS. 39a and 39b correspond to FIGS. 1a and 1b, and FIG. 40 corresponds to FIG. 2. An automatic transmission 130 of a motor vehicle according to the nineteenth embodiment has the same mechanical arrangement as the automatic transmission 90 of the thirteenth embodiment as shown in FIGS. 26a, 26b and FIG. 27, but uses different engaging elements for establishing the $3^{rd}$-speed gear stage. More specifically, in the present embodiment, the fourth clutch C4 and the first brake B1 are engaged, and the fourth rotating element RM4 (i.e., sun gear S3) is rotated as a unit with the input shaft 22 while rotation of the first rotating element RM1 (i.e., sun gear S2 and carrier CA3) is stopped, so that the $3^{rd}$-speed gear stage is established. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.560, ρ2 is equal to 0.464, and ρ3 is equal to 0.421, the same gear ratios as indicated in FIG. 35b are provided as shown in FIG. 39b. Thus, the automatic transmission 130 of the nineteenth embodiment operates in substantially the same manner and yields substantially the same effects as that of the seventeenth embodiment.

Twentieth Embodiment

Figures 41A, 41B:
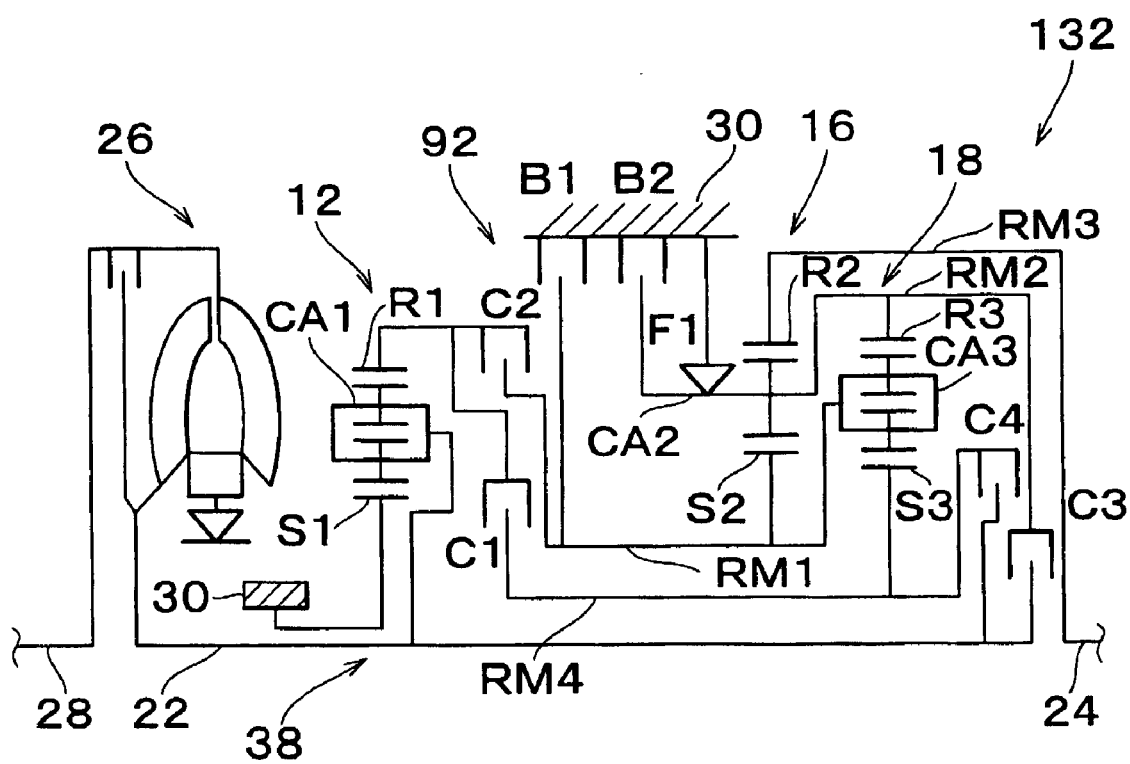
FIG. 41a is a schematic view showing an automatic transmission of a motor vehicle according to a twentieth embodiment of the invention.
FIG. 41b is an operation table according to which each gear stage of the automatic transmission of the twentieth embodiment as shown in FIG. 40a is established.
Figure 42:
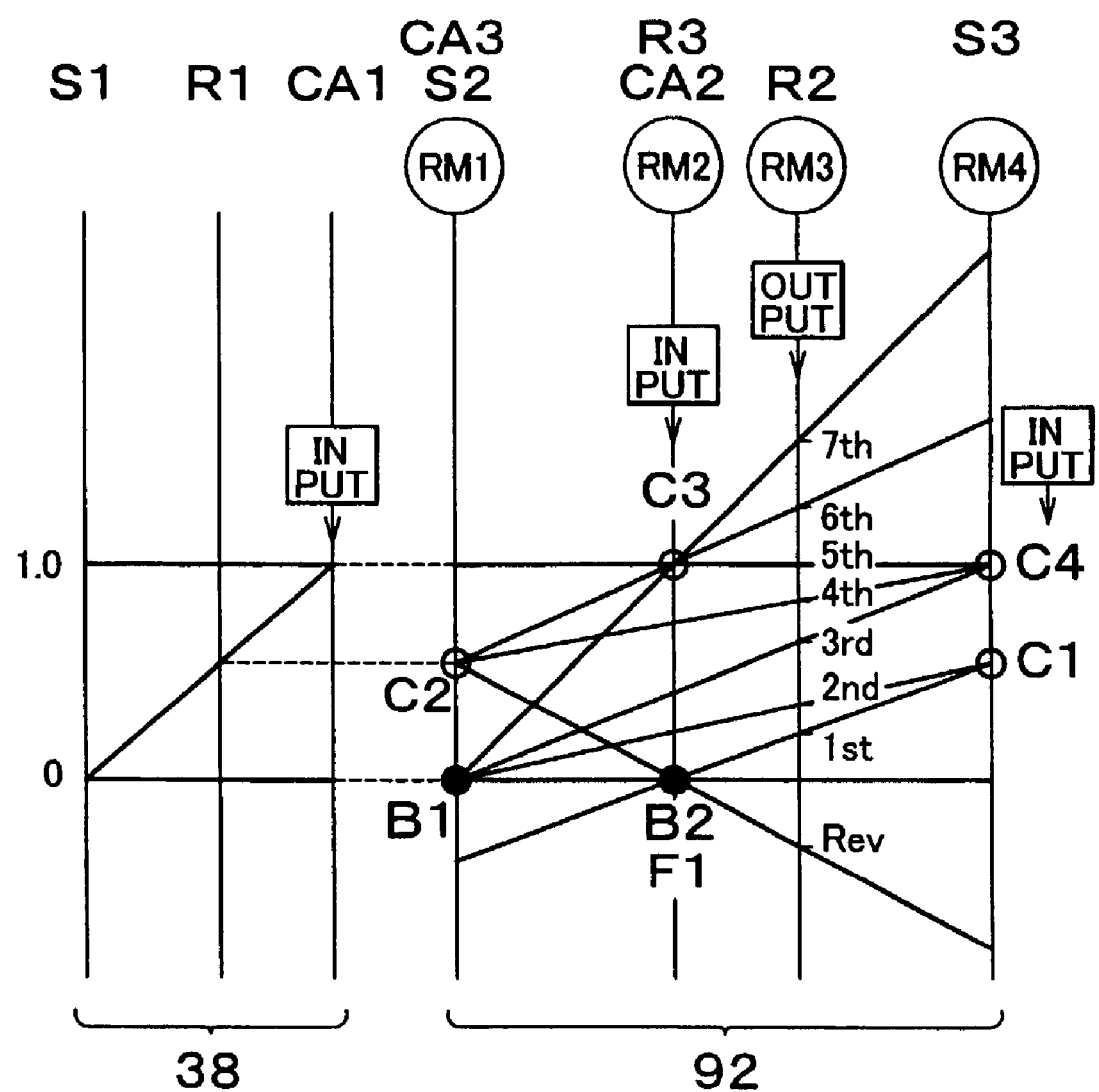
FIG. 42 is a nomogram plotted with respect to the automatic transmission of the twentieth embodiment.

Referring next to FIGS. 41a, 41b and FIG. 42, the twentieth embodiment of the invention will be described. FIGS. 41a and 41b correspond to FIGS. 1a and 1b, and FIG. 42 corresponds to FIG. 2. An automatic transmission 132 of a motor vehicle according to the twentieth embodiment is different from the automatic transmission 130 of the nineteenth embodiment as shown in FIGS. 39a, 39b and FIG. 40 in that the first transmitting portion 38 as described above with respect to the second embodiment is used in place of the first transmitting portion 14.

In this case, too, seven forward gear stages, i.e., the 1st-speed gear stage through the $7^{th}$-speed gear stage, and one reverse gear stage are established according to the operation table of FIG. 41b that is identical with that of FIG. 39b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.440, ρ2 is equal to 0.464, and ρ3 is equal to 0.421, the same gear ratios as indicated in FIG. 39b are provided as shown in FIG. 41b. Thus, the automatic transmission 132 of the twentieth embodiment operates in substantially the same manner and yields substantially the same effects as that of the nineteenth embodiment.

Twenty-First Embodiment

Figures 43A, 43B:
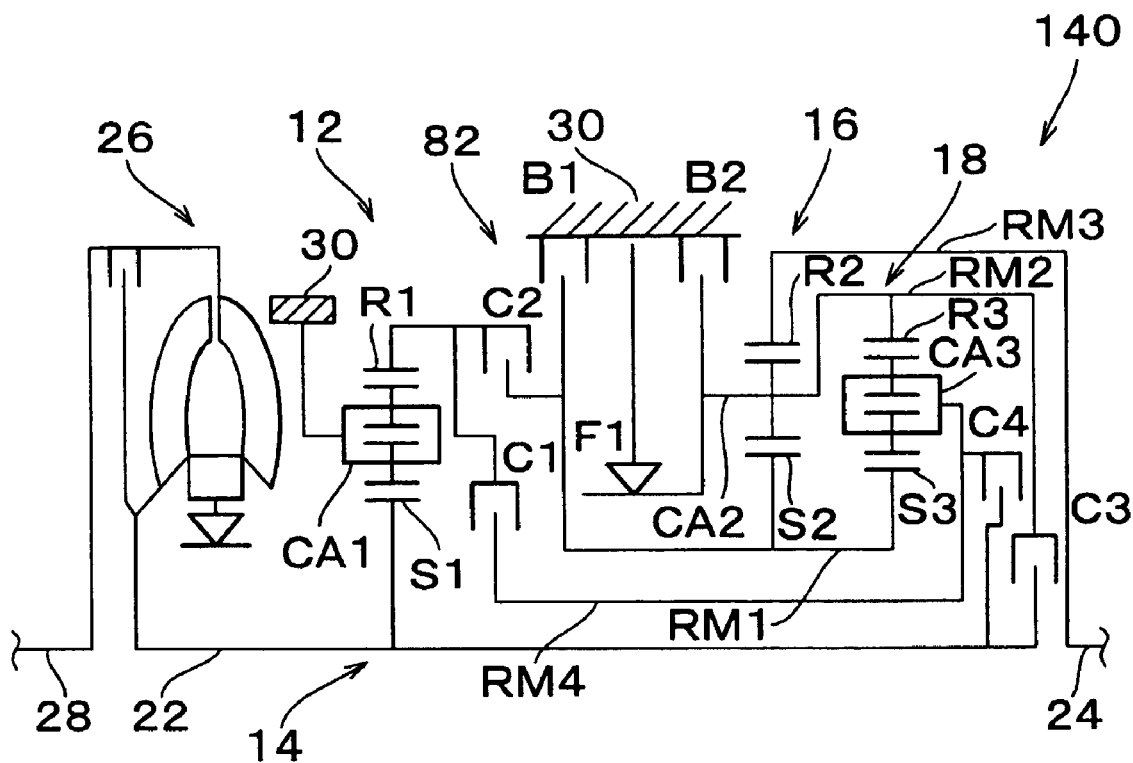
FIG. 43a is a schematic view showing an automatic transmission of a motor vehicle according to a twenty-first embodiment of the invention.
FIG. 43b is an operation table according to which each gear stage of the automatic transmission of the twenty-first embodiment as shown in FIG. 43a is established.
Figure 44:
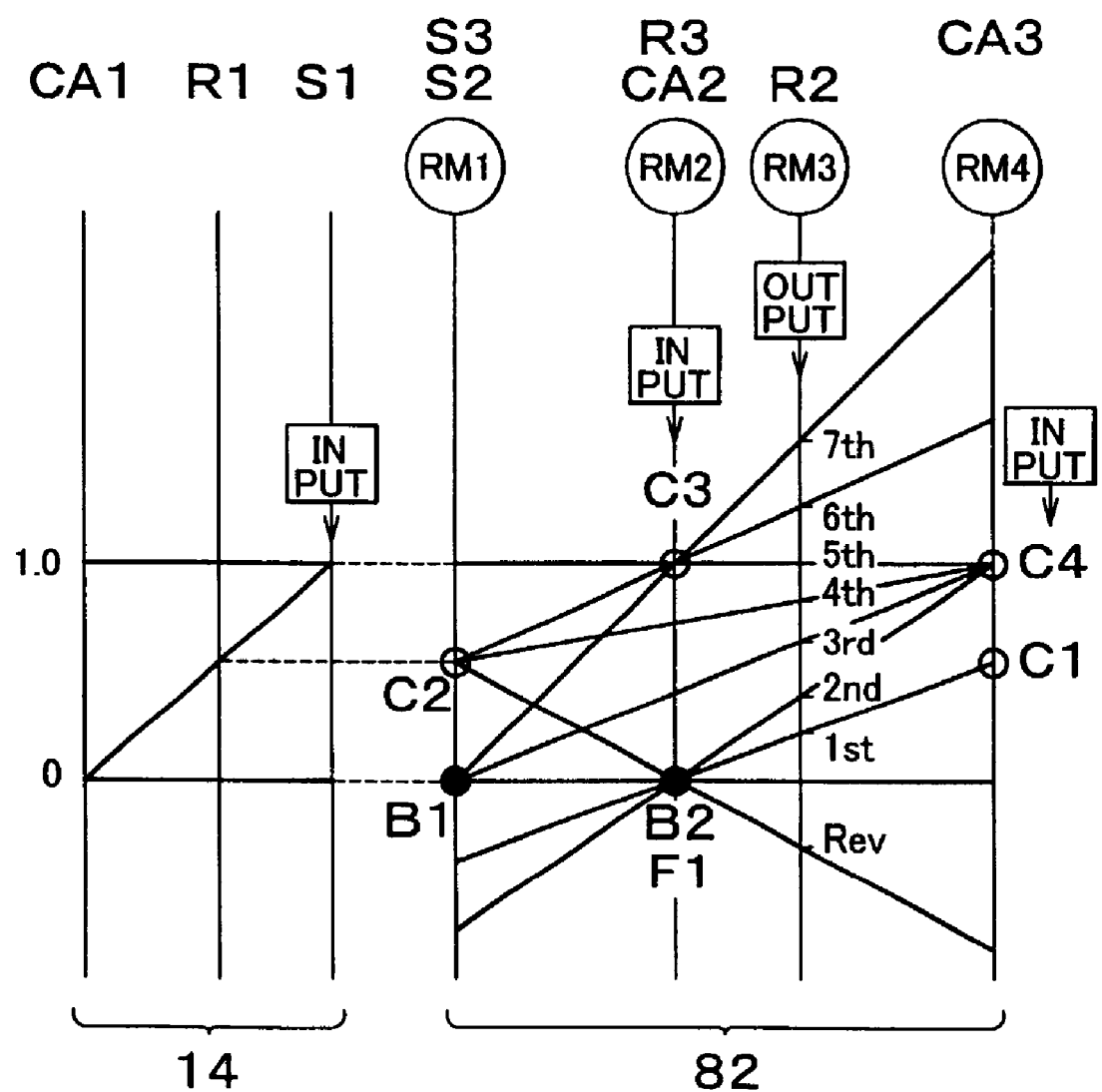
FIG. 44 is a nomogram plotted with respect to the automatic transmission of the twenty-first embodiment.

Referring next to FIGS. 43a, 43b and FIG. 44, the twenty-first embodiment of the invention will be described. FIGS. 43a and 43b correspond to FIGS. 1a and 1b, and FIG. 44 corresponds to FIG. 2. An automatic transmission 140 of a motor vehicle according to the twenty-first embodiment has the same mechanical arrangement as the automatic transmission 120 of the seventeenth embodiment as shown in FIGS. 35a, 35b and FIG. 36, but uses different engaging elements for establishing the $2^{nd}$-speed gear stage. More specifically, in the present embodiment, the fourth clutch C4 and the second brake B2 are engaged, and the fourth rotating element RM4 (i.e., carrier CA3) is rotated as a unit with the input shaft 22 while rotation of the second rotating element RM2 (i.e., carrier CA2 and ring gear R3) is stopped, so that the $2^{nd}$-speed gear stage is established. Since the one-way clutch F1 is provided in parallel with the second brake B2, the second brake B2 need not be engaged when the vehicle is accelerated. Thus, the $2^{nd}$-speed gear stage can be established only by engaging the fourth clutch C4, and the automatic transmission 140 is shifted from the $2^{nd}$-speed gear stage to the $3^{rd}$-speed gear stage by engaging the first brake B1 in this condition. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.520, ρ2 is equal to 0.524, and ρ3 is equal to 0.596, the gear ratios as indicated in FIG. 43b are provided. As is understood from FIG. 43b, the step value of the gear ratios, namely, the ratio of the gear ratios of the adjacent gear stages, is generally appropriate, and the total width of the gear ratios, namely, the ratio of the largest gear ratio to the smallest gear ratio (=5.453/0.656), is a sufficiently large value (which is about 8.310). In addition, the reverse gear stage has an appropriate gear ratio. Thus, the automatic transmission 140 provides appropriate speed-change characteristics over the entire range of operation.

With the automatic transmission 140 of the twenty-first embodiment, the seven forward gear stages are provided by three planetary gear sets 12, 16, 18, four clutches C1–C4 and two brakes B1, B2. Thus, the automatic transmission 140 is made light-weight and compact, and can be more easily installed on the vehicle, as compared with the case where four planetary gear sets are used. Furthermore, since shifting from one speed to another speed is accomplished only by changing the combination of two of the clutches C1–C4 and the brakes B1, B2, as is apparent from FIG. 43b, shift control can be easily performed, and shift shocks are advantageously reduced.

By setting the gear ratios ρ1, ρ2 and ρ3 of the three planetary gear units 12, 16 and 18 to be within a range of about 0.3 to 0.6, the automatic transmission 140 is able to provide appropriate speed-change characteristics over the entire range of operation as shown in FIG. 43b while keeping the size (or diameter) of the planetary gear sets 12, 16, 18 relatively small.

Twenty-Second Embodiment

Figures 45A, 45B:
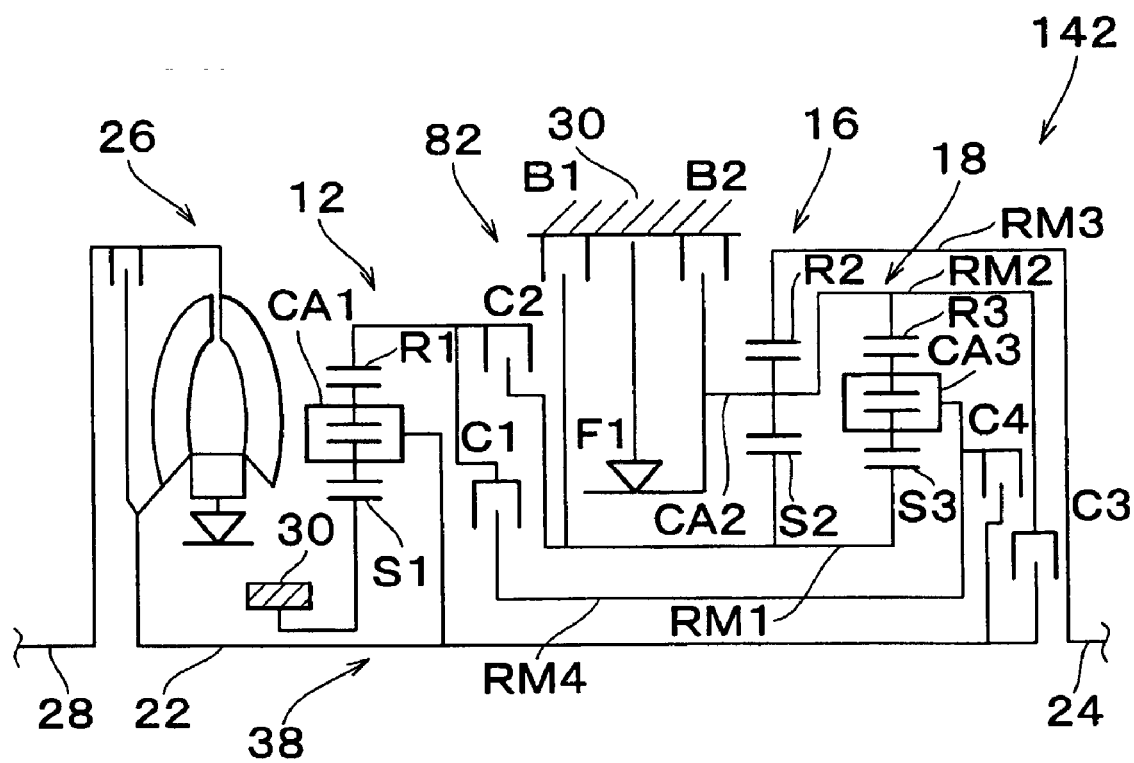
FIG. 45a is a schematic view showing an automatic transmission of a motor vehicle according to a twenty-second embodiment of the invention.
FIG. 45b is an operation table according to which each gear stage of the automatic transmission of the twenty-second embodiment as shown in FIG. 45a is established.
Figure 46:
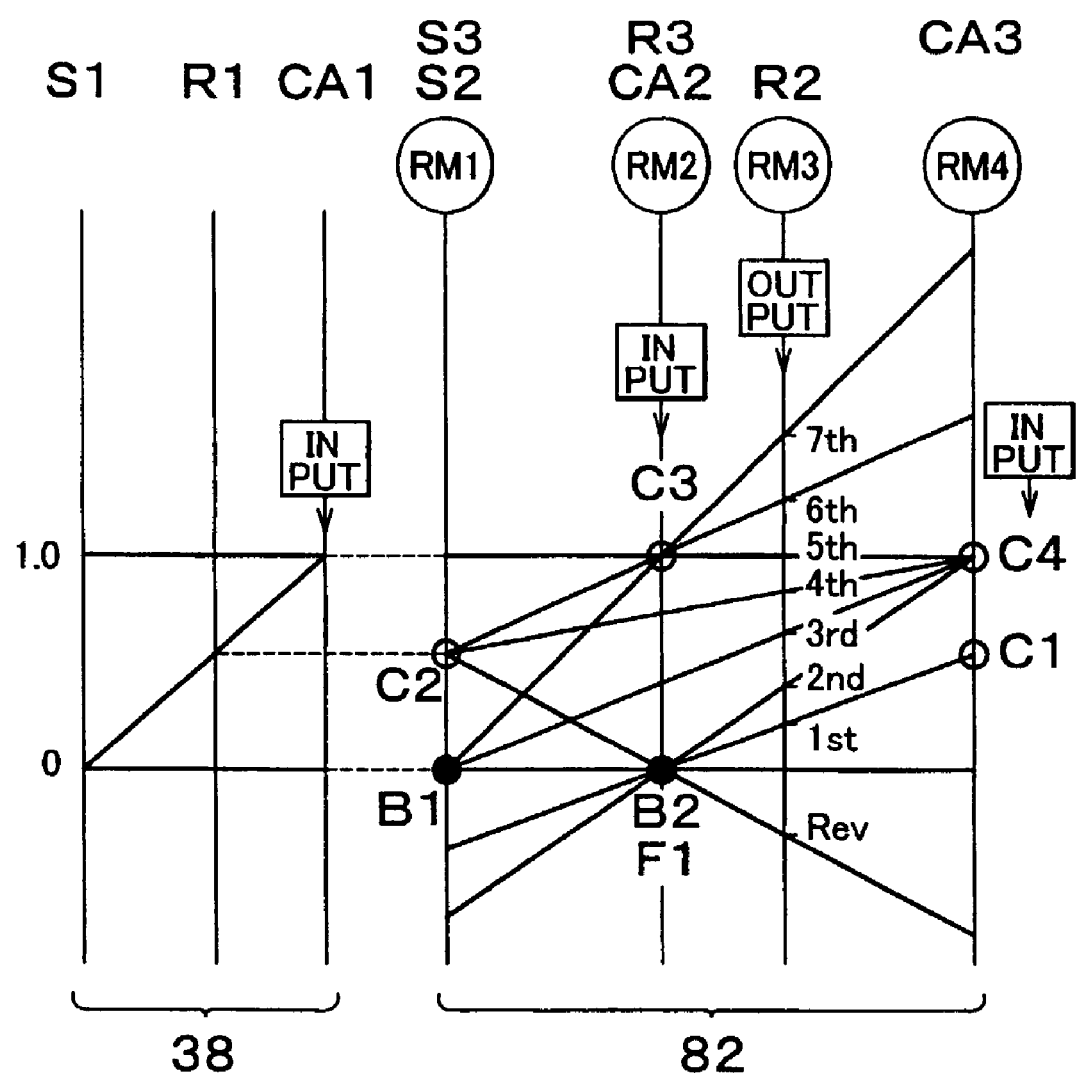
FIG. 46 is a nomogram plotted with respect to the automatic transmission of the twenty-second embodiment.

Referring next to FIGS. 45a, 45b and FIG. 46, the twenty-second embodiment of the invention will be described. FIGS. 45a and 45b correspond to FIGS. 1a and 1b, and FIG. 46 corresponds to FIG. 2. An automatic transmission 142 of a motor vehicle according to the twenty-second embodiment is different from the automatic transmission 140 of the twenty-first embodiment as shown in FIGS. 43a, 43b and FIG. 44 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 45b that is identical with that of FIG. 43b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.480, ρ2 is equal to 0.524, and ρ3 is equal to 0.596, the same gear ratios as indicated in FIG. 43b are provided as shown in FIG. 45b. Thus, the automatic transmission 142 of the twenty-second embodiment operates in substantially the same manner and yields substantially the same effects as that of the twenty-first embodiment.

Twenty-Third Embodiment

Figures 47A, 47B:
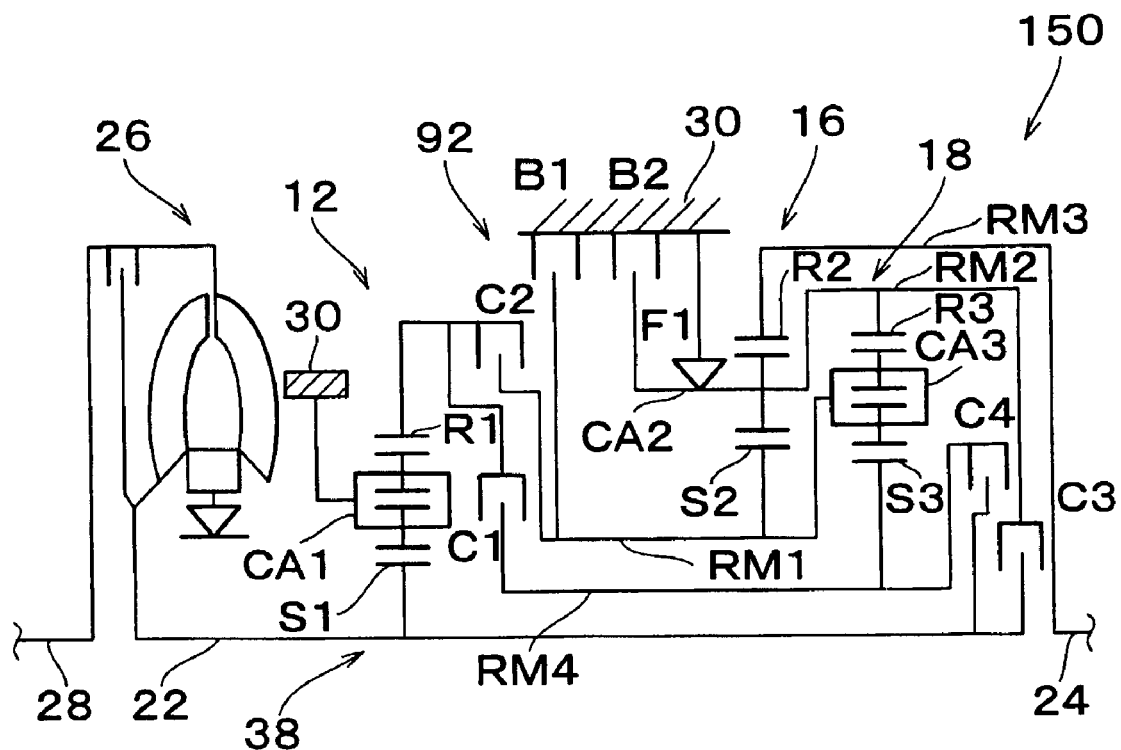
FIG. 47a is a schematic view showing an automatic transmission of a motor vehicle according to a twenty-third embodiment of the invention.
FIG. 47b is an operation table according to which each gear stage of the automatic transmission of the twelfth embodiment as shown in FIG. 47a is established.
Figure 48:
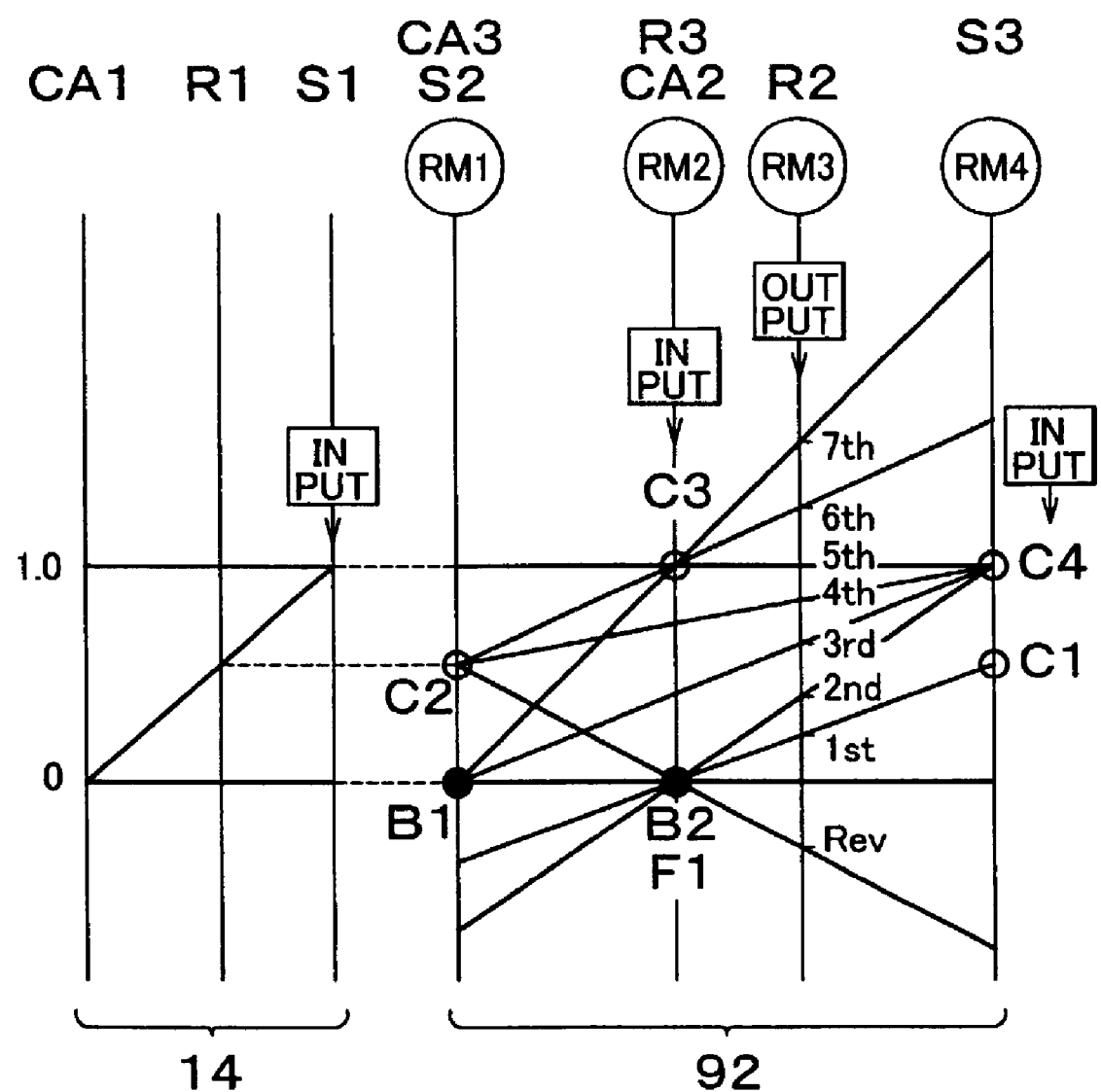
FIG. 48 is a nomogram plotted with respect to the automatic transmission of the twenty-third embodiment.

Referring next to FIGS. 47a, 47b and FIG. 48, the twenty-third embodiment of the invention will be described. FIGS. 47a and 47b correspond to FIGS. 1a and 1b, and FIG. 48 corresponds to FIG. 2. An automatic transmission 150 of a motor vehicle according to the twenty-third embodiment has the same mechanical arrangement as the automatic transmission 130 of the nineteenth embodiment as shown in FIGS. 39a, 39b and FIG. 40, but uses different engaging elements for establishing the $2^{nd}$-speed gear stage. More specifically, in the present embodiment, the fourth clutch C4 and the second brake B2 are engaged, and the fourth rotating element RM4 (i.e., sun gear S3) is rotated as a unit with the input shaft 22 while rotation of the second rotating element RM2 (i.e., carrier CA2 and ring gear R3) is stopped, so that the $2^{nd}$-speed gear stage is established. Since the one-way clutch F1 is provided in parallel with the second brake B2, the second brake B2 is not necessarily engaged when the vehicle is accelerated. Thus, the $2^{nd}$-speed gear stage can be established only by engaging the fourth clutch C4, and the automatic transmission 150 is shifted from the $2^{nd}$-speed gear stage to the $3^{rd}$-speed gear stage by engaging the first brake B1 in this condition. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.520, ρ2 is equal to 0.524, and ρ3 is equal to 0.404, the same gear ratios as indicated in FIG. 43b are provided as shown in FIG. 47b. Thus, the automatic transmission 150 of the twenty-third embodiment operates in substantially the same manner and yields substantially the same effects as that of the twenty-first embodiment.

Twenty-Fourth Embodiment

Figures 49A, 49B:
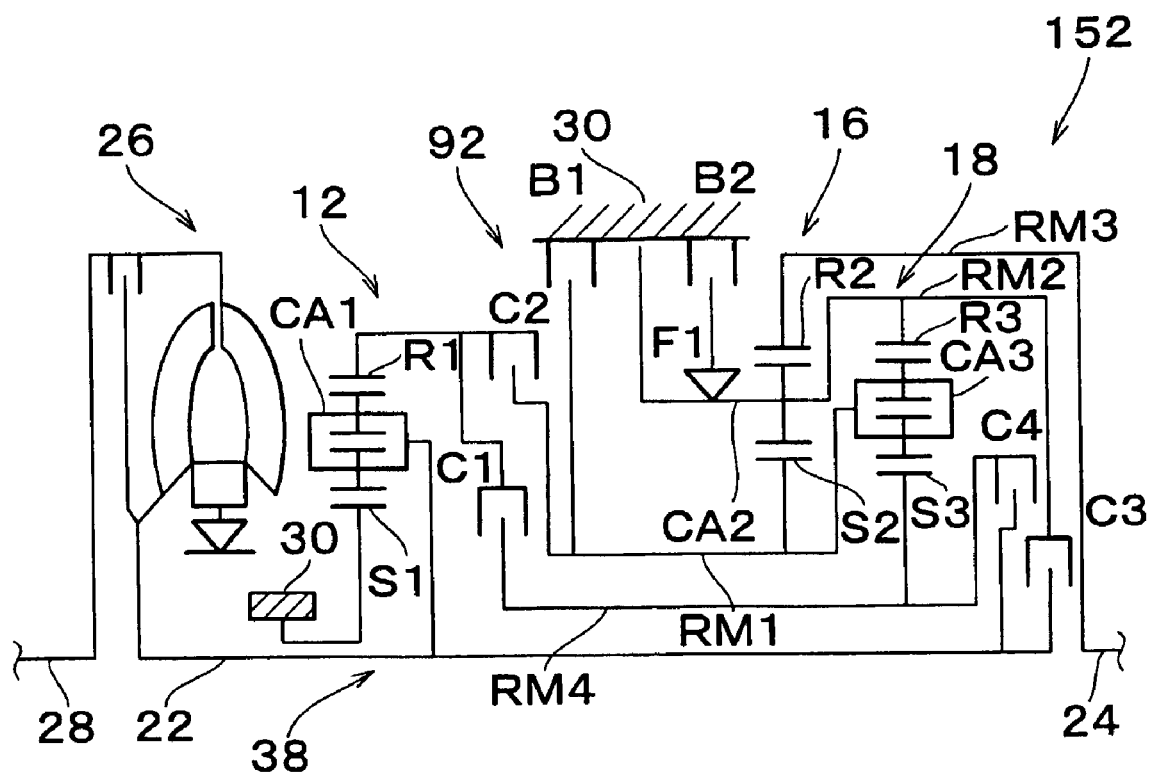
FIG. 49a is a schematic view showing an automatic transmission of a motor vehicle according to a twenty-fourth embodiment of the invention.
FIG. 49b is an operation table according to which each gear stage of the automatic transmission of the twenty-fourth embodiment as shown in FIG. 49a is established.
Figure 50:
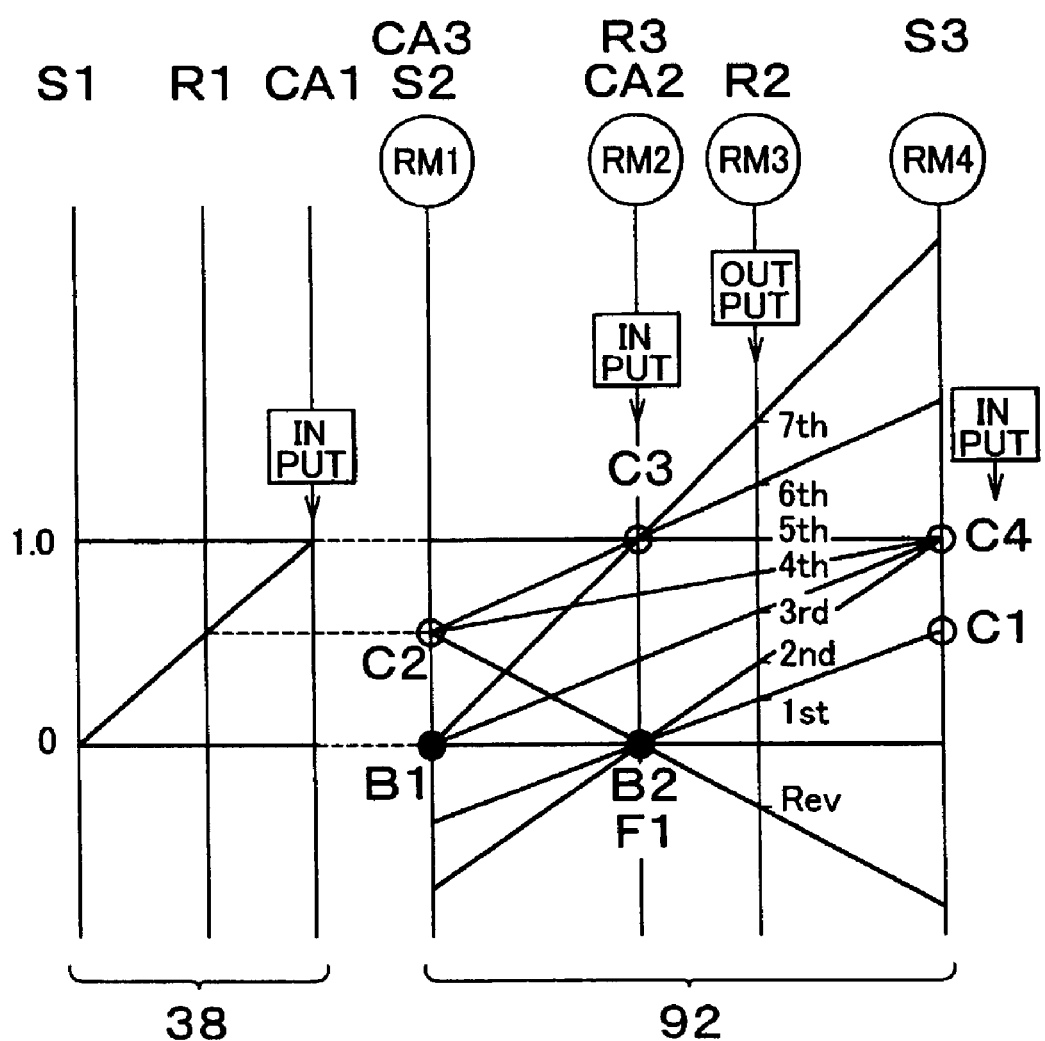
FIG. 50 is a nomogram plotted with respect to the automatic transmission of the twenty-fourth embodiment.

Referring next to FIGS. 49a, 49b and FIG. 50, the twenty-fourth embodiment of the invention will be described. FIGS. 49a and 49b correspond to FIGS. 1a and 1b, and FIG. 50 corresponds to FIG. 2. An automatic transmission 152 of a motor vehicle according to the twenty-fourth embodiment is different from the automatic transmission 150 of the twenty-third embodiment as shown in FIGS. 47a, 47b and FIG. 48 in that the first transmitting portion 38 as described above with respect to the second embodiment is used in place of the first transmitting portion 14.

In this case, too, seven forward gear stages, i.e., the $1^{st}$-speed gear stage through the $7^{th}$-speed gear stage, and one reverse gear stage are established according to the operation table of FIG. 49b that is identical with that of FIG. 47b. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.480, ρ2 is equal to 0.524, and ρ3 is equal to 0.404, the same gear ratios as indicated in FIG. 47b are provided as shown in FIG. 49b. Thus, the automatic transmission 152 of the twenty-fourth embodiment operates in substantially the same manner and yields substantially the same effects as that of the twenty-third embodiment.

Twenty-Fifth Embodiment

Figures 51A, 51B:
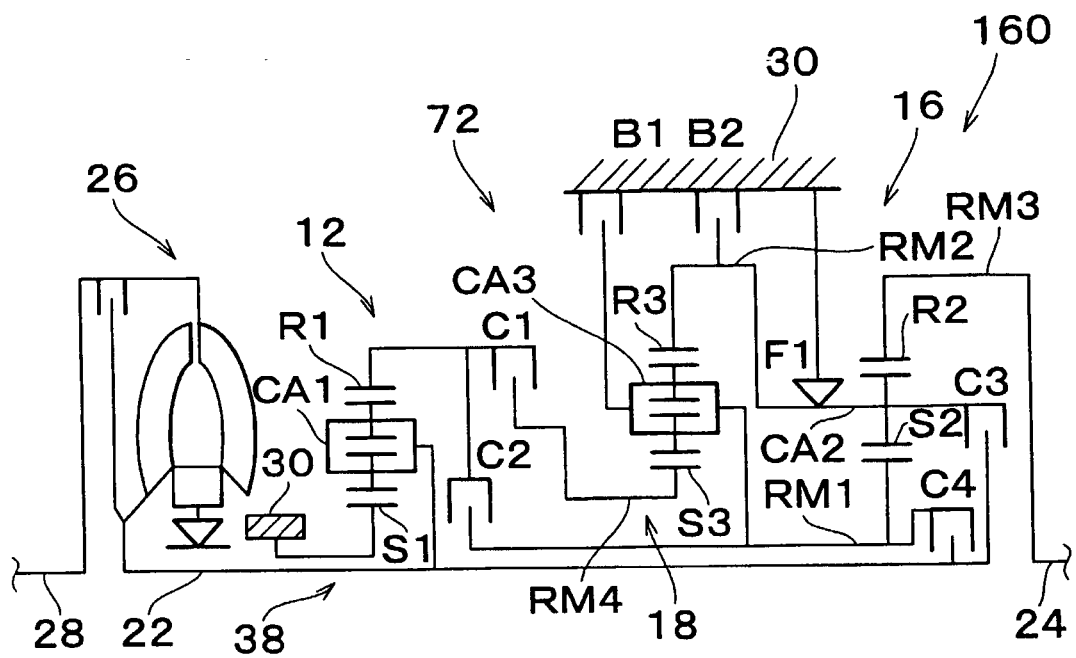
FIG. 51a is a schematic view showing an automatic transmission of a motor vehicle according to a twenty-fifth embodiment of the invention.
FIG. 51b is an operation table according to which each gear stage of the automatic transmission of the twenty-fifth embodiment as shown in FIG. 51a is established.
Figure 52:
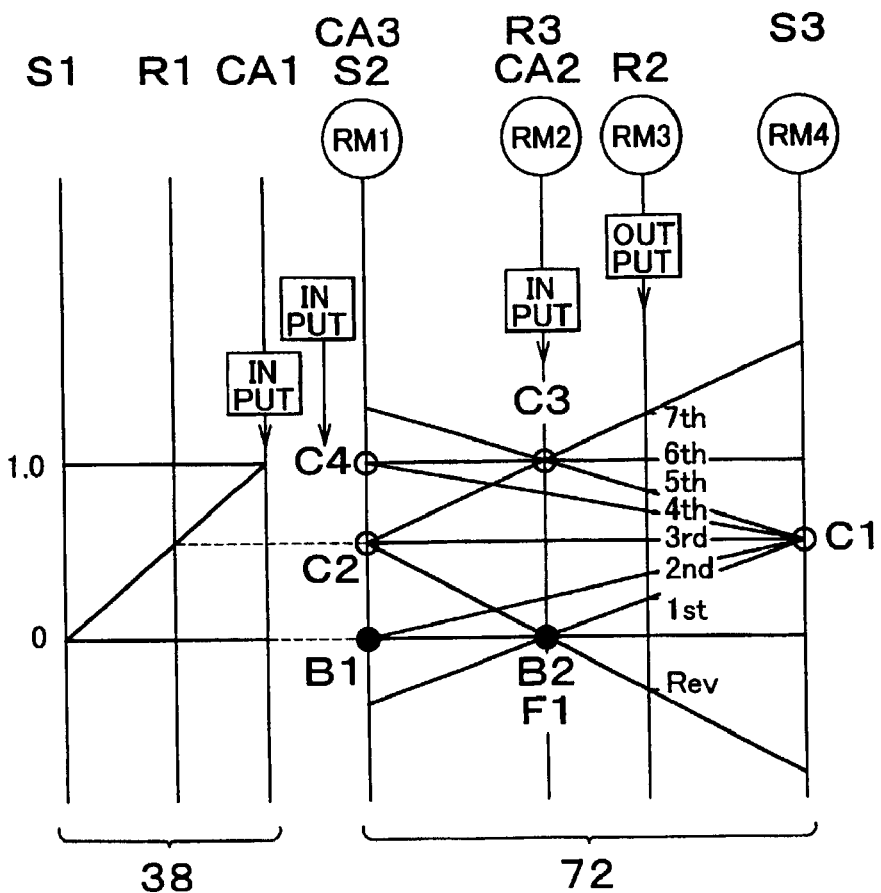
FIG. 52 is a nomogram plotted with respect to the automatic transmission of the twenty-fifth embodiment.

Referring next to FIGS. 51a, 51b and FIG. 52, the twenty-fifth embodiment of the invention will be described. FIGS. 51a and 51b correspond to FIGS. 1a and 1b, and FIG. 52 corresponds to FIG. 2. An automatic transmission 160 of a motor vehicle according to the twenty-fifth embodiment has substantially the same mechanical arrangement as the automatic transmission 74 of the tenth embodiment as shown in FIGS. 20a, 20b and FIG. 21, but uses different engaging elements for establishing the $4^{th}$-speed gear stage through the $7^{th}$-speed gear stage. More specifically, in the present embodiment, the first clutch C1 and the fourth clutch C4 are engaged, and the fourth rotating element RM4 (i.e., sun gear S3) is rotated at a reduced speed via the first transmitting portion 38 while the first rotating element RM1 (i.e., sun gear S2 and carrier CA3) is rotated as a unit with the input shaft 22 so that the $4^{th}$-speed gear stage is established.

To establish the $5^{th}$-speed gear stage, the first clutch C1 and the third clutch C3 are engaged, and the fourth rotating element RM4 (i.e., sun gear S3) is rotated at a reduced speed via the first transmitting portion 38 while the second rotating element RM2 (i.e., carrier CA2 and ring gear R3) is rotated as a unit with the input shaft 22.

To establish the $6^{th}$-speed gear stage having a gear ratio of 1, the third clutch C3 and the fourth clutch C4 are engaged, and the second transmitting portion 72 is rotated as a unit with the input shaft 22.

To establish the $7^{th}$-speed gear stage, the second clutch C2 and the third clutch C3 are engaged, and the first rotating element RM1 (i.e., sun gear S2 and carrier CA3) is rotated at a reduced speed via the first transmitting portion 38 while the second rotating element RM2 (i.e., carrier CA2 and ring gear R3) is rotated as a unit with the input shaft 22.

The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.500, ρ2 is equal to 0.410, and ρ3 is equal to 0.489, the gear ratios as indicated in FIG. 51b are provided. As is understood from FIG. 51b, the step value of the gear ratios, namely, the ratio of the gear ratios of the adjacent gear stages, is generally appropriate, and the total width of the gear ratios, namely, the ratio of the largest gear ratio to the smallest gear ratio (=5.088/0.880), is a sufficiently large value (which is about 6.131). In addition, the reverse gear stage has an appropriate gear ratio. Thus, the automatic transmission 160 provides appropriate speed-change characteristics over the entire range of operation.

The automatic transmission 160 of the twenty-fifth embodiment is different from the automatic transmission 74 of the tenth embodiment as shown in FIGS. 20a, 20b and FIG. 21 in that the fourth clutch C4 is provided between the second planetary gear set 16 and the third clutch C3. By engaging the fourth clutch C4 and the second brake B2, another reverse gear stage for high speed, having a smaller gear ratio, can be established.

With the automatic transmission 160 of the twenty-fifth embodiment, the seven forward gear stages are provided by three planetary gear sets 12, 16, 18, four clutches C1–C4 and two brakes B1, B2. Thus, the automatic transmission 160 is made light-weight and compact, and can be more easily installed on the vehicle, as compared with the case where four planetary gear sets are used. Furthermore, since shifting from one speed to another speed is accomplished only by changing the combination of two of the clutches C1–C4 and the brakes B1, B2, as is apparent from FIG. 51b, shift control can be easily performed, and shift shocks are advantageously reduced.

By setting the gear ratios ρ1, ρ2 and ρ3 of the three planetary gear units 12, 16 and 18 to be within a range of about 0.3 to 0.6, the automatic transmission 10 is able to provide appropriate speed-change characteristics over the entire range of operation as shown in FIG. 51*b* while keeping the size (or diameter) of the planetary gear sets 12, 16, 18 relatively small.

Figure 53:
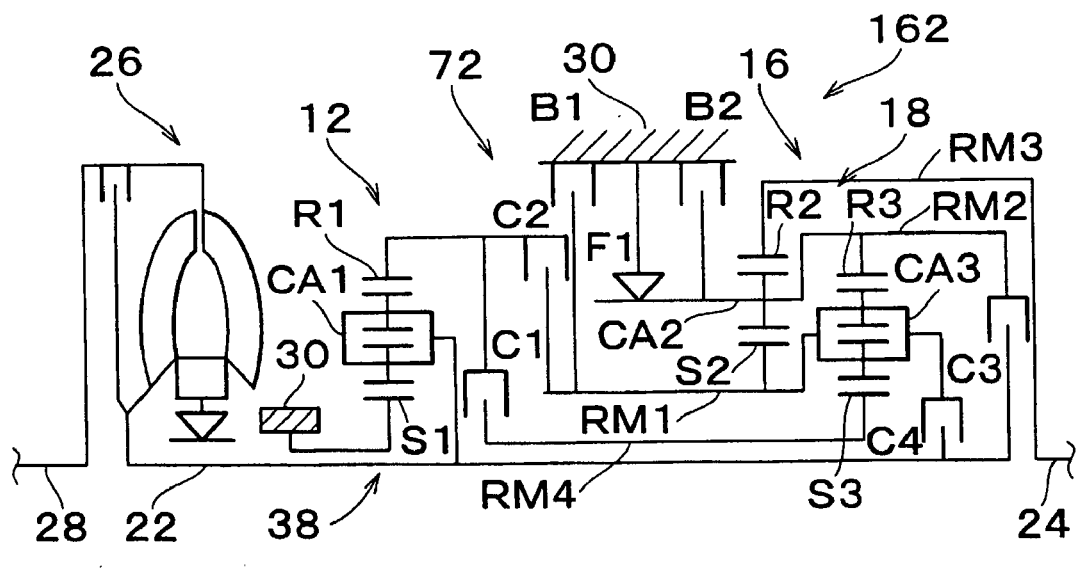
FIG. 53 is a schematic view showing a modified example in which the positions of the second planetary gear set and the third planetary gear set of the vehicle automatic transmission of the twenty-fifth embodiment as shown in FIG. 51a are switched or changed back to front.

An automatic transmission 162 of a motor vehicle as shown in FIG. 53 is a modified example of the automatic transmission 160 of the twenty-fifth embodiment as shown in FIGS. 51*a*, 51*b* and FIG. 52. The automatic transmission 162 is different from the automatic transmission 160 in that the positions of the second planetary gear set 16 and the third planetary gear set 18 are switched, and the clutches C1, C2, brakes B1, B2 and the one-way clutch F1 are concentrated or located close to each other. The relationship between the gear stages and the engaging elements with respect to the automatic transmission 162 is the same as that as shown in FIG. 51*b*. Thus, the automatic transmission 162 operates in substantially the same manner and yields substantially the same effects as that of the twenty-fifth embodiment as shown in FIGS. 51*a* and 51*b*.

The second transmitting portion of the twenty-fifth embodiment, which is constructed as shown in FIG. 51*a*, may employ other coupling arrangements.

Twenty-Sixth Embodiment

Figures 54A, 54B:
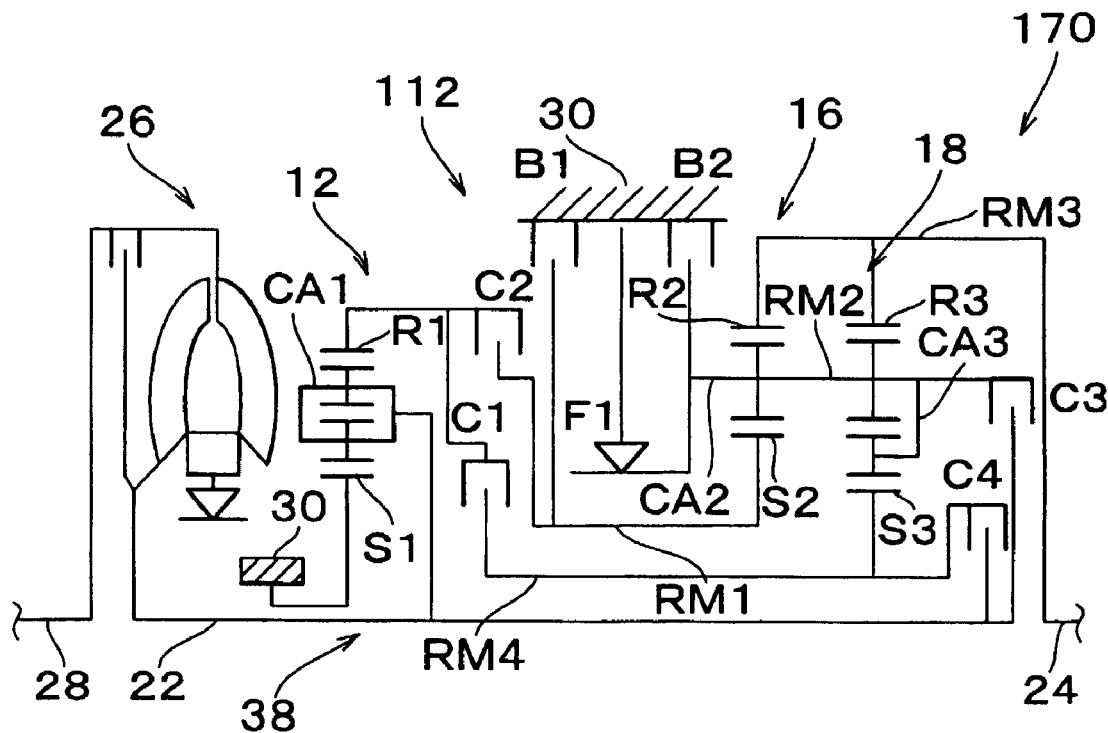
FIG. 54a is a schematic view showing an automatic transmission of a motor vehicle according to a twenty-sixth embodiment of the invention.
FIG. 54b is an operation table according to which each gear stage of the automatic transmission of the twenty-sixth embodiment as shown in FIG. 54a is established.
Figure 55:
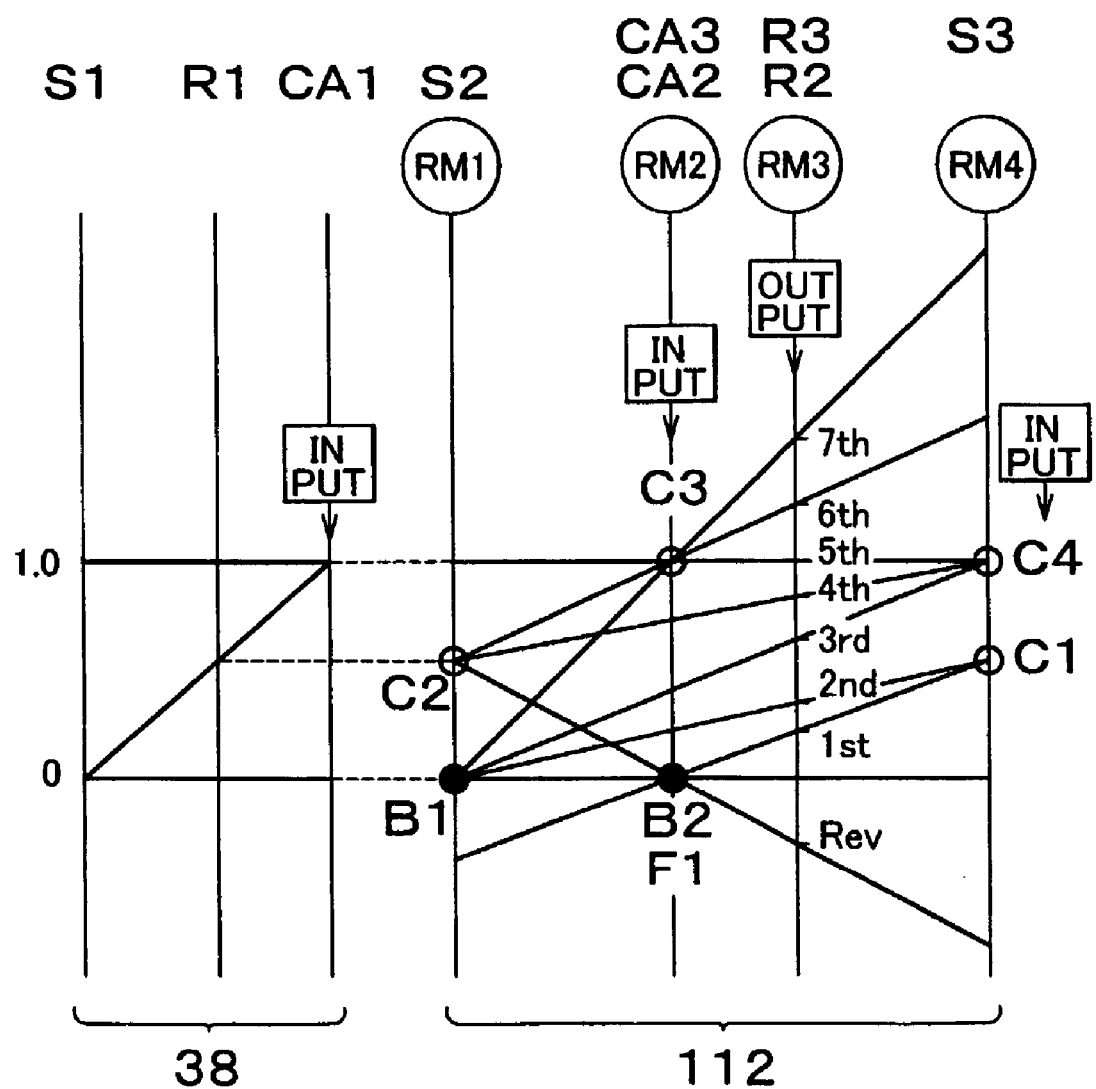
FIG. 55 is a nomogram plotted with respect to the automatic transmission of the twenty-sixth embodiment.

Referring next to FIGS. 54*a*, 54*b* and FIG. 55, the twenty-sixth embodiment of the invention will be described. FIGS. 54*a* and 54*b* correspond to FIGS. 1*a* and 1*b*, and FIG. 65 corresponds to FIG. 2. An automatic transmission 170 of a motor vehicle according to the twenty-sixth embodiment has the same mechanical arrangement as the automatic transmission 110 of the sixteenth embodiment as shown in FIGS. 32*a*, 32*b* and FIG. 33, but uses different engaging elements for establishing the $3^{rd}$-speed gear stage. More specifically, in the present embodiment, the fourth clutch C4 and the first brake B1 are engaged, and the fourth rotating element RM4 (i.e., sun gear S3) is rotated as a unit with the input shaft 22 while rotation of the fist rotating element RM1 (i.e., sun gear S2) is stopped, so that the $3^{rd}$-speed gear stage is established. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.440, ρ2 is equal to 0.464, and ρ3 is equal to 0.338, the same gear ratios as indicated in FIG. 35*b* are provided as shown in FIG. 54*b*. Thus, the automatic transmission 170 of the twenty-sixth embodiment operates in substantially the same manner and yields substantially the same effects as that of the seventeenth embodiment as shown in FIGS. 35*a* and 35*b*. This embodiment may be equally applied to the automatic transmission 114 having the second transmitting portion 116 in the form of a Ravigneaux type planetary gear train as shown in FIG. 34.

Twenty-Seventh Embodiment

Figures 56A, 56B:
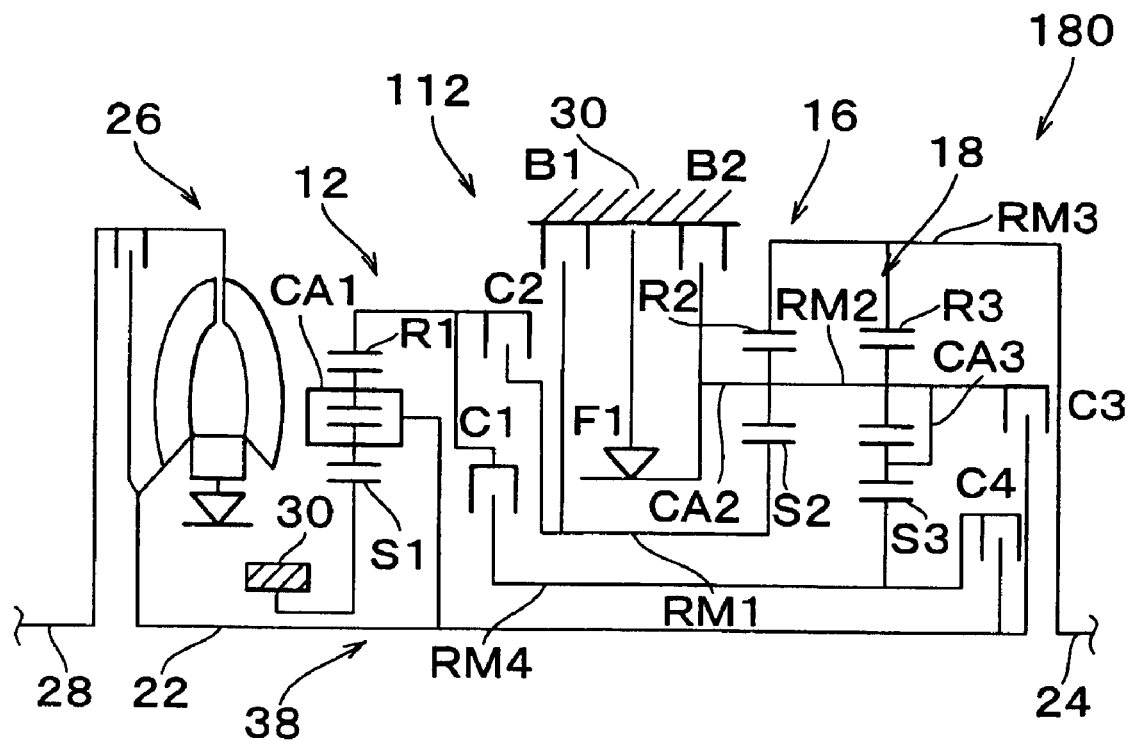
FIG. 56a is a schematic view showing an automatic transmission of a motor vehicle according to a twenty-seventh embodiment of the invention.
FIG. 56b is an operation table according to which each gear stage of the automatic transmission of the twenty-seventh embodiment as shown in FIG. 56a is established.
Figure 57:
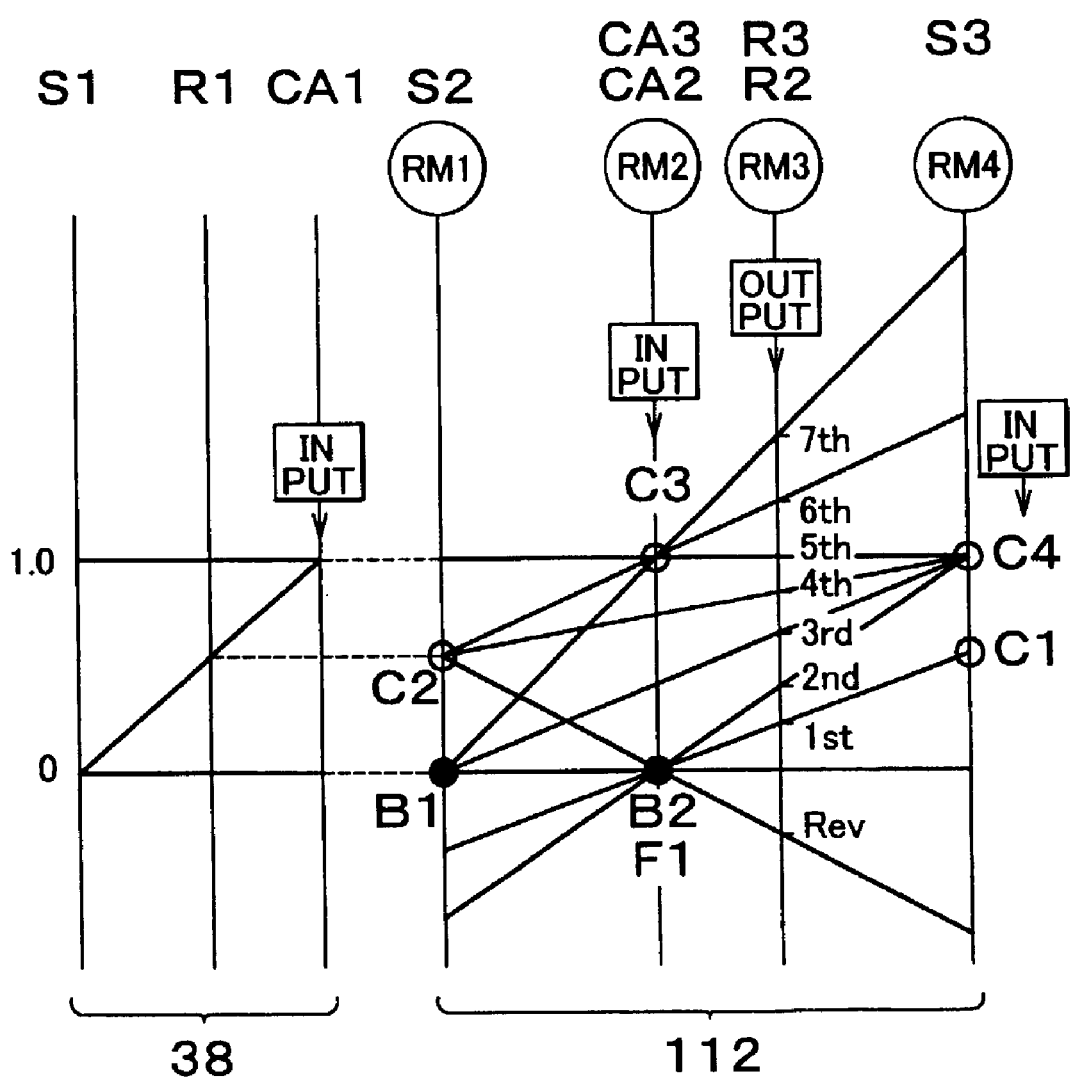
FIG. 57 is a nomogram plotted with respect to the automatic transmission of the twenty-seventh embodiment.

Referring next to FIGS. 56*a*, 56*b* and FIG. 57, the twenty-seventh embodiment of the invention will be described. FIGS. 56*a* and 56*b* correspond to FIGS. 1*a* and 1*b*, and FIG. 57 corresponds to FIG. 2. An automatic transmission 180 of a motor vehicle according to the twenty-seventh embodiment has the same mechanical arrangement as the automatic transmission 170 of the twenty-sixth embodiment as shown in FIGS. 54*a*, 54*b* and FIG. 55, but uses different engaging elements for establishing the $2^{nd}$-speed gear stage. More specifically, in the present embodiment, the fourth clutch C4 and the second brake B2 are engaged, and the fourth rotating element RM4 (i.e., sun gear S3) is rotated as a unit with the input shaft 22 while rotation of the second rotating element RM2 (i.e., carriers CA2 and CA3) is stopped, so that the $2^{nd}$-speed gear stage is established. Since the one-way clutch F1 is provided in parallel with the second brake B2, the second brake B2 is not necessarily engaged when the vehicle is accelerated. Thus, the $2^{nd}$-speed gear stage can be established only by engaging the fourth clutch C4, and the automatic transmission 150 is shifted from the $2^{nd}$-speed gear stage to the $3^{rd}$-speed gear stage by engaging the first brake B1 in this condition. The transmission gear ratios of the respective gear stages are suitably determined depending upon the respective gear ratios ρ1, ρ2 and ρ3 of the first, second and third planetary gear sets 12, 16 and 18. For example, if ρ1 is equal to 0.480, ρ2 is equal to 0.524, and ρ3 is equal to 0.355, the same gear ratios as indicated in FIG. 43*b* are provided as shown in FIG. 56*b*. Thus, the automatic transmission 180 of the twenty-seventh embodiment operates in substantially the same manner and yields substantially the same effects as that of the twenty-first embodiment as shown in FIGS. 43*a* and 43*b*. Similarly to the twenty-sixth embodiment as shown in FIGS. 54*a*, 54*b* and FIG. 55, the twenty-seventh embodiment may be equally applied to the automatic transmission 114 having the second transmitting portion 116 in the form of a Ravigneaux type planetary gear train as shown in FIG. 34.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples two of the first, second, third and fourth rotating elements to each other, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch or the first clutch and the fourth clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

2. The automatic transmission according to claim 1, wherein:

the second planetary gear set is a single pinion planetary gear, and the third planetary gear set is a double pinion planetary gear; and the first rotating element comprises the sun gear of the second planetary gear set, the second rotating element comprises the carrier of the second planetary gear set and the carrier of the third planetary gear set that are coupled to each other, the third rotating element comprises the ring gear of the second planetary gear set and the ring gear of the third planetary gear set that are coupled to each other, and the fourth rotating element comprises the sun gear of the third planetary gear set.

3. The automatic transmission according to claim 2, wherein:

the first planetary gear set is a double pinion planetary gear, and includes a sun gear, a carrier, and a ring gear as the three rotating elements;

one of the sun gear and the carrier of the first planetary gear set is coupled to the input member, and the other is fixed and inhibited from rotating, while the ring gear of the first planetary gear set serving as the intermediate output member is rotated at the reduced speed as compared with that of the input member to output power to the second transmitting portion.

4. The automatic transmission according to claim 1, wherein:

the second planetary gear set is a single pinion planetary gear, and the third planetary gear set is a double pinion planetary gear; and the first rotating element comprises the sun gear of the second planetary gear set and the sun gear of the third planetary gear set that are coupled to each other, the second rotating element comprises the carrier of the second planetary gear set and the ring gear of the third planetary gear set that are coupled to each other, the third rotating element comprises the ring gear of the second planetary gear set, and the fourth rotating element comprises the carrier of the third planetary gear set.

5. The automatic transmission according to claim 4, wherein:

the first planetary gear set is a double pinion planetary gear, and includes a sun gear, a carrier and a ring gear as the three rotating elements; and one of the sun gear and the carrier of the planetary gear set is coupled to the input member, and the other is fixed and inhibited from rotating, while the ring gear of the planetary gear set serving as the intermediate output member is rotated at a reduced speed as compared with that of the input member to output power to the second transmitting portion.

6. The automatic transmission according to claim 1, wherein:

the second planetary gear set is a single pinion planetary gear, and the third planetary gear set is a double pinion planetary gear; and the first rotating element comprises the sun gear of the second planetary gear set and the carrier of the third planetary gear set that are coupled to each other, the second rotating element comprises the carrier of the second planetary gear set and the ring gear of the third planetary gear set that are coupled to each other, the third rotating element comprises the ring gear of the second planetary gear set, and the fourth rotating element comprises the sun gear of the third planetary gear set.

7. The automatic transmission according to claim 6, wherein:

the first planetary gear set is a double pinion planetary gear, and includes a sun gear, a carrier and a ring gear as the three rotating elements; and of the sun gear and the carrier of the first planetary gear set is coupled to the input member, and the other is fixed and inhibited from rotating, while the ring gear of the planetary gear set serving as the intermediate output member is rotated at a reduced speed as compared with that of the input member to output power to the second transmitting portion.

8. The automatic transmission according to claim 1, wherein:

the first planetary gear set is a double pinion planetary gear, and includes a sun gear, a carrier and a ring gear as the three rotating elements; and one of the sun gear and the carrier of the first planetary gear set is coupled to the input member, and the other is fixed and inhibited from rotating, while the ring gear of the first planetary gear set serving as the intermediate output member is rotated at a reduced speed as compared with that of the input member to output power to the second transmitting portion.

9. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the sun gear of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the carrier of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples one of the first, third and fourth rotating elements to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

10. The automatic transmission according to claim 9, wherein the fourth clutch selectively couples the fourth rotating element to the input member.

11. The automatic transmission according to claim 10, wherein:

the first planetary gear set is a double pinion planetary gear, and includes a sun gear, a carrier and a ring gear as the three rotating elements; and one of the sun gear and the carrier of the first planetary gear set is coupled to the input member, and the other is fixed and inhibited from rotating, while the ring gear of the first planetary gear set serving as thn intermidiate output member is rotated at a reduced speed as compared with that of the input member to output power to the second transmitting portion.

12. The automatic transmission according to claim 9, wherein:

the first planetary gear set is a double pinion planetary gear, and includes a sun gear, a carrier and a ring gear as the three rotating element; and one of the sun gear and the carrier of the first planetary gear set is coupled to the input member, and the other is fixed and inhibited from rotating, while the ring gear of the first planetary gear set serving as the intermediate output member is rotated at a reduced speed as compared with that of the input member to output power to the second transmitting portion.

13. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the carrier of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples one of the first, third and fourth rotating elements to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

14. The automatic transmission according to claim 13, wherein the fourth clutch selectively couples the first rotating element to the input member.

15. The automatic transmission according to claim 14, wherein:

the first planetary gear set is a double pinion planetary gear, and includes a sun gear, a carrier and a ring gear as the three rotating elements; and one of the sun gear and the carrier of the first planetary gear set is coupled to the input member, and the other is fixed and inhibited from rotating, while the ring gear of the first planetary gear set serving as the intermediate output member is rotated at a reduced speed as compared with that of the input member to output power to the second transmitting portion.

16. The automatic transmission according to claim 13, wherein:

the first planetary gear set is a double pinion planetary gear, and includes a sun gear, a carrier and a ring gear as the three rotating element; and one of the sun gear and the carrier of the first planetary gear set is coupled to the input member, and the other is fixed and inhibited from rotating, while the ring gear of the first planetary gear set serving as the intermediate output member is rotated at a reduced speed as compared with that of the input member to output power to the second transmitting portion.

17. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a second planetary gear set and a third planetary gear set each of which includes a sun gear, a carrier and a ring gear, at least one of the sun gear, the carrier and the ring gear of the second planetary gear set being coupled to at least one of the sun gear, the carrier and the ring gear of the third planetary gear set to provide a first rotating element, a second rotating element, a third rotating element and a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the first rotating element or the third rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

18. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the sun gear of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the carrier of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

19. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the carrier of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

20. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the sun gear of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the carrier of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

21. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the carrier of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

22. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the sun gear of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the carrier of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the fourth clutch and the second brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

23. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set and the carrier of the third planetary gear set being coupled to each other to provide a first rotating element, the carrier of the second planetary gear set and the ring gear of the third planetary gear set being coupled to each other to provide a second rotating element, the ring gear of the second planetary gear set providing a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the fourth clutch and the second brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

24. An automatic transmission, comprising:

an input member;

an output member;

a first transmitting portion including a first planetary gear set having three rotating elements, one of the three rotating elements being coupled to the input member, another of the three rotating elements being fixed and inhibited from rotating, a remaining one of the three rotating elements serving as an intermediate output member and rotating at a reduced speed as compared with that of the input member to output power; and a second transmitting portion including a second planetary gear set and a third planetary gear set each of which includes a sun gear, a carrier and a ring gear, at least one of the carrier and the ring gear of the second planetary gear set being coupled to at least one of the sun gear, the carrier and the ring gear of the third planetary gear set to provide a first rotating element, a second rotating element, a third rotating element and a fourth rotating element, which are arranged in the order of description from one end to the other end in a the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the first rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the first clutch and the fourth clutch are engaged, a fifth-speed gear stage having a smaller gear ratio than that of the fourth-speed gear stage is established when the first clutch and the third clutch are engaged, a sixth-speed gear stage having a smaller gear ratio than that of the fifth-speed gear stage is established when the third clutch and the fourth clutch are engaged, and a seventh-speed gear stage having a smaller gear ratio than that of the sixth-speed gear stage is established when the second clutch and the third clutch are engaged.

25. The automatic transmission according to claim 24, wherein:

the second planetary gear set is a single pinion planetary gear, and the third planetary gear set is a double pinion planetary gear; and the first rotating element comprises the sun gear of the second planetary gear set and the carrier of the third planetary gear set that are coupled to each other, the second rotating element comprises the carrier of the second planetary gear set and the ring gear of the third planetary gear set that are coupled to each other, the third rotating element comprises the ring gear of the second planetary gear set, and the fourth rotating element comprises the sun gear of the third planetary gear set.

26. The automatic transmission according to claim 25, wherein:

the first planetary gear set is a double pinion planetary gear, and includes a sun gear, a carrier and a ring gear as the three rotating elements; and one of the sun gear and the carrier of the first planetary gear set is coupled to the input member, and the other is fixed and inhibited from rotating, while the ring gear of the first planetary set serving as the intermediate output member is rotated at a reduced speed as compared with that of the input member to output power to the second transmitting portion.

27. The automatic transmission according to claim 24, wherein:

the first planetary gear set is a double pinion planetary gear, and includes a sun gear, a carrier and a ring gear as the three rotating elements; and one of the sun gear and the carrier is of the first planetary gear set is coupled to the input member, and the other is fixed and inhibited from rotating, while the ring gear of the first planetary gear set serving as the intermediate output member is rotated at a reduced speed as compared with that of the input member to output power to the second transmitting portion.

28. An automatic transmission, comprising:

an input member;

an output member;

a first transmitting portion including a double-pinion first planetary gear set having a carrier, a sun gear and a ring gear, the carrier being coupled to and rotated by the input member, the sun gear being fixed and inhibited from rotating, the ring gear serving as an intermediate output member and being rotated at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set providing a first rotating element, the carrier of the second planetary gear set and the carrier of the third planetary gear set being coupled to each other to provide a second rotating element, the ring gear of the second planetary gear set and the ring gear of the third planetary gear set being coupled to each other to provide a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples one of the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the first clutch and the third clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

29. An automatic transmission, comprising:

an input member;

an output member;

a first transmitting portion including a double-pinion first planetary gear set having a carrier, a sun gear and a ring gear, the carrier being coupled to and rotated by the input member, the sun gear being fixed and inhibited from rotating, the ring gear serving as an intermediate output member and being rotated at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set providing a first rotating element, the carrier of the second planetary gear set and the carrier of the third planetary gear set being coupled to each other to provide a second rotating element, the ring gear of the second planetary gear set and the ring gear of the third planetary gear set being coupled to each other to provide a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the first clutch and the second clutch are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

30. An automatic transmission, comprising:

an input member;

an output member;

a first transmitting portion including a double-pinion first planetary gear set having a carrier, a sun gear and a ring gear, the carrier being coupled to and rotated by the input member, the sun gear being fixed and inhibited from rotating, the ring gear serving as an intermediate output member and being rotated at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set providing a first rotating element, the carrier of the second planetary gear set and the carrier of the third planetary gear set being coupled to each other to provide a second rotating element, the ring gear of the second planetary gear set and the ring gear of the third planetary gear set being coupled to each other to provide a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the first clutch and the first brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

31. An automatic transmission, comprising:

an input member;

an output member;

a first transmitting portion including a double-pinion first planetary gear set having a carrier, a sun gear and a ring gear, the carrier being coupled to and rotated by the input member, the sun gear being fixed and inhibited from rotating, the ring gear serving as an intermediate output member and being rotated at a reduced speed as compared with that of the input member to output power; and a second transmitting portion including a single-pinion second planetary gear set and a double-pinion third planetary gear set each of which includes a sun gear, a carrier and a ring gear, the sun gear of the second planetary gear set providing a first rotating element, the carrier of the second planetary gear set and the carrier of the third planetary gear set being coupled to each other to provide a second rotating element, the ring gear of the second planetary gear set and the ring gear of the third planetary gear set being coupled to each other to provide a third rotating element, the sun gear of the third planetary gear set providing a fourth rotating element, the second transmitting portion further including a first brake that selectively stops rotation of the first rotating element, a second brake that selectively stops rotation of the second rotating element, a first clutch that selectively couples the fourth rotating element to the intermediate output member, a second clutch that selectively couples the first rotating element to the intermediate output member, a third clutch that selectively couples the second rotating element to the input member, and a fourth clutch that selectively couples the fourth rotating element to the input member, the third rotating element being coupled to the output member to output rotary power, wherein a first-speed gear stage having the largest gear ratio is established when the first clutch and the second brake are engaged, a second-speed gear stage having a smaller gear ratio than that of the first-speed gear stage is established when the fourth clutch and the second brake are engaged, a third-speed gear stage having a smaller gear ratio than that of the second-speed gear stage is established when the fourth clutch and the first brake are engaged, a fourth-speed gear stage having a smaller gear ratio than that of the third-speed gear stage is established when the second clutch and the fourth clutch are engaged, a fifth-speed gear stage having a smaller gear ratio than that of the fourth-speed gear stage is established when the third clutch and the fourth clutch are engaged, a sixth-speed gear stage having a smaller gear ratio than that of the fifth-speed gear stage is established when the second clutch and the third clutch are engaged, and a seventh-speed gear stage having a smaller gear ratio than that of the sixth-speed gear stage is established when the third clutch and the first brake are engaged.

* * * * *